United States Patent [19]

Koyama et al.

[11] Patent Number: 5,428,285

[45] Date of Patent: Jun. 27, 1995

[54] POSITION CONTROLLER FOR CONTROLLING AN ELECTRIC MOTOR

[75] Inventors: Masato Koyama, Hyogo; Tetsuaki Nagano, Aichi, both of Japan

[73] Assignee: Mitsubishi Denki Kabushiki Kaisha, Tokyo, Japan

[21] Appl. No.: 43,750

[22] Filed: Apr. 7, 1993

[30] Foreign Application Priority Data

May 29, 1992 [JP] Japan .................................. 4-138223

[51] Int. Cl.$^6$ ............................................. H02P 5/28
[52] U.S. Cl. .................................. 318/799; 318/560; 318/618
[58] Field of Search ........................ 318/799, 560, 615

[56] References Cited

U.S. PATENT DOCUMENTS 4,792,737 12/1988 Goff et al. .
5,175,483 12/1992 Fujii et al. ..................... 318/799
5,235,262 8/1993 Takeuchi et al. ................... 318/799

FOREIGN PATENT DOCUMENTS 0196417 10/1986 European Pat. Off. .
0321579 6/1989 European Pat. Off. .
2258742 2/1993 United Kingdom .

OTHER PUBLICATIONS

W. Schumacher et al., "Transistor-Fed AC-Servo Drive with Microprocessor Control", *IPEC*, Tokyo 1983, pp. 1465–1476.

Primary Examiner—William M. Shoop, Jr.
Assistant Examiner—Karen Masih
Attorney, Agent, or Firm—Burns, Doane, Swecker & Mathis

[57] ABSTRACT

A position controller for controlling an electric motor comprises first position control circuit which provides first speed signal, second position control circuit which controls a mechanical system simulating circuit and provides second speed signal, an adder which adds the first and second speed signals to provide third speed control signal, first speed control circuit which receives the third speed signal and provides first torque signal, second speed control circuit which provides second torque signal, third speed control circuit which provides third torque signal, and an adder which adds the first, second and third torque signals to provide final torque signal. The output torque of the electric motor is controlled so that the output torque coincides with a torque represented by the final torque signal. The position controller has high-speed response characteristics, is capable of suppressing mechanical vibrations and maintains a constant response frequency even if the moment of inertia of a load machine driven by the electric motor varies.

10 Claims, 26 Drawing Sheets

POSITION CONTROLLER FOR CONTROLLING AN ELECTRIC MOTOR

BACKGROUND OF THE INVENTION

1. Field of the Invention

The present invention relates to a position controller for controlling an electric motor, such as a dc motor, an induction motor or a synchronous motor, for driving a mechanism, such as the work table of a machine tool or the robot arm of an electric industrial robot.

2. Description of the Prior Art

FIG. 1 is a block diagram of a prior art position controller presented in the Symposium for Small Motor Technology, Session B-4 held in 1987 under the sponsorship of the Japan Management Association. Referring to FIG. 1, there are shown a dc motor 1a, a speed detector 4a, a position detector 4b, a subtracter a, a position control circuit 5b, a feed-forward signal generating circuit 5c, an adder 5d, a subtracter 9a, a speed control circuit 9b, a power conversion circuit 13 and a rotational angle command signal generating circuit 15.

In operation, the position control circuit 5b provides a speed signal $\omega_{ms1}$. The subtracter 5a subtracts an actual rotational angle signal $\theta_m$ provided by the position detector 4b from a rotational angle command signal $\theta_{ms}$ provided by the rotational angle command signal generating circuit 15 to give a rotational angle deviation signal $\Delta\theta$ ($=\theta_{ms}, -\theta_m$) to the rotational angle control circuit 5b. Then, the position control circuit 5b provides a speed command signal $\omega_{ms1}$.

Subsequently, the feed-forward speed signal generating circuit 5c provides a feed-forward signal $\omega_{ms2}$. The rotational angle command signal $\theta_{ms}$ provided by the rotational angle command signal generating circuit 15 is given to the feed-forward speed signal generating circuit 5c, and then the feed-forward signal generating circuit 5c performs differentiation to provide the feed-forward speed signal $\omega_{ms2}$, namely, the rate of change of the rotational angle command signal $\theta_{ms}$.

The adder 5d adds the speed command signal $\omega_{ms1}$ and the feed-forward speed signal $\omega_{ms2}$ and provides a final speed command signal $\omega_{ms}$ ($=\omega_{ms1}+\omega_{ms2}$).

When a control signal is provided by the speed control circuit 9b, the subtracter 9a subtracts the actual speed signal $\omega_m$ provided by the speed detector 4a from the final speed command signal $\omega_{ms}$ to give a speed deviation signal $\delta\omega$ ($=\omega_{ms}-\omega_m$) to the speed control circuit 9b, and then the speed control circuit 9b provides a torque signal. A control signal is given to the power conversion circuit 13 to control the power conversion circuit 13 so that the output torque of the dc motor 1a conforms to the torque signal.

Since the armature current of the dc motor 1a varies substantially in proportion to the torque, the speed control circuit 9b is provided internally with a current feedback loop to improve the response characteristics of the speed control circuit 9b.

As is generally known, a control system provided with a speed control loop and a current control loop as minor loops to make the position of the output shaft, i.e., rotational angle of the dc motor 1a vary according to a command signal at high response is called a cascaded control system. Such a cascaded control system requires the minor loops to operate at a high response speed. In the prior art position controller shown in FIG. 1 for controlling the position of the output shaft of an electric motor, the order of importance of high-speed response characteristics is the current control loop, the speed control loop and the position control loop. Generally, the gain of the control system is determined so that the response frequency of the current control loop is several times that of the speed control loop, and the response frequency of the speed control loop is several times that of the position control loop.

Accordingly, the response characteristics of the speed control loop needs to be enhanced to enhance the response characteristics of the position control loop. The prior art position controller shown in FIG. 1 is provided additionally with the feed-forward speed signal generating circuit 5c to improve the response characteristics of the position control loop. The feed-forward speed signal generating circuit 5c provides the feed-forward speed signal $\omega_{ms2}$ proportional to the rate of change of the position command signal $\theta_{ms}$. Since the operating speed $\omega_m$ of the dc motor is the derivative of the rotational angle $\theta_m$, the rotational angle $\theta_m$ of the dc motor 1a follows the rotational angle command signal $\theta_{ms}$ when the speed control circuit 9b controls the dc motor 1a so that the actual speed $\omega_m$ of the dc motor 1a coincides with the feed-forward speed signal $\omega_{ms2}$.

The foregoing prior art position controller is capable of controlling the position at a high response speed owing to the operation of the feed-forward speed signal generating circuit 5c even when it is difficult to increase the gain of the angular position control circuit due to restrictions placed by the response characteristics of the speed control loop.

However, since the feed-forward speed signal generating circuit 5c determines the feed-forward speed signal by differentiation, the speed changes sharply entailing the sharp change of the output torque of the dc motor 1a if the rotational angle command signal $\theta_{ms}$ does not change smoothly. If the speed of the dc motor 1a driving, for example, the ball-screw shaft for driving the work table of a machine tool, is controlled in such a mode, a high impulsive force will be applied to the work table, causing the machine tool to generate vibrations and noise.

Furthermore, if the ball-screw shaft serving as a component of a torque transmission member has a relatively low rigidity or the reduction gear of the machine tool has a backlash, large mechanical vibrations are liable to be generated if the response frequency of the speed control loop is increased. Accordingly, the response frequency of the speed control loop when controlling the electric motor driving the work table through a transmission mechanism must be lower than that of the speed control loop when controlling only the electric motor. The moment of force that acts on the robot arm of an electric industrial robot varies according to the position of the robot arm and, when the electric motor is used for driving the robot arm of an electric industrial robot, the response frequency of the speed control loop decreases when the moment of inertia of the robot arm increases. Under such circumstances, the operating speed of the electric motor is unable follow the feed-forward speed signal and the overshooting of response to a rotational angle control command, i.e., a position control command, occurs even if the feed-forward speed signal is determined by the feed-forward speed signal generating circuit, because the response frequency of the speed control loop is low.

SUMMARY OF THE INVENTION

In view of the foregoing, it is an object of the present invention to provide a position controller for controlling an electric motor, capable of operating at a high response speed without causing a machine driven by the electric motor to generate mechanical vibrations.

It is another object of the present invention to provide a position controller for controlling an electric motor, capable of maintaining a fixed response frequency even if the moment of inertia of the load on the electric motor varies.

It is a third object of the present invention to provide a position controller for controlling an electric motor, capable of operating in satisfactory response characteristics for position control even if a rotational angle command signal or load torque varies.

It is a fourth object of the present invention to provide a position controller for controlling an electric motor for driving a mechanical system comprising a torque transmission mechanism and a load mechanism, capable of controlling the electric motor in a high response speed even if the mechanical system is liable to generate mechanical vibrations due to the insufficient rigidity of the torque transmission mechanism and backlashes between the component gears of the torque transmission mechanism.

It is a fifth object of the present invention to provide a position controller for controlling an electric motor, capable of smoothly driving the electric motor so that the output torque of the electric motor will not change sharply and mechanical vibrations and noise will not be generated by providing a gradually varying driving signal for driving the electric motor even if a rotational angle command signal changes sharply.

According to a first aspect of the present invention, there is provided, to achieve the objects of the invention, a position controller for controlling an electric motor, comprising:

(1) a first position control circuit which provides a first speed signal on the basis of a rotational angle command signal and an actual rotational angle signal;
(2) a mechanical system simulating circuit which approximates the electric motor, a torque transmission mechanism and a load machine by two integration elements, and provides a simulated speed signal and a simulated rotational angle signal;
(3) a second position control circuit which provides a second speed signal on the basis of the rotational angle command signal,and the simulated rotational angle signal;
(4) an adder which adds the first speed signal and the second speed signal, and provides a third speed signal; provides a first torque signal, on the basis of the third
(5) a first speed control circuit which speed signal and an actual speed signal representing an actual operating speed of the motor provided by a rotation detector;
(6) a second speed control circuit which provides a second torque signal on the basis of the second speed signal and the simulated speed signal;
(7) a third speed control circuit which provides a third torque signal on the basis of the simulated speed signal and the actual speed signal; and
(8) a control means for controlling the output torque of the electric motor on the basis of the first torque signal, the second torque signal and the third torque signal.

According to a second aspect of the present invention, there is provided a position controller for controlling an electric motor according to the first aspect of the present invention further comprising a gain correction circuit for correcting the integration time constant of the mechanical system simulating circuit and the gain of the second speed control circuit on the basis of the third torque signal provided by the third speed control circuit.

According to a third aspect of the present invention, there is provided a position controller for controlling an electric motor, comprising:

(1) a first position control circuit which provides a first speed signal on the basis of a rotational angle command signal and an actual rotational angle signal representing a rotational angle of the electric motor;
(2) a mechanical system simulating circuit which approximates the electric motor, a torque transmission mechanism and a load machine by two integration elements, and provides a simulated speed signal and a simulated rotational angle signal;
(3) a second position control circuit which provides a second speed signal on the basis of the rotational angle command signal and the simulated rotational angle signal;
(4) an adder which adds the first speed signal and the second speed signal, and provides a third speed signal;
(5) a first speed control circuit which provides a first torque signal on the basis of the third speed signal and an actual speed signal representing an actual operating speed of the electric motor provided by a rotation detector;
(6) a second speed control circuit which provides a second torque signal on the basis of the second speed signal and the simulated speed signal;
(7) a third speed control circuit which provides a third torque signal on the basis of the simulated speed signal and the actual speed signal; and
(8) a control means which controls the output torque of the electric motor on the basis of the first torque signal and the second torque signal.

According to a fourth aspect of the present invention, there is provided a position controller for controlling an electric motor according to the third aspect of the present invention further comprising a correction circuit for correcting the integration time constant of the mechanical system simulating circuit and the gain of the second speed control circuit on the basis of the third torque signal provided by the third speed control circuit.

According to a fifth aspect of the present invention, there is provided a position controller for controlling an electric motor, comprising:

(1) a feed-forward signal calculating circuit which provides a simulated rotational angle signal, a simulated speed signal and a simulated torque signal on the basis of a rotational angle command signal;
(2) a position control circuit which provides a first speed signal on the basis of the simulated rotational angle speed and an actual rotational angle speed representing an actual rotational angle provided by a rotation detector;
(3) a speed control circuit which provides a first torque signal on the basis of the simulated speed signal, the first speed signal and the actual speed signal provided by the rotation detector; and (4) a control means for controlling the output torque of the electric motor on the basis of the simulated torque signal and the first torque signal.

According to a sixth aspect of the present invention, there is provided a position controller for controlling an electric motor according to the fifth aspect of the present invention further comprising a correction circuit for correcting control parameters for the feed-forward signal calculating circuit on the basis of a speed deviation signal representing the deviation of the actual speed signal from the simulated speed signal.

As stated above, in the position controller in the first aspect of the present invention, the first position control circuit provides the first speed signal, the second position control circuit for controlling the mechanical system simulating circuit provides the second speed control signal, the adder adds the first speed signal and the second speed signal and gives the third speed signal to the first speed control circuit, and then the first speed control circuit provides a first torque signal. Similarly, upon the reception of the second speed signal, the second control circuit provides the second torque signal. The third speed control circuit provides the third torque signal. Then, the control means controls the electric motor so that the output torque of the electric motor coincides with the final torque signal obtained by adding the first torque signal, the second torque signal and the third torque signal.

The correction circuit of the angular position controller in the second aspect of the present invention receives the third torque signal from the third speed control circuit, corrects the integration time constant of the mechanical system simulating circuit to reduce the absolute value of a signal component proportional to the deviation of the actual speed signal included in the third torque signal from the simulated speed signal and corrects at least the gain of the second speed control circuit according to the integration time constant.

In the position controller in the third aspect of the present invention, the first position control circuit provides the first speed signal, the second position control circuit for controlling the mechanical system simulating circuit provides the second speed control signal, the adder adds the first speed signal and the second speed signal and gives the sum of the first speed signal and the second speed signal to the first speed control circuit. Then, the first speed control circuit provides the first torque signal. Similarly, the second speed control circuit provides the second torque signal upon the reception of the second speed signal. The third speed control circuit provides the third torque signal. Subsequently, the control means controls the electric motor so that the output torque of the electric motor coincides with the final torque signal obtained by adding the first torque signal and the second torque signal.

The correction circuit of the position controller in the fourth aspect of the present invention receives the third torque signal from the third speed control circuit, corrects the integration time constant of the mechanical system simulating circuit to reduce the absolute value of a signal component proportional to the deviation of the actual speed signal included in the third torque signal from the simulated speed signal and corrects at least the gain of the second speed control circuit according to the integration constant.

In the position controller in the fifth aspect of the present invention, the feed-forward signal calculating circuit provides the simulated rotational angle signal having predetermined response characteristics in relation to the rotational angle command signal, the simulated speed signal and the simulated torque signal. Then, the position control circuit determines the first speed signal on the basis of the simulated rotational angle signal and the actual rotational angle signal representing an actual rotational angle of the electric motor provided by the rotation detector. Furthermore, the speed control circuit determines the first torque signal on the basis of the simulated speed signal and the actual rotational angle signal provided by the rotation detector. Subsequently, the control means controls the motor so that the output torque of the electric motor coincides with the final torque signal obtained by adding the simulated torque signal and the first torque signal.

The correction circuit of the position controller in the sixth aspect of the present invention corrects control parameters for the feed-forward signal calculating circuit according to the variation of the moment of inertia of the load machine so that the absolute value of the deviation signal representing the deviation of the actual speed signal from the simulated speed signal is reduced.

The above and other objects and novel features of the present invention will more fully appear from the following detailed description when the same is read in connection with the accompanying drawings. It is to be expressly understood, however, that the drawings are for the purpose of illustration only and are not intended to limit the invention.

DETAILED DESCRIPTION OF THE PREFERRED EMBODIMENTS

Figure 2:
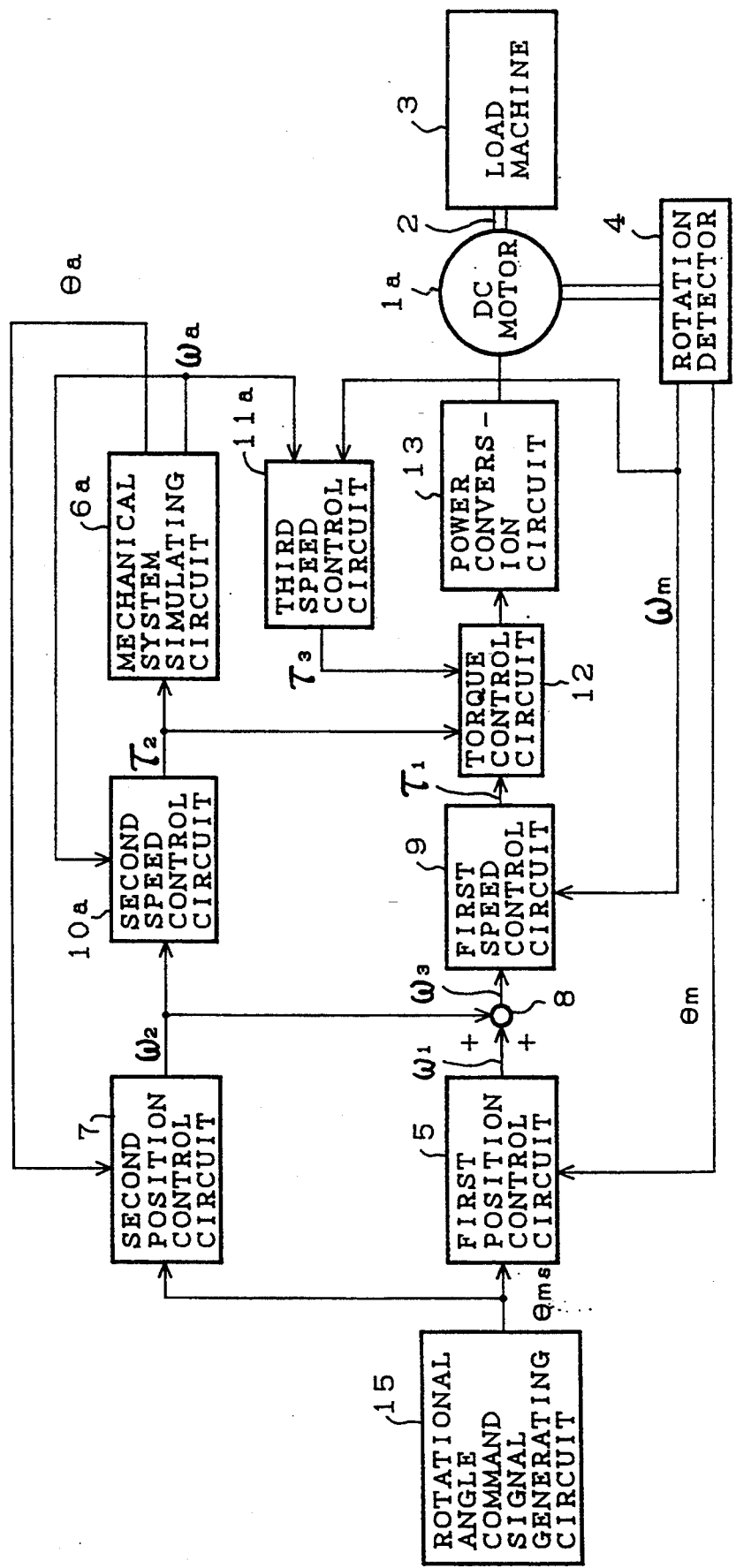
FIG. 2 is a block diagram of a position controller in a first embodiment according to the present invention.

Preferred embodiments of the present invention will now be described in detail with reference to the accompanying drawings, in which components like or corresponding to those previously described with reference to FIG. 2 are designated by the same reference numerals and the description thereof will be omitted to avoid duplication.

First Embodiment

A position controller for controlling an electric motor, in a first embodiment according to the present invention will be described hereinafter with reference to FIGS. 2 to 9. The position controller controls a dc motor 1a interlocked with a load machine 3 with a torque transmission mechanism 2, and is provided with a power conversion circuit 13 identical with the power conversion circuit 13 of the prior art position controller.

Referring to FIG. 2, the position controller comprises, in addition to components identical with those of the previously described prior art position controller, a torque transmission mechanism 2, a load machine 3, a rotation detector 4 for detecting the rotating speed and rotational angle of the dc motor 1a, a first position control circuit 5, a mechanical system simulating circuit 6a, a second position control circuit 7, an adder 8, a first speed control circuit 9, a second speed control circuit 10a, a third speed control circuit 11a, a torque control circuit 12 and a rotational angle command signal generating circuit 15.

The rotation detector 4 consists of, for example, a known speed detector, such as a tachometer generator, and a position detector, such as an encoder. A torque control means for controlling the torque of the dc motor 1a consists of the torque control circuit 12 and the power conversion circuit.

Figure 3:
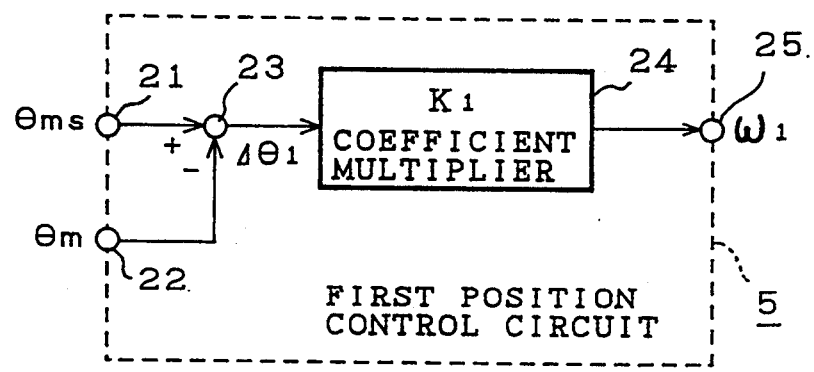
FIG. 3 is a block diagram of a first position control circuit included in the position controller of FIG. 2.

Referring to FIG. 3 showing the first position control circuit 5 of FIG. 2, the first position control circuit 5 comprises an input terminal 21 connected to the rotating angle command signal generating circuit 15, an input terminal 22 connected to the rotation detector 4, a subtracter 23 connected to the input terminals 21 and 22, a coefficient multiplier 24 connected to the subtracter 23, and an output terminal 25 connected to the coefficient multiplier 24.

Figure 4:
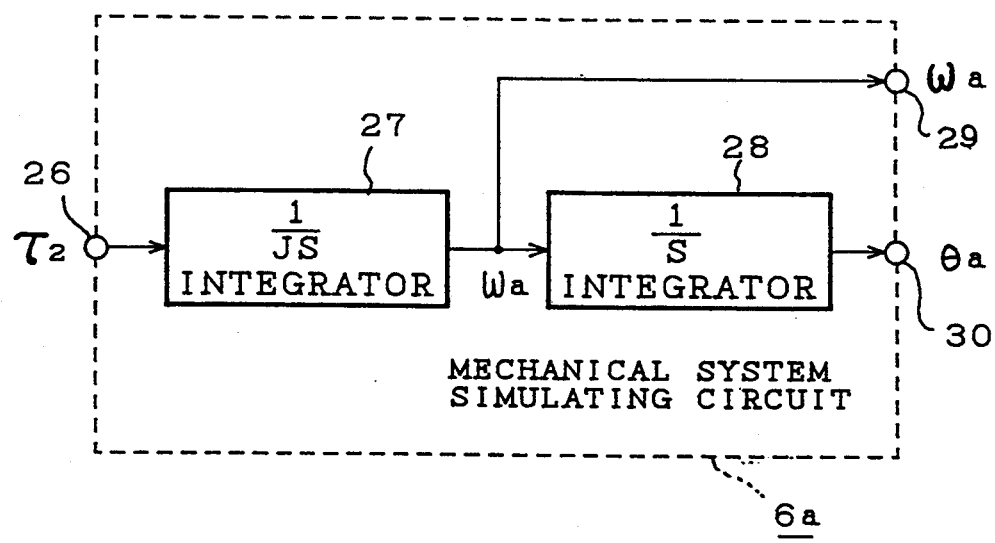
FIG. 4 is a block diagram of a first mechanical system simulating circuit included in the position controller of FIG. 2.

Referring to FIG. 4 showing the mechanical system simulating circuit 6a, the mechanical system simulating circuit 6a comprises an input terminal connected to the second speed control circuit 10a, an integrator 27 connected to the input terminal 26, an integrator 28 connected to the integrator 27, an output terminal 29 connected to the integrator 27, and an output terminal 30 connected to the integrator 28.

Figure 5:
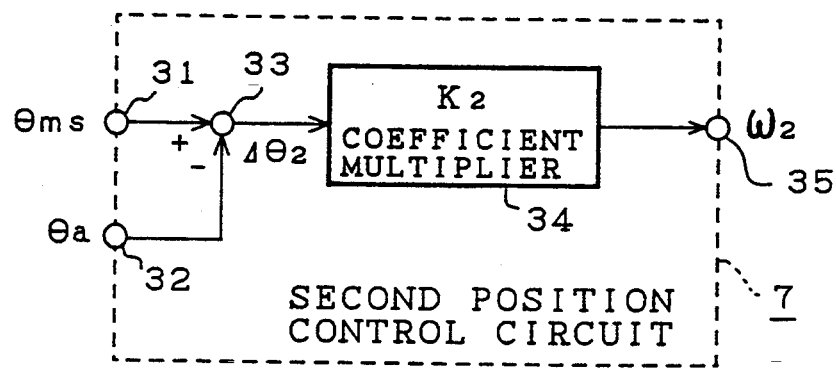
FIG. 5 is a block diagram of a second-position control circuit included in the position controller of FIG. 2.

Referring to FIG. 5 showing the second position control circuit 7, the second position control circuit 7 comprises an input terminal 31 connected to the rotational angle command signal generating circuit 15, an input terminal 32 connected to the mechanical system simulating circuit 6a, a subtracter 33 connected to the input terminals 31 and 32, a coefficient multiplier 34 connected to the subtracter 33, and an output terminal 35 connected to the scale factor element 34.

Figure 6:
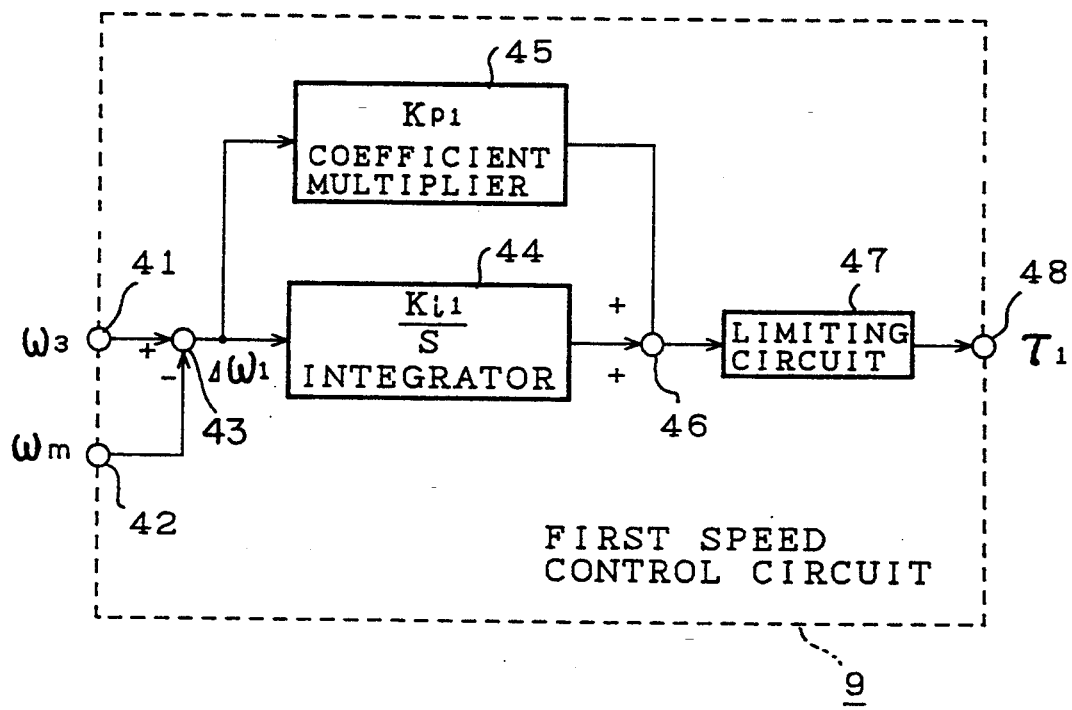
FIG. 6 is a block diagram of a first speed control circuit included in the position controller of FIG. 2.

Referring to FIG. 6 showing the first speed control circuit 9, the first speed control circuit 9 comprises an input terminal 41 connected to the adder 8, an input terminal 42 connected to the rotation detector 4, a subtracter 43 connected to the input terminals 41 and 42, an integrator 44 connected to the subtracter 43, a coefficient multiplier 45 connected to the subtracter 43, an adder 46 connected to the connected to the integrator 44 and the coefficient multiplier 45, a limiting circuit 47 connected to the adder 46, and an output terminal 48 connected to the limiting circuit 47.

Figure 7:
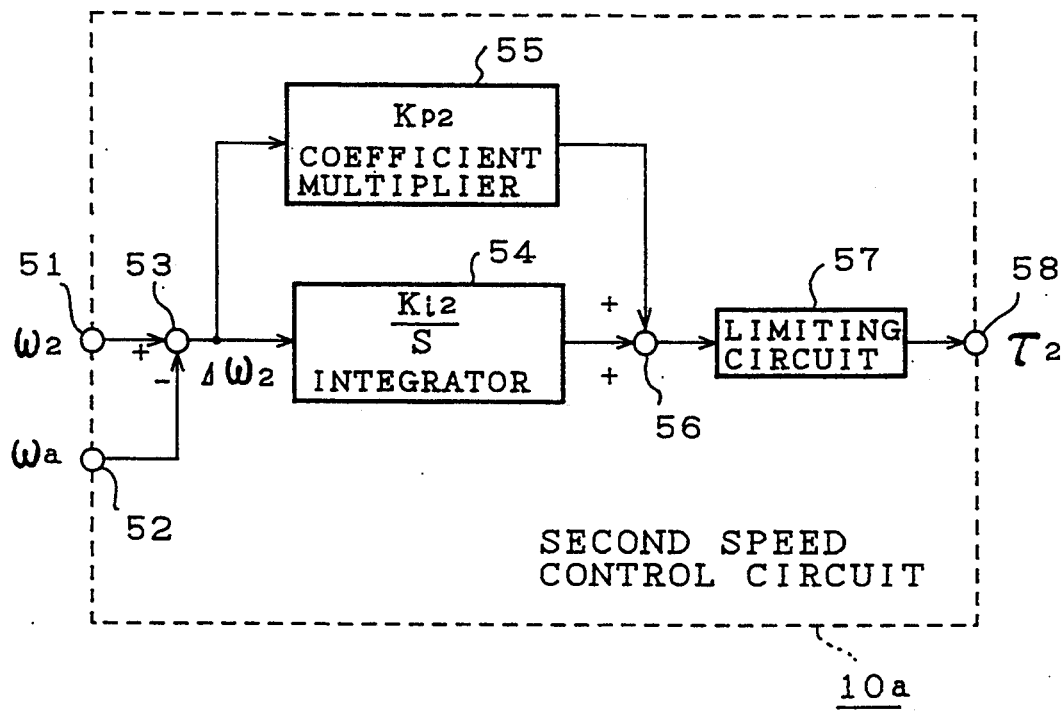
FIG. 7 is a block diagram of a second speed control circuit included in the position controller of FIG. 2.

Referring to FIG. 7 showing the second speed control circuit 10a, the second speed control circuit 10a comprises an input terminal 51 connected to the second position control circuit 7, an input terminal 52 connected to the mechanical system simulating circuit 6a, a subtracter 53 connected to the input terminals 51 and 52, an integrator 54 connected to the subtracter 54, a coefficient multiplier 55 connected to the subtracter 53, an adder 56 connected to the integrator 54 and the coefficient multiplier 55, a limiting circuit 57 connected to the adder 56, and an output terminal 58 connected to the limiting circuit 57.

Figure 8:
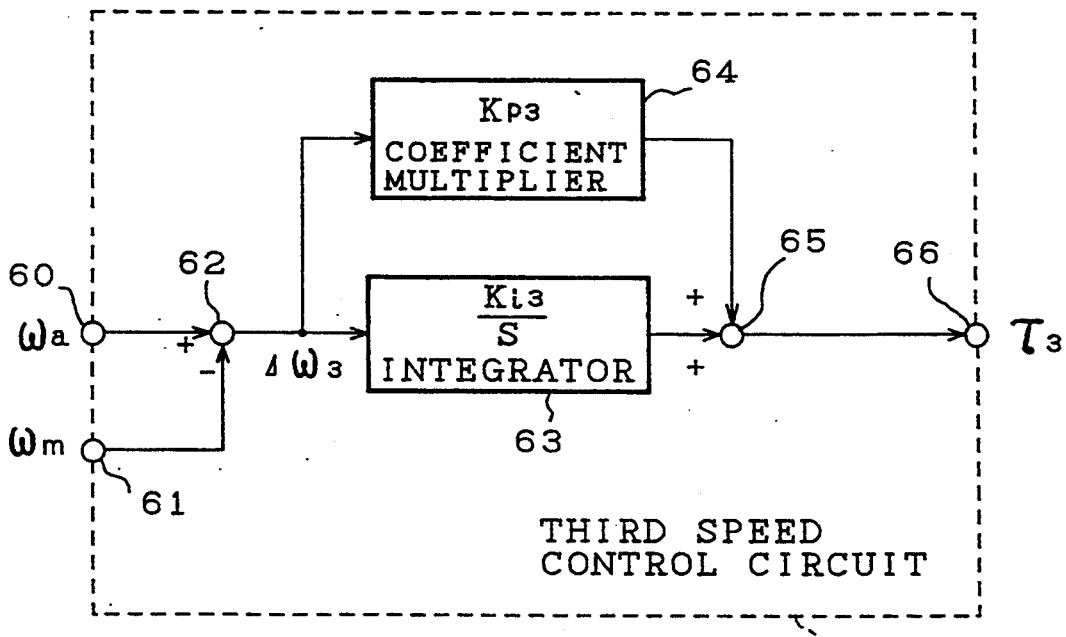
FIG. 8 is a block diagram of a third speed control circuit included in the position controller of FIG. 2.

Referring to FIG. 8 showing the third speed control circuit 11a, the third speed control circuit 11a comprises an input terminal 60 connected to the mechanical system simulating circuit 6a, an input terminal 61 connected to the rotation detector 4, a subtracter 62 connected to the input terminals 60 and 61, an integrator 63 connected to the subtracter 62, a coefficient multiplier 64 connected to the subtracter 62, an adder 65 connected to the integrator 63 and the coefficient multiplier 64, and an output terminal 66 connected to the adder 65.

Figure 9:
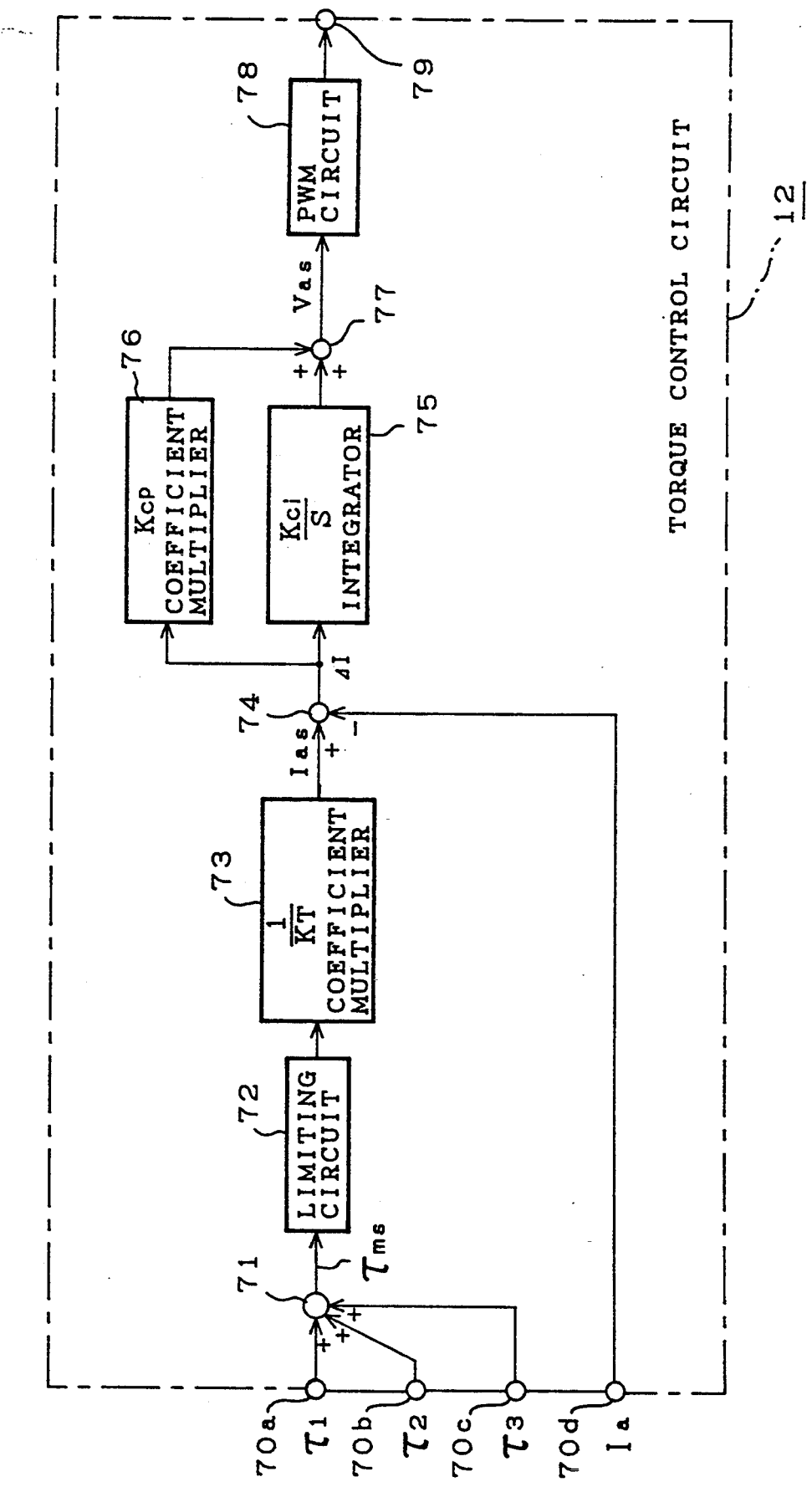
FIG. 9 is a block diagram of a torque control circuit included in the position controller of FIG. 2.

Referring to FIG. 9 showing the torque control circuit 12, the torque control circuit 12 comprises an input terminal 70a connected to the first speed control circuit 9, an input terminal 70b connected to the second speed control circuit 10a, an input terminal connected to the third speed control circuit 11a, an input terminal 70d connected to a current detector, not shown, an adder 71 connected to the input terminals 70a, 70b and 70c, a limiting circuit 72 connected to the adder 71, a coefficient multiplier 73 connected to the limiting circuit 72, a subtracter 74 connected to the input terminal 70d and the coefficient multiplier 73, an integrator 75 connected to the subtracter 74, a coefficient multiplier 76 connected to the subtracter 74, an adder 77 connected to the integrator 75 and the coefficient multiplier 76, a PWM circuit 78 connected to the adder 77, and an output terminal 79 connected to the PWM circuit 787.

Prior to the description of the operation of the position controller in the first embodiment, the principle of controlling the rotational angle, i.e., the position, of the dc motor 1a will be described in connection with a control system consisting of the components shown in FIG. 2 excluding the mechanical system simulating circuit 6a, the second position control circuit 7, the second speed control circuit 10s and the third speed control circuit 11a.

As mentioned above, the control system is a common position control system having a speed control loop as a minor loop. As is well known, if the torque transmission mechanism 2 (FIG. 2) has a relatively low rigidity, large vibrations are generated by mechanical resonance when the gain of the first speed control circuit 9 is increased to increase the response speed of the first speed control circuit 9. In such a case, it is difficult to increase the response frequency of the speed control loop, i.e., the minor loop, and hence it is difficult to increase the response frequency of the position control loop.

An actual rotational angle signal $\theta_m$ representing the rotational angle of the dc motor 1a and an actual speed signal $\omega_m$ provided by the rotation detector 4 are given respectively to the first position control circuit 5 and the first speed control circuit 9. If these signals have vibration components corresponding to vibrations produced by mechanical resonance, the vibration components are amplified by the first position control circuit 5 and the first speed control circuit 9, respectively. Therefore, the response frequencies of the position control loop and the speed control loop cannot be increased.

To solve such a problem, the present invention controls the dc motor 1a in a feed-forward control mode. The mechanical system simulating circuit 6a approximating a mechanical system consisting of the dc motor 1a, the torque transmission mechanism 2 and the load machine 3 by two integration elements represented by:

$$\omega_a = \tau_2/J_s, \quad \theta_a = \omega_a/S \quad (1)$$

where $\tau_2$ is a second torque signal, which will be described later, $\omega_a$ is a simulated speed signal, $\theta_a$ is a simulated rotational angle signal, and $J_s$ is the moment of inertia of the mechanical system. As shown in FIG. 4, the mechanical system simulating circuit 6a comprises the integrator 27 which integrates the second torque signal $\tau_2$ and provides a simulated speed signal $\omega_a$, and the integrator 28 integrates the simulated speed signal $\omega_a$ and provides the simulated rotational angle signal $\theta_a$. The mechanical system simulating circuit 6a approximates the torque transmission characteristics of the mechanical system to ideal integration elements, disregarding mechanical resonance.

The second position control circuit 7 and the second speed control circuit 10a, which are the same in configuration as the first position control circuit 5 and the first speed control circuit 9, respectively, control the mechanical system simulating circuit 6a. The second speed control circuit 10a gives the second torque signal $\tau_2$ to the mechanical system simulating circuit 6a. The respective gains of the second position control circuit 7 and the second speed control circuit 10a are determined so that desired response frequencies are set for the second position control circuit 7 and the second speed control circuit 10a. When the dc motor 1a is controlled so that the output torque thereof coincides with a torque signal obtained by adding a first torque signal $\tau_1$ provided by the first speed control circuit 9 and the second torque signal $\tau_2$ provided by the second speed control circuit 10a, speed control can be carried out at a high response speed even if the response frequency of the first speed control circuit 9 is reduced to avoid the generation of vibrations by mechanical resonance, because a torque necessary for controlling the operating speed of the dc motor 1a at a desired response frequency is specified by the second torque signal $\tau_2$. Thus, the second speed control circuit 10a provides the second torque signal $\tau_2$ in a feed-forward control mode on the basis of the simulated speed signal $\omega_a$ provided by the mechanical system simulating circuit 6a which is not affected by the vibration characteristics of the actual mechanical system.

Similarly, the response characteristics of position control can be improved by giving a third speed signal $\omega_3$ obtained by adding a first speed signal $\omega_1$ provided by the first position control circuit 5 and the second speed signal $\omega_2$ provided by the second position control circuit 7 by the adder 8 to the first speed control circuit 9.

The mechanical system simulating circuit 6a, the second position control circuit 7 and the second speed control circuit 10a provides the second speed signal $\omega_2$ and the second torque signal $\tau_2$ according to the variation of a rotational angle command signal $\theta_{ms}$ to improve the response characteristics of position control.

On the other hand, the simulated speed signal $\omega_a$ and the simulated rotational angle signal $\theta_a$ provided by the mechanical system simulating circuit 6a do not change even if a load torque applied to the load machine 3 varies. Accordingly, the response characteristics of position control related with the variation of the load torque cannot be improved by the mechanical system simulating circuit 6a, the second position control circuit 7 and the second speed control circuit 10a.

To enable the improvement of the response characteristics of position control, the position controller is provided additionally with the third speed control circuit 11a, which provides a third torque signal $\tau_3$ on the basis of the mechanical system simulating circuit 6a, the actual speed signal $\omega_a$ and the actual speed signal $\omega_m$ provided by the rotation detector 4. The variation of the load torque entails the variation of the actual speed signal $\omega_m$, causing the third torque signal $\tau_3$ to change. Accordingly, the response characteristics of position control in relation with the variation of the load torque are controlled by controlling the dc motor 1a so that the output torque of the dc motor 1a coincides with a torque signal obtained by adding the first torque signal $\tau_1$ provided by the first speed control circuit 9, the second torque signal $\tau_2$ provided by the second speed control circuit 10a and the third torque signal $\tau_3$ provided by the third speed control circuit 11a.

The first position control circuit 5 and the first speed control circuit 9 suppress vibrations produced by mechanical resonance and reduce steady-state errors in position and speed when the load torque is stationary. The third speed control circuit 11a operates further for suppressing the variation of response that will occur when the integration time constant, i.e., the moment of inertia, of the mechanical system simulating circuit 6a differ from the actual value. The operation of the position controller in the first embodiment will be described hereinafter with reference to FIGS. 2 to 9.

In the first position control circuit 5 shown in FIG. 3, the coefficient multiplier 24 provides the first speed signal $\omega_1$. The subtracter 23 subtracts the actual rotational angle $\theta_m$ applied to the input terminal 22 by the rotation detector 4 from the rotational angle command signal $\theta_{ms}$ applied to the input terminal 21 by the rotational angle command signal generating circuit 15 to determine the first rotational angle deviation $\Delta\theta_1$. ($=\theta_{ms}-\theta_m$) and gives the first rotational angle deviation $\Delta\theta_1$ to the coefficient multiplier 24, and then the coefficient multiplier 24 determines the first speed signal $\omega_1$ and sends out the same through the output terminal 25.

In the mechanical system simulating circuit 6a shown in FIG. 4, the integrator 27 provides the simulated speed signal $\omega_a$ and the integrator 28 provides the simulated rotational angle signal $\theta_m$. When the second speed control circuit 10a applies the second torque signal $\tau_2$ to the input terminal 26, the integrator 27 connected to the input terminal 26 executes a calculation by using the expression (1) to determine the simulated speed signal $\omega_a$ and sends out the simulated speed signal $\omega_a$ through the output terminal 29. Meanwhile, when the simulated speed signal $\omega_a$ is given to the integrator 28, the integrator calculates the simulated rotational angle signal $\theta_a$ by using the expression (1) and sends out the simulated rotational angle signal $\theta_a$ through the output terminal 30.

In the second position control circuit 7 shown in FIG. 5, the coefficient multiplier 34 provides the second speed signal $\omega_2$. The subtracter 33 subtracts the simulated rotational angle signal $\theta_a$ given thereto through the input terminal 32 by the mechanical system simulating circuit 6a from the rotational angle command signal $\theta_{ms}$ given thereto through the input terminal 31 by the rotational angle command signal generating circuit 15 to determine the second rotational angle deviation $\Delta\theta_2$ ($=\theta_{ms}-\theta_a$) and gives the second rotational angle deviation $\Delta\theta_2$ to the coefficient multiplier 34. Then, the coefficient multiplier 34 determines the second speed signal $\omega_2$ and sends out the same through the output terminal 35.

Subsequently, the adder 8 shown in FIG. 2 adds the first speed signal $\omega_1$ provided by the first position control circuit 5 and the second speed signal $\omega_2$ provided by the second speed control circuit 7 to provide the speed command signal $\omega_3$ ($=\omega_1+\omega_2$).

Then, in the first speed control circuit 9 shown in FIG. 6, the control or limiting circuit 47 provides the first torque signal $\tau_1$. The subtracter 43 subtracts the actual speed signal $\omega_m$, given thereto through the input terminal 42 by the rotation detector 4, from the third speed signal $\omega_3$ given thereto through the input terminal 41 by the adder 8, to determine the first speed deviation signal $\Delta\omega_1$ ($=\omega_3-\omega_m$) and gives the first speed deviation signal $\Delta\omega_1$ to the integrator 44 and the coefficient multiplier 45. The adder 46 adds the respective outputs of the integrator 44 and the coefficient multiplier 45 to determine the first torque signal $\tau_1$ and applies the same through the limiting circuit 47 to the output terminal 48. The limiting circuit 47 limits the absolute maximum value of the first torque signal $\tau_1$ to a predetermined value.

Similarly, in the second speed control circuit 10a shown in FIG. 7, the limiting circuit 57 provides the second torque signal $\tau_2$. The subtracter 53 subtracts the simulated speed signal $\omega_a$ given thereto through the input terminal 52 by the mechanical system simulating circuit 6a from the second speed signal $\omega_2$ given thereto through the input terminal 51 by the second position control circuit 7 to determine the second speed deviation signal $\Delta\omega_2$ ($=\omega_2-\omega_a$) and gives the second speed deviation signal $\Delta\omega_2$ to the integrator 54 and the coefficient multiplier 55. Then, the adder 56 adds the respective outputs of the integrator 54 and the coefficient multiplier 55 to determine the second torque signal $\tau_2$ and applies the same through the limiting circuit 57 to the output terminal 58. The limiting circuit 57 limits the absolute maximum value of the second torque signal $\tau_2$ to a predetermined value.

Then, in the third speed control circuit 11a shown in FIG. 8, the adder 65 provides the third torque signal $\tau_3$. The subtracter 62 subtracts the actual speed signal $\omega_m$ given thereto through the input terminal 61 by the rotation detector 4 from the simulated speed signal $\omega_a$ given thereto through the input terminal 60 by the mechanical system simulating circuit 6a to determine the third speed deviation signal $\Delta\omega_3$ ($=\omega_a-\omega_m$) and gives the third speed deviation signal $\Delta\omega_3$ to the integrator 63 and the coefficient multiplier 64. Then, the adder 65 adds the respective outputs of the integrator 63 and the coefficient multiplier 64 and sends out the third torque signal $\tau_3$ through the output terminal 66.

Then, in the torque control circuit 12 shown in FIG. 9, the adder 71 provides the final torque signal $\tau_{ms}$. The adder 71 adds the first torque signal $\tau_1$ given thereto through the input terminal 70a by the first speed control circuit 9, the second torque signal $\tau_2$ given thereto through the input terminal 70b by the second speed control circuit 10a, and the third torque signal $\tau_3$ given thereto through the input terminal 70c by the third speed control circuit 11a to obtain the final torque signal $\tau_{ms}$ ($=\tau_1+\tau_2+\tau_3$) and gives the final torque signal $\tau_{ms}$ to the limiting circuit 72, which prevents the amplitude of the final torque signal from exceeding a specified value.

Then, the coefficient multiplier 73 provides an armature current command signal $I_{as}$. As is generally known, the relation between the output torque $\tau_m$ and the armature current $I_a$ is expressed by:

$$\tau_m = K_T I_a \qquad (2)$$

where $K_T$ is a torque constant.

Accordingly, when the $\tau_{ms}$ is applied to the coefficient multiplier 73 having a scale factor $K_T$, the coefficient multiplier 73 provides the armature current command signal $I_{as}$.

Subsequently, the subtracter 74 provides a current deviation signal $\Delta I$ ($I_{as} - I_a$). The subtracter 74 subtracts an actual armature current $I_a$ given thereto through the input terminal 70d by a current detector, not shown, from an armature current command signal $I_{as}$ given thereto by the coefficient multiplier 73 to determine the current deviation signal $\Delta I$ and gives the current deviation signal $\Delta I$ to the integrator 75 and the coefficient multiplier 76.

The adder 77 adds the respective outputs of the integrator 75 and the coefficient multiplier 76 to determine a terminal voltage command signal $V_{as}$ and gives the same to the PWM circuit 78.

The PWM circuit 78 provides a signal for controlling the four switching elements of the power conversion circuit 13 comprising a quadrant chopper circuit. The PWM circuit is of a known configuration and hence the description thereof will be omitted.

The power conversion circuit 13 and the PWM circuit 78 operate so that the terminal voltage $V_a$ of the dc motor 1a coincides with a specified voltage represented by the terminal voltage command signal $V_{as}$. Thus, the torque control circuit 12 and the power conversion circuit 13 operate so that the output torque $\tau_m$ of the dc motor 1a varies according to the final torque signal $\tau_{ms}$.

Second Embodiment

A position controller in a second embodiment according to the present invention will be described hereinafter with reference to FIGS. 10 to 14.

Figure 10:
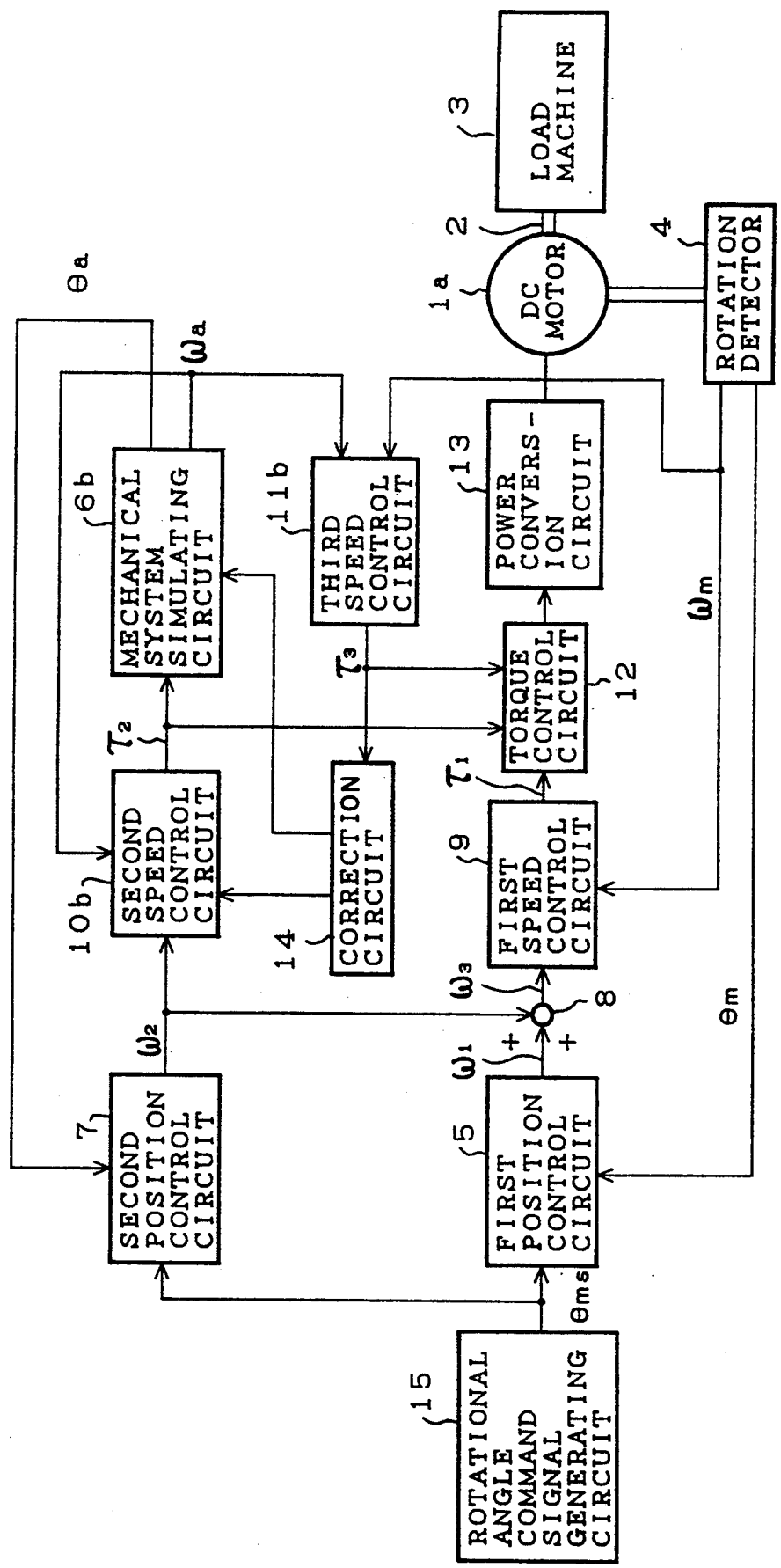
FIG. 10 is a block diagram of a position controller in a second embodiment according to the present invention.

Referring to FIG. 10, there are shown a dc motor 1a, a torque transmission mechanism 2, a load machine 3, a rotation detector 4, a first position control circuit 5, a second position control circuit 7, an adder 8, a first speed control circuit 9, a torque control circuit 12, a power conversion circuit 13 and a rotational angle command signal generating circuit 15, which are the same as those of the first embodiment.

As shown in FIG. 10, the second embodiment comprises, in addition to same components as those of the first embodiment, a mechanical system simulating circuit 6b, a second speed control circuit 10b, a third speed control circuit 11b and a correction circuit 14. A torque control means for controlling the output torque of the dc motor 1a employed in the second embodiment, similarly to the torque control means of the first embodiment, consists of the torque control circuit 12 and the power conversion circuit 13.

Figure 11:
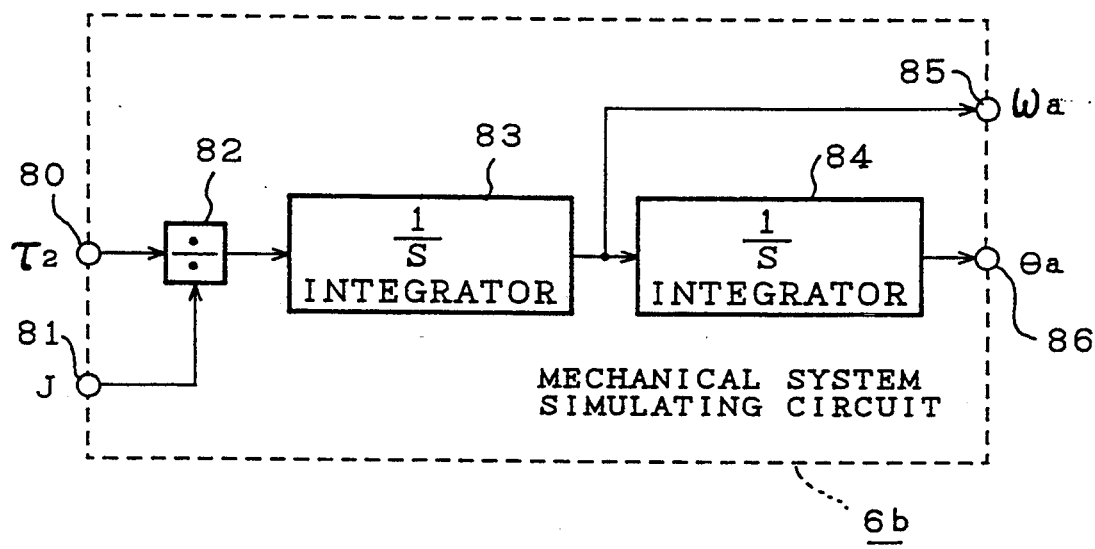
FIG. 11 is a block diagram of a mechanical system simulating circuit included in the position controller of FIG. 10.

Referring to FIG. 11, the mechanical system simulating circuit 6b comprises an input terminal 80 connected to the second speed control circuit 10b, an input terminal 81 connected to the correction circuit 14, a divider 82 connected to the input terminals 80 and 81, an integrator 83 connected to the divider 82, an integrator 84 connected to the integrator 83, an output terminal 85 connected to the integrator 83, and an output terminal 86 connected to the integrator 83.

Figure 12:
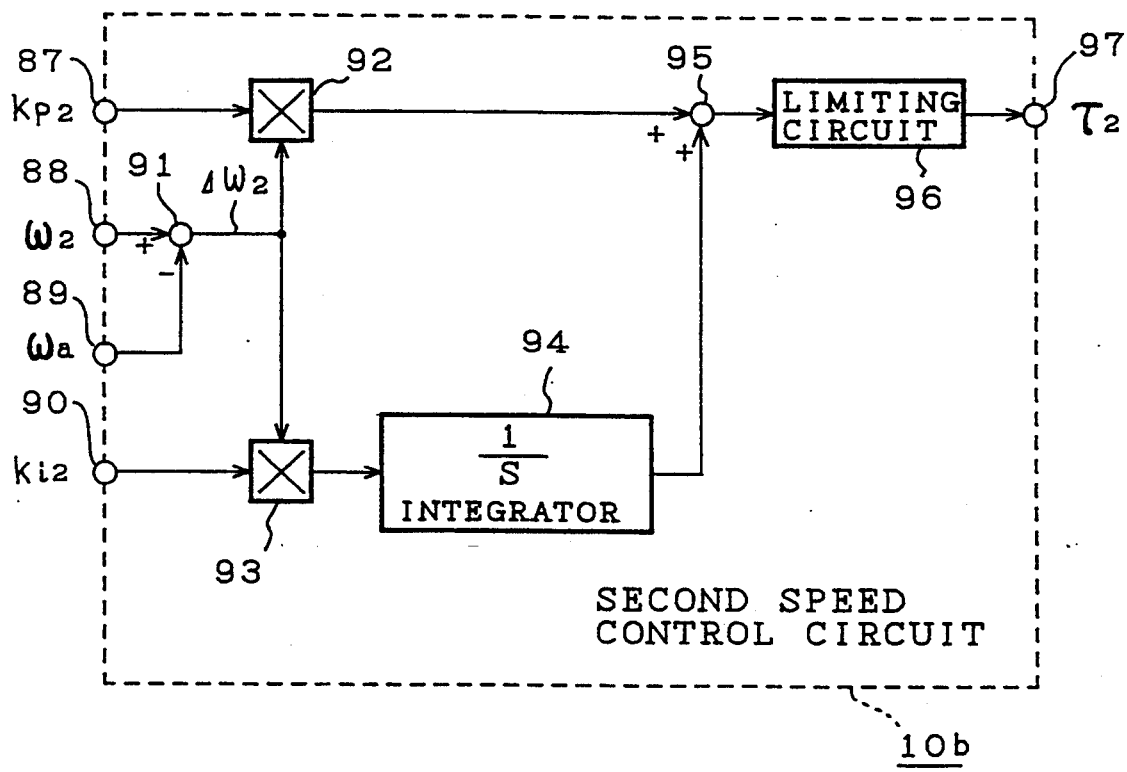
FIG. 12 is a block diagram of a second speed control circuit included in the position controller of FIG. 10.

Referring to FIG. 12, the second speed control circuit 10b comprises input terminals 87 and 90 connected to the correction circuit 14, an input terminal 88 connected to the second position control circuit 7, an input terminal 89 connected to the mechanical system simulating circuit 6b, a subtracter 91 connected to the input terminals 88 and 89, a multiplier 92 connected to the input terminal 87 and the subtracter 91, a multiplier 93 connected to the input terminal 90 and the subtracter 91, an integrator 94 connected to the multiplier 93, an adder 95 connected to the multiplier 92 and the integrator 94, a limiting circuit 96 connected to the adder 95, and an output terminal connected to the limiting circuit 96.

Figure 13:
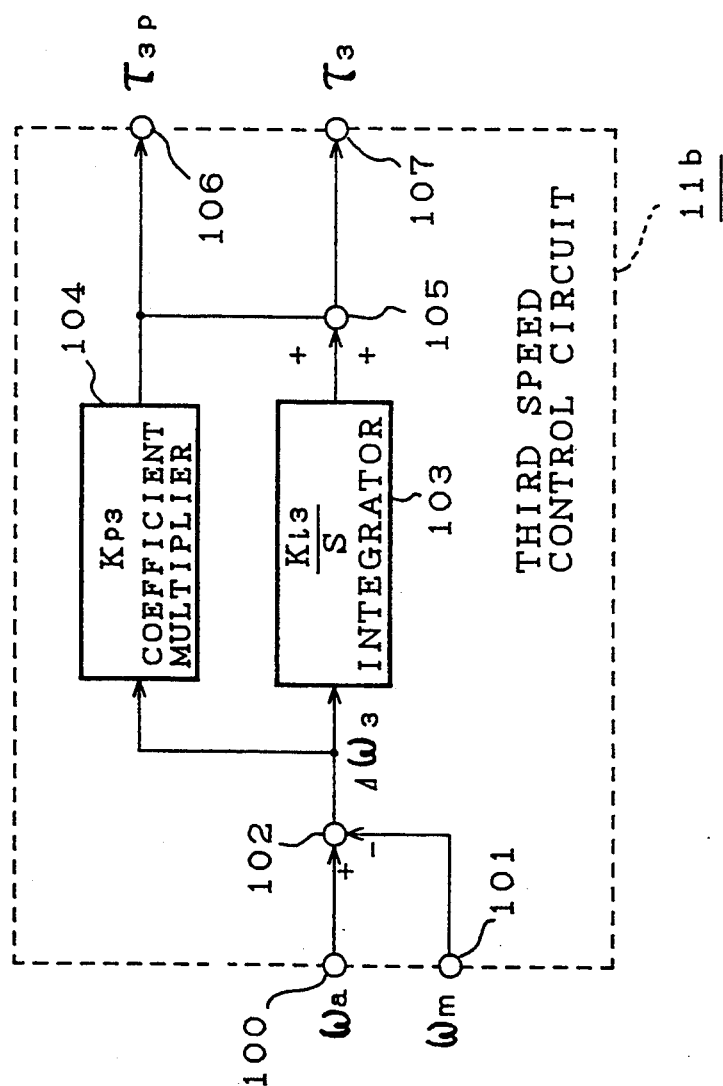
FIG. 13 is a block diagram of a third speed control circuit included in the position controller of FIG. 10.

Referring to FIG. 13, the third speed control circuit 11b comprises an input terminal 100 connected to the mechanical system simulating circuit 6b, an input terminal 101 connected to the rotation detector 4, a subtracter 102 connected to the input terminals 100 and 101, an integrator 103 connected to the subtracter 102, a coefficient multiplier 104 connected to the subtracter 102, an adder 105 connected to the integrator 103 and the coefficient multiplier 104, an output terminal 106 connected to the coefficient multiplier 104, and an output terminal 107 connected to the adder 105.

Figure 14:
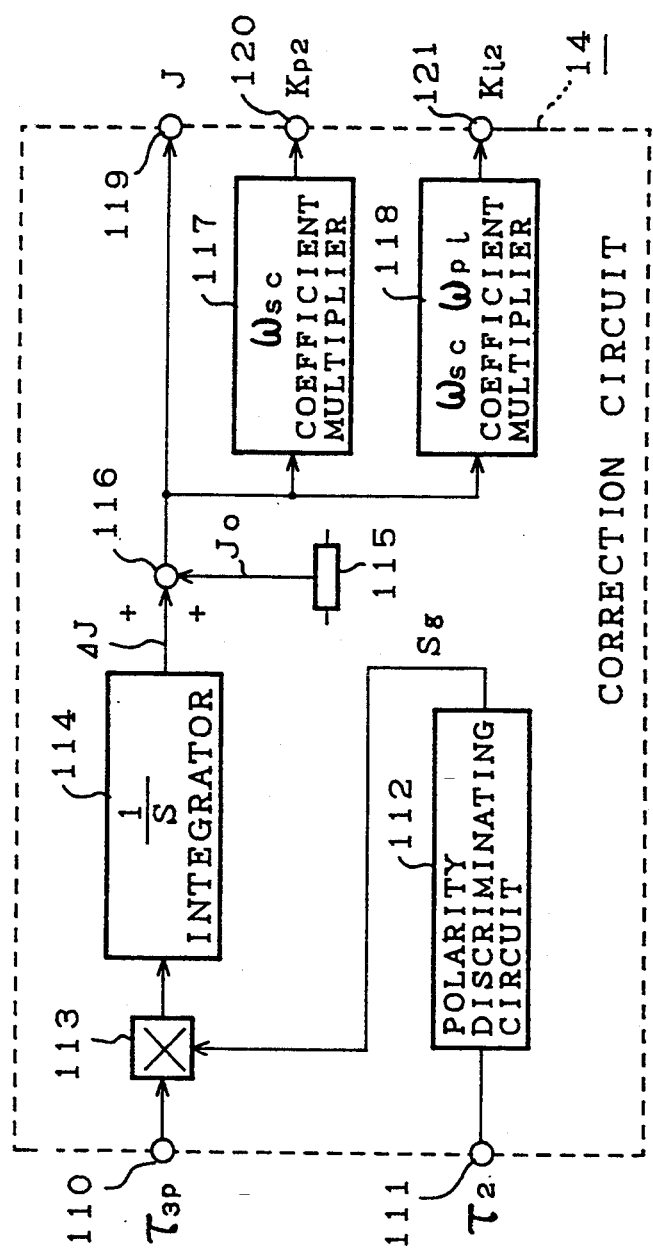
FIG. 14 is a block diagram of a correction circuit included in the position controller of FIG. 10.

Referring to FIG. 14, the correction circuit 14 comprises an input terminal 110 connected to the third speed control circuit 11b, an input terminal 111 connected to the second speed control circuit 10b, a polarity discriminating circuit 112 connected to the input terminal 111, a multiplier 113 connected to the input terminal 111 and the polarity discriminating circuit 112, an integrator 114 connected to the multiplier 113, a constant setting unit 115, an adder 116 connected to the integrator 114 and the constant setting unit 115, coefficient multipliers 117 and 118 connected to the adder 116, an output terminal 119 connected to the adder 116, an output terminal 120 connected to the coefficient multiplier 117, and an output terminal 121 connected to the coefficient multiplier 118.

Figure 15:
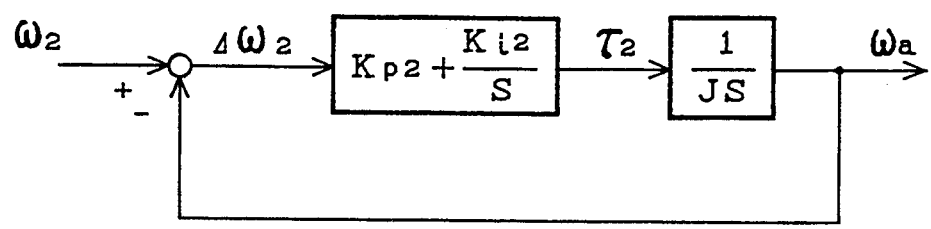
FIG. 15 is a block diagram of a speed control system comprising the second speed control circuit and the mechanical system simulating circuit, included in the position controller of FIG. 10.

A method of setting gains $K_{p2}$ and $K_{i2}$ for the second speed control circuit 10b will be described hereinafter with reference to FIGS. 15 and 16. FIG. 15 is a block diagram of a speed control system consisting of the second speed control circuit 10b and the mechanical system simulating circuit 6b. In FIG. 15, $K_{p2}$ and $K_{i2}$ are the proportional gain and integral gains, respectively, of the second speed control circuit 10b, and, as mentioned above, J is the integration time constant, i.e., the moment of inertia, of the mechanical system simulating circuit 6b. As shown in FIG. 15, the relation between the second speed signal $\omega_2$ and the simulated speed signal $\omega_a$ is expressed by the following transfer function.

$$\omega_a/\omega_2 = (K_{p2}S + K_{i2})/(JS^2 + K_{p2}S + K_{i2}) \qquad (3)$$

Figure 16:
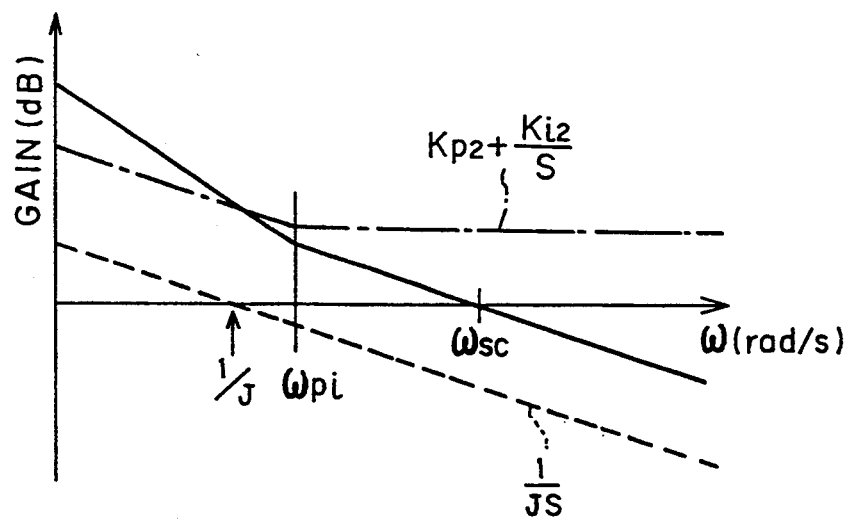
FIG. 16 is a Bode diagram for the speed control system of FIG. 15.

In a gain diagram shown in FIG. 16, continuous lines represent the approximation of the open-loop transfer function: $(K_{p2} + K_{i2}/S)(1/J_s)$ for the speed control system of FIG. 15, dotted lines represent the transfer function: $1/J_s$ for the mechanical system simulating circuit 6b, and alternate long and short dash lines represent the transfer function: $(K_{p2} + K_{i2}/S)$ for the second speed control circuit 10b. In FIG. 16, $\omega_{sc}$ is the response frequency of the speed control system of FIG. 15. A frequency $\omega_{pi}$ will be designated as a PI break point frequency. Generally, the PI break point frequency $\omega_{pi}$ is a fraction of the response frequency $\omega_{sc}$. The response frequency $\omega_{sc}$ and the PI break point frequency $\omega_{pi}$ are set to set the gains $K_{p2}$ and $K_{i2}$ of the second speed control circuit 10b by using the following expressions.

$$K_{p2}=J\omega_{sc}, \; K_{i2}=\omega_{pi}K_{p2}=J\omega_{sc}\omega_{pi} \qquad (4)$$

It is understood from the expression (4) that the gains $K_{p2}$ and $K_{i2}$ of the second speed control circuit 10b can be determined if the moment J of inertia is known. The respective gains of the first speed control circuit 9 and the third speed control circuit 11a can be determined by the same method. When the gains $K_{p2}$ and $K_{i2}$ of the second speed control circuit 10b are determined by using the expression (4), the response of the simulated speed signal $\omega_a$ to the stepwise change of the second speed signal $\omega_2$ can be determined by using the expression (3). Practically, the value of the PI break point frequency $\omega_{pi}$ is determined to adjust the overshoot of the response of the simulated speed signal $\omega_a$ to a desired value. Ordinarily, as mentioned above, the PI break point frequency $\omega_{pi}$ is a fraction of the response $\omega_{sc}$.

A method of correcting the integration time constant J of the mechanical system simulating circuit 6b of the second embodiment will be described hereinafter with reference to FIG. 17. Suppose that the gain $K_1$ of the first position control circuit 5 is smaller than the gain $K_2$ of the second position control circuit 7. Then, the third speed signal $\omega_3$ given to the first speed control circuit 9 may be considered to coincide with the second speed signal $\omega_2$, because the amplitude of the first speed signal $\omega_1$ provided by the first position control circuit 5 is negligibly small as compared with that of the second speed signal $\omega_2$ provided by the second position control circuit 7; that is, the second speed signal $\omega_2$ is given as a speed command signal to the first speed control circuit 9 and the second speed control circuit 10b. If the integration time constant J of the mechanical system simulating circuit 6b is different from the moment of inertia of the actual mechanical system, the variation of the actual speed signal $\omega_m$ in response to the variation of the second speed signal $\omega_2$, and the variation of the simulated speed signal $\omega_a$ in response to the variation of the second speed signal $\omega_2$ are not equal to each other and the third speed deviation signal $\Delta\omega_3 \; (=\omega_a-\omega_m)$ is not zero.

Figure 17A:
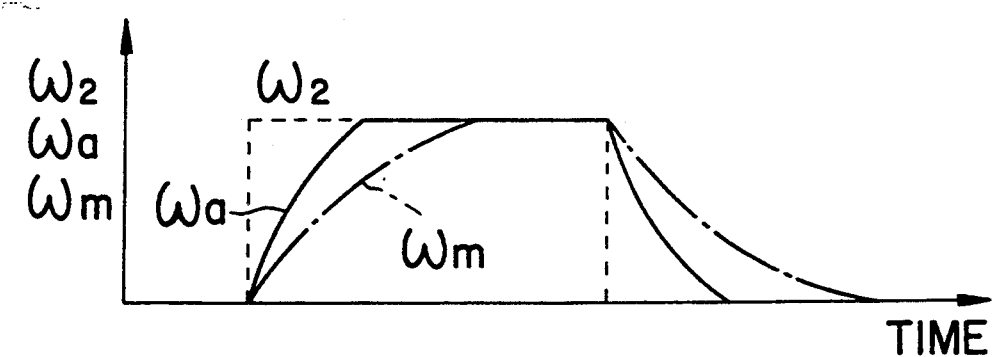
FIGS. 17(a) and 17(b) are diagrams of assistance in explaining the principle on which the operation of the second correction circuit of FIG. 14 is based.
Figure 17B:
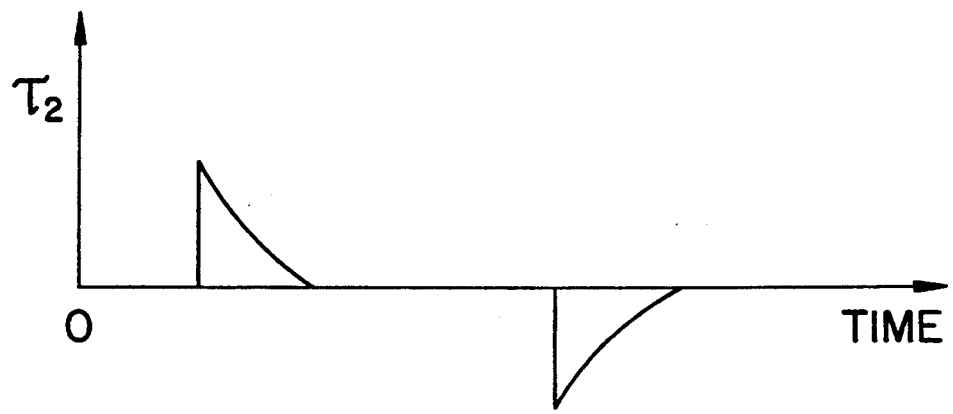

For example, if the integration time constant J of the mechanical system simulating circuit 6b is smaller than the moment of inertia of the actual mechanical system, the variation of the actual speed signal $\omega_m$ in response to the variation of the second speed signal $\omega_2$ lags behind the variation of the simulated speed signal $\omega_a$ in response to the variation of the second speed signal $\omega_2$ as shown in FIG. 17(a). As is obvious from FIG. 17(a), the third speed deviation signal $\Delta\omega_3$ is positive during acceleration and is negative during deceleration. On the contrary, if the integration time constant J of the mechanical system simulating circuit 6b is greater than the moment of inertia of the actual mechanical system, the variation of the simulated speed signal $\omega_a$ in response to the variation of the second speed signal $\omega_2$ lags behind the variation of the actual speed signal $\omega_m$ in response to the variation of the second speed signal $\omega_2$. Accordingly, the third speed deviation signal $\Delta\omega$ is negative during acceleration and is positive during deceleration. Therefore, the integration time constant J of the mechanical system simulating circuit 6b is corrected so that the absolute value of the amplitude of the third speed deviation signal $\Delta\omega_3$ decreases.

The polarity of the third speed deviation signal $\Delta\omega_3$ is dependent on the mode of operation of the dc motor 1a. As is obvious from FIG. 17(b), it is possible to determine whether the dc motor 1a is accelerated or whether the dc motor 1a is decelerated through the examination of the polarity of the second torque signal $\tau_2$. That is, the second torque signal $\tau_2$ is positive during acceleration and is negative during deceleration. For example, if the third speed deviation signal $\Delta\omega_3$ is positive during acceleration, i.e., when the second torque signal $\tau_2$ is positive, the integration time constant J of the mechanical system simulating circuit 6b is increased. When the integration time constant J of the mechanical system simulating circuit 6b is thus corrected, the gains $K_{p2}$ and $K_{i2}$ of the second speed control circuit 10b can be corrected according to the moment of inertia of the actual mechanical system by using the expression (4). Although the method of correcting the integration time constant J of the mechanical system simulating circuit 6b has been described for a case where the gain $K_1$ of the first position control circuit 5 is small as compared with the gain $K_2$ of the second position control circuit 7, the integration time constant J of the mechanical system simulating circuit 6b and the gains $K_{p2}$ and $K_{i2}$ of the second speed control circuit 10b can be corrected by the same method, because the third speed deviation signal $\Delta\omega_3$ is not zero when the integration time constant J of the mechanical system simulating circuit 6b is different from the moment of inertia of the actual mechanical system.

The operation of the second embodiment will be described hereinafter with reference to FIGS. 10 to 14. The respective modes of operation of the components in the second embodiment excluding the mechanical system simulating circuit 6b, the second speed control circuit 10b, the third speed control circuit 11b and the correction circuit 14 are the same as those of operation of the components of the first embodiment and hence the description thereof will be omitted.

Referring to FIG. 13, in the third speed control circuit 11b, the subtracter 102 provides the third speed deviation signal $\Delta\omega_3$. That is, the subtracter 102 subtracts the actual speed signal $\omega_m$ given thereto through the input terminal 101 by the rotation detector 4 from the simulated speed signal $\omega_a$ given thereto through the input terminal 100 by the mechanical system simulating circuit 6b to determine the third speed deviation signal $\Delta\omega_3 \; (=\omega_a-\omega_m)$.

Then, the adder 105 sends the third torque signal $\tau_3$ through the output terminal 107. That is, the adder 105 adds the output of the integrator 103 and the output of the coefficient multiplier 104 to determine the third torque signal $\tau_3$ and sends out the third torque signal $\tau_3$ through the output terminal 107. A torque signal $\tau_{3p}$ having an amplitude proportional to that of the third speed deviation signal $\Delta\omega_3$ provided by the coefficient multiplier 104 appears at the output terminal 106.

Then, in the correction circuit 14 shown in FIG. 14, the adder 116 provides the integration time constant J, i.e., the moment of inertia, of the mechanical system simulating circuit 6b. That is, the second speed control circuit 10b gives the second torque signal $\tau_2$ through the input terminal 111 to the polarity discriminating circuit 112, and the polarity discriminating circuit 112 provides a polarity signal $S_g$. The polarity signal $S_g$ is "1" when the second torque signal $\tau_2$ is positive and is "−1" when the second torque signal $\tau_2$ is negative. Then, the multiplier 113 multiplies the torque signal $\tau_{3p}$ given thereto through the input terminal 110 by the third speed control circuit 11b by the polarity signal $S_g$ and gives the product to the integrator 114. The adder 116 adds a correction $\Delta J$ for correcting the moment of inertia J provided by the integrator 114 and a set value $J_0$ of moment of inertia set by the constant setting unit 115 to determine the moment J of inertia and sends out the moment J of inertia through the output terminal 119. The set value $J_0$ of moment of inertia is equal to, for example, the moment of inertia of the dc motor 1a.

The correction circuit 14 provides also the gains $K_{p2}$ and $K_{i2}$ of the second speed control circuit 10b. That is, when the moment J of inertia is given to the coefficient multipliers 117 and 118, the gains $K_{p2}$ and $K_{i2}$ are calculated by using the expression (4) and are sent out respectively through the output terminals 120 and 121.

Then, in the mechanical system simulating circuit 6b shown in FIG. 11, the integrator 83 provides the simulated speed signal $\omega_a$. The divider 82 receives the second torque signal $\tau_2$ through the input terminal 80 from the second speed control circuit 10b and the moment J of inertia through the input terminal 81 from the correction circuit 14, the output of the divider 82 is given to the integrator 83, and the integrator 83 integrates the second torque signal $\tau_2$ and sends out the simulated through the output terminal 85. The simulated speed signal $\omega_a$ is obtained by integrating the second torque signal $\tau_2$ by the integrator 83 having an integration time constant equal to the moment J of inertia.

Subsequently, the simulated speed signal $\omega_a$ is given to the integrator 84. Then, the integrator 83 determines a simulated rotation angle $\theta_a$ and sends out the same through the output terminal 86.

Then, in the second speed control circuit 10b shown in FIG. 12, the control circuit 96 provides the second torque signal $\tau_2$. The subtracter 91 subtracts the simulated speed signal $\omega_a$ given thereto through the input terminal 89 by the mechanical system simulating circuit 6b from the second speed signal $\omega_2$ given thereto through the input terminal 88 by the second position control circuit 7 to determine a second speed deviation signal $\Delta\omega_2$ ($=\omega_2-\omega_a$). Then, the multiplier 92 multiplies the second speed deviation signal $\Delta\omega$ by the proportional gain $K_{p2}$ given thereto through the input terminal 87 by the correction circuit 14. The multiplier multiplies the second speed deviation signal $\Delta\omega_2$ by the integral gain $K_{i2}$ and gives the product to the integrator 94. Then, the adder 95 adds the output of the multiplier 92 and the output of the integrator 94 to determine the second torque signal $\tau_2$, and the second torque signal $\tau_2$ is transferred through the limiting circuit 96 to the output terminal 97. The limiting circuit 96 prevents the amplitude of the absolute value of the second torque signal $\tau_2$ from exceeding a specified value.

Third Embodiment

Although the third speed signal $\omega_3$ is determined by adding the first speed signal $\omega_1$ and the second speed signal $\omega_2$ by the adder 8 in the first and second embodiments, the third speed signal may be determined by adding a weighted second speed signal obtained by weighting the second speed signal $\omega_2$ by a coefficient multiplier having a scale factor in the range of 0 to 1, and the first speed signal $\omega_1$.

Fourth Embodiment

In the second embodiment shown in FIG. 2, the actual Speed signal $\omega_m$ provided by the rotation detector 4 changes when a load torque is applied to the load machine 3, because the operating speed of the dc motor 1a changes, whereas the simulated speed signal $\omega_a$ provided by the mechanical system simulating circuit 6b receiving the second torque signal $\tau_2$ from the second speed control circuit 10b does not change because the actual speed signal $\omega_m$ is not applied to the second speed control circuit. Therefore, the amplitude of the third speed deviation signal $\Delta\omega_3$, i.e., the difference between the simulated speed signal $\omega_a$ and the actual speed signal $\omega_m$, is not zero when the load torque is applied to the load machine 3 and, consequently, it is possible that the correction circuit 14 corrects the moment of inertia of the mechanical system simulating circuit 6b, i.e., the integration time constant, incorrectly.

In such a case, a decision about whether or not the correction of the moment of inertia by the correction circuit 14 is to be performed may be made with reference to the amplitude of the second torque signal $\tau_2$. That is, the moment of inertia may be corrected only when the absolute value of the second torque signal $\tau_2$ is greater thaw a specified value, because the second torque signal $\omega_2$ changes only when the rotational angle command signal $\theta_{ms}$ changes.

If the operation of the correction circuit 14 is controlled by such a method, the moment of inertia is corrected only during acceleration and during deceleration. Since the load torque acting on an electric motor, in general, rarely changes suddenly during acceleration and during deceleration, the moment of inertia can be properly corrected and hence the gain of the second speed control circuit can be properly corrected by controlling the correction circuit 14 by such a method, even when a load torque is applied to the load machine 3.

Fifth Embodiment

Although the second to fourth embodiments correct only the gain of the second speed control circuit 10b according to the moment of inertia of the mechanical system simulating circuit 6b, the gain of the first speed control circuit 9 or the third speed control circuit 11b may be corrected as well as the gain of the second speed control circuit 10b.

Sixth Embodiment

Although the foregoing embodiments are described as applied to controlling the dc motor 1a, the present invention may be applied to controlling an electric motor other than the dc motor 1a, such as an induction motor or a synchronous motor. Since the output torque of an ac motor can be controlled at a high response speed as high as the response speed in controlling a dc motor by a known vector control method, it is easy to control the output torque of an ac motor so that the output torque varies according to the final torque signal $\tau_{ms}$.

Figure 18:
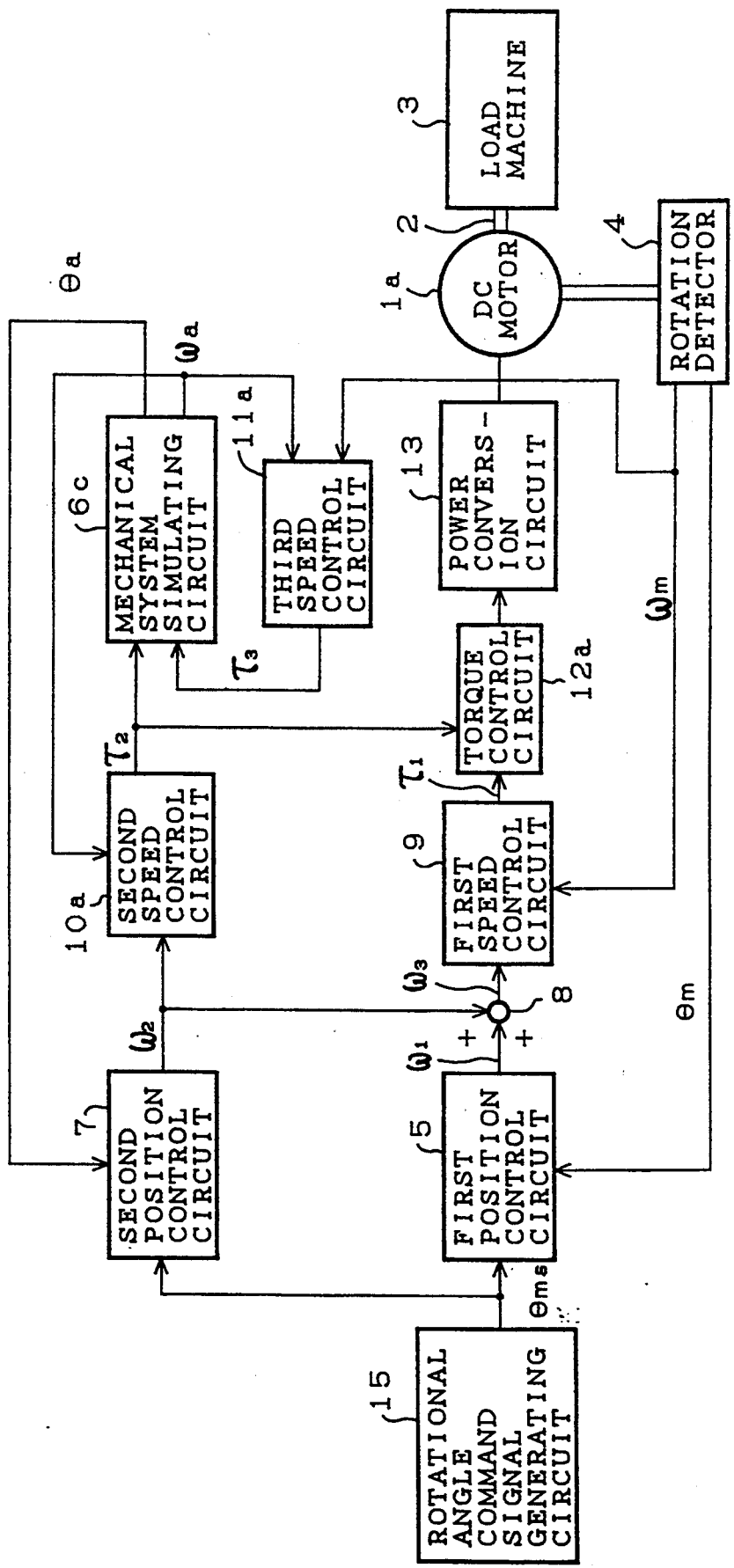
FIG. 18 is a block diagram of position controller in a sixth embodiment according to the present invention.

A position controller in a sixth embodiment according to the present invention will be described hereinafter with reference to FIGS. 18 to 20. As shown in FIG. 18, the sixth embodiment is the same in components and configuration as the first embodiment, except that the sixth embodiment employs a mechanical system simulating circuit 6c and a torque control circuit 12a which are different from those of the first embodiment. The torque control means of the sixth embodiment for controlling the torque of a dc motor 1a comprises a torque control circuit 12a and a power conversion circuit 13.

Figure 19:
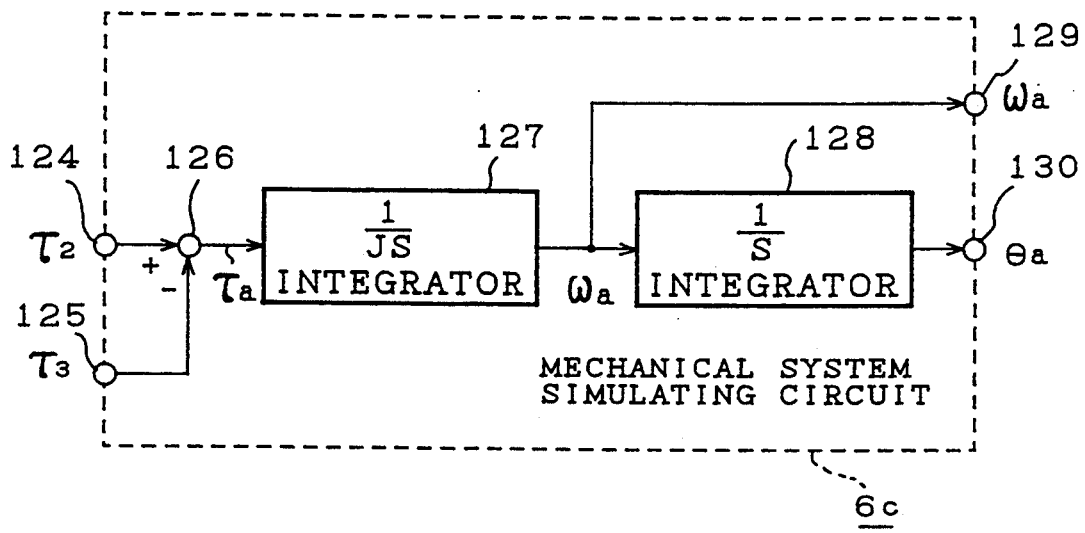
FIG. 19 is a block diagram of a mechanical system simulating circuit included in the position controller of FIG. 18.

Referring to FIG. 19, the mechanical system simulating circuit 6c comprises an input terminal 124 connected to a second speed control circuit 10a, an input terminal 125 connected to a third speed control circuit 11a, a subtracter 126 connected to the input terminals 124 and 125, an integrator 127 connected to the subtracter 126, an integrator 128 connected to the integrator 127, an output terminal 129 connected to the integrator 127, and an output terminal 130 connected to the integrator 128.

Figure 20:
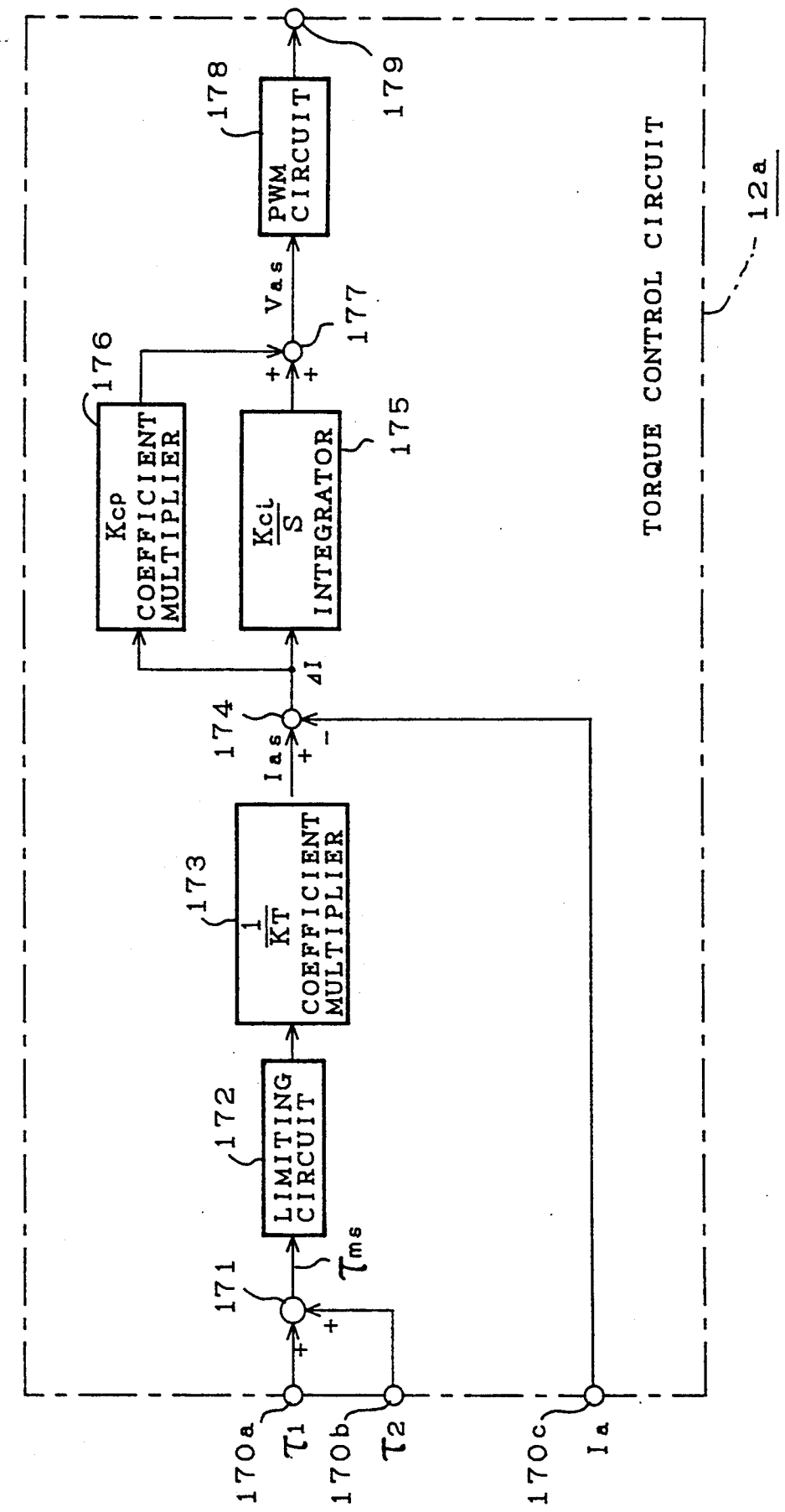
FIG. 20 is a block diagram of a torque control circuit included in the position controller of FIG. 18.

Referring to FIG. 20, the torque control circuit 12a comprises an input terminal 170a connected to a first speed control circuit 9, an input terminal 170b connected to a second speed control circuit 10a, an input terminal 170c connected to a current detector, not shown, an adder 171 connected to the input terminals 170a and 170b, a limiting circuit connected to the adder 171, a coefficient multiplier 173 connected to the limiting circuit 172, a subtracter 174 connected to the input terminal 170 and the coefficient multiplier 173, an integrator 175 connected to the subtracter 174, a coefficient multiplier 176 connected to the subtracter 174, an adder 177 connected to the integrator 175 and the coefficient multiplier 176, a PWM circuit 178 connected to the adder 177, and an output terminal 179 connected to the PWM circuit 178.

Prior to the description of the operation of the sixth embodiment, the principle of a method of controlling the rotational angle, i.e., the position, of the dc motor 1a according to the present invention will be described. First a control system shown in FIG. 18, excluding the mechanical system simulating circuit 6c, the second position control circuit 7, the second speed control circuit 10a and the third speed control circuit 11a will be described.

The control system, as mentioned above, is a common position control system having a speed control loop as a minor loop. As is generally known, if the rigidity of a torque transmission mechanism 2 shown in FIG. 18 is relatively low, large vibrations are produced by mechanical resonance when the gain of the first speed control circuit 9 is increased to increase the response speed of speed control. Under such circumstances, it is difficult to increase the response frequency of the speed control loop, i.e., the minor loop, and hence it is difficult to increase the response frequency of the position control loop.

An actual rotational angle signal $\theta_m$ representing an actual rotational angle of the dc motor 1a and an actual speed signal $\omega_m$ representing an actual operating speed of the dc motor 1a provided by the rotation detector are given respectively to the first position control circuit 5 and the first speed control circuit 9. If these signals include vibration components produced by mechanical resonance, the vibration components are amplified by the first position control circuit 5 and the first speed control circuit 9, which makes it difficult to increase the respective response frequencies of the position and speed control loops.

To solve such a problem, the present invention employs a feed-forward control method. The mechanical system simulating circuit 6c approximates the mechanical system comprising the dc motor 1a, the torque transmission mechanism 2 and a load machine 3 by two integration elements according to the expression (1).

The mechanical system simulating circuit 6c comprises an integrator 127 that integrates a simulated torque signal $\tau_a$, which will be described later, and provides a simulated speed signal $\omega_a$, and an integrator 128 that integrates the simulated speed signal $\omega_a$ and provides a simulated rotational angle signal $\theta_a$. The mechanical system simulating circuit 6c is a circuit approximating speed transfer characteristics for the torque of the mechanical system by ideal integration elements disregarding mechanical resonance. In the expression (1) J is the moment of inertia of the mechanical system.

A second position control circuit 7 and a second speed control circuit 10a, which are similar to the first position control circuit 5 and the first speed control circuit 9 in configuration, controls the mechanical system simulating circuit 6c. The second speed control circuit 10a gives a second torque signal $\tau_2$ as the simulated torque signal $\tau_a$ to the mechanical system simulating circuit 6c. The gains of the second position control circuit 7 and the second speed control circuit 10a are determined so that the second position control circuit 7 and the second speed control circuit 10a have the desired response frequency. When the output torque of the dc motor 1a is controlled so as to coincide with a torque signal obtained by adding a first torque signal $\tau_1$ provided by the first speed control circuit 9 and the second torque signal $\tau_2$ provided by the second speed control circuit 10a, speed control can be achieved at a high response speed even if the response frequency of the first speed control circuit 9 is reduced to avoid the generation of vibrations by mechanical resonance, because a torque necessary for controlling the operating speed of the dc motor 1a at a desired response frequency is determined by the second torque signal $\tau_2$. That is, the second speed control circuit 10a provides the second torque signal $\tau_2$ for feed-forward control on the basis of the simulated speed signal $\omega_a$ provided by the mechanical system simulating circuit 6c which is not affected by the vibration characteristics of the actual mechanical system.

Figure 1:
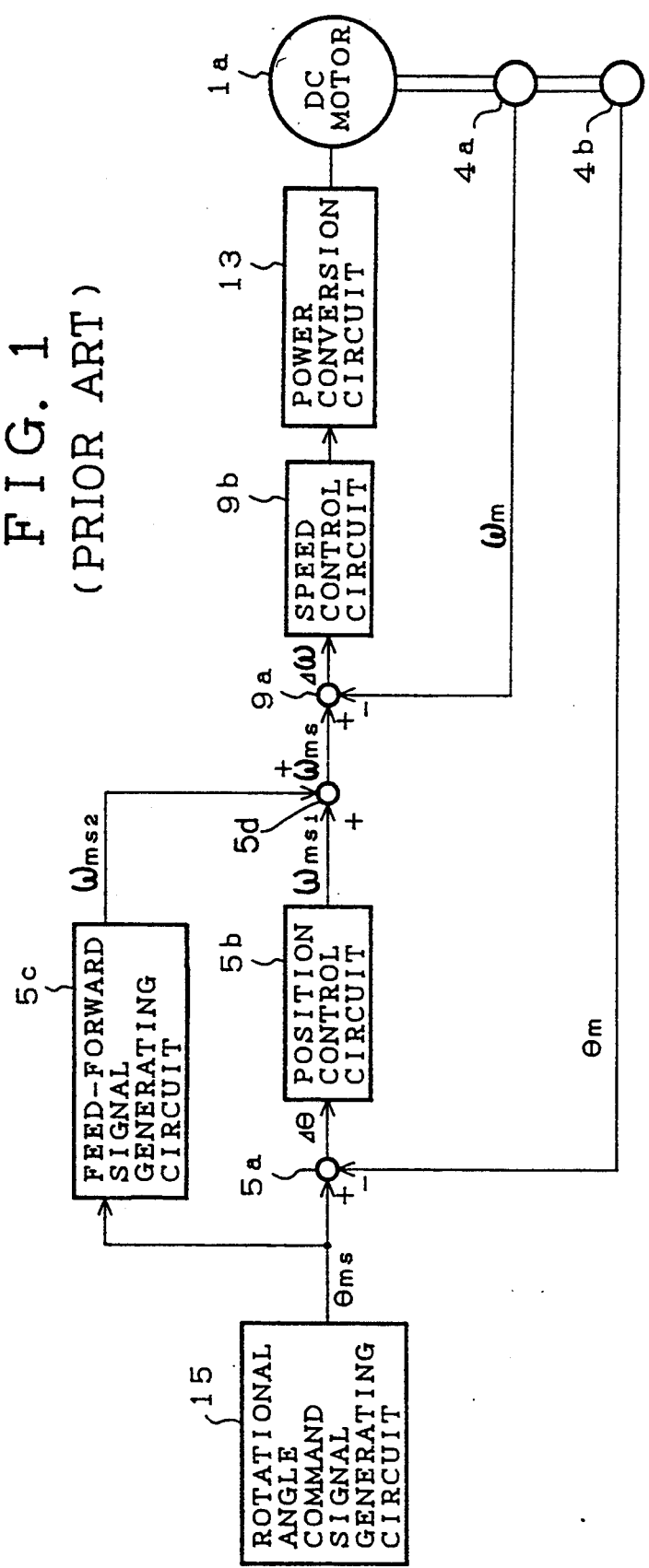
FIG. 1 is a block diagram of a prior art position controller for controlling an electric motor.

Similarly, the response frequency of position control can be increased by giving a third speed signal $\omega_3$ obtained by adding a first speed signal $\omega_1$ provided by a first position control circuit 5 and a second speed signal $\omega_2$ provided by a second position control circuit 7 by an adder 8 to the first speed control circuit 9. Thus, the function of the second speed signal $\omega_2$ is the same as that of the feed-forward speed signal $\omega_{ms2}$ used by the prior art position controller shown in FIG. 1.

Thus, the second position control circuit 7 and the second speed control circuit 10a provides the second speed signal $\omega_2$ and the second torque signal $\tau_2$ for feed-forward control according to the change of the speed command signal $\omega_{ms}$, so that the response of position control can be improved.

On the other hand, when a load torque acts on the load machine 3, the simulated speed signal $\omega_a$ and the simulated rotational angle signal $\theta_a$ provided by the mechanical system simulating circuit 6c do not change even if the load torque changes. Accordingly, response to the change of the load torque can be improved by the simulated mechanical system simulating circuit 6c, the second position control circuit 7 and the second speed control circuit 10a.

Figure 21:
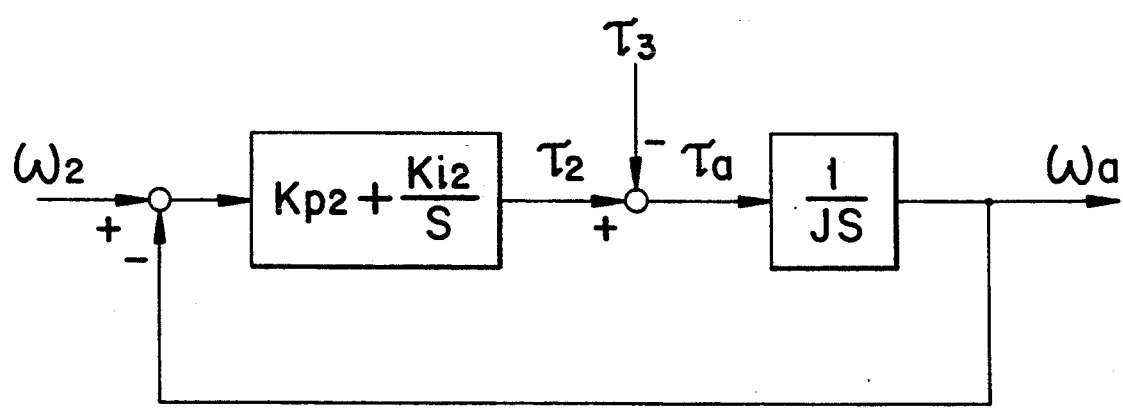
FIG. 21 is a block diagram of a speed control system comprising a second speed control circuit and the mechanical system simulating circuit, included in the position controller of FIG. 18.

The additional third speed control circuit 11a provides a third torque signal $\tau_3$ on the basis of the simulated speed signal $\omega_a$ provided by the mechanical system simulating circuit 6c and an actual speed signal $\omega_m$ provided by a rotation detector 4. The actual speed signal $\omega_m$ changes when the load torque changes and hence the third torque signal $\tau_3$ changes accordingly. Referring to FIG. 21 showing a speed control system consisting of the mechanical system simulating circuit 6c and the second speed control circuit 10a, the simulated torque signal $\tau_a$ given to the mechanical system simulating circuit 6c is the difference between the second torque signal $\tau_2$ and the third torque signal $\tau_3$ ($\tau_2 - \tau_3$). The relation between the third torque signal $\tau_3$ and the second torque signal $\tau_2$ is expressed by the following transfer function.

$$\tau_2/\tau_3 = (K_{p2}S + K_{i2})/(JS^2 + K_{p2}S + K_{i2}) \quad (5)$$

It is known from the expression (5) that the second torque signal $\tau_2$ changes if the third torque signal $\tau_3$ changes. Therefore, the response characteristics of position control according to the change of the load torque can be improved by controlling the output torque of the dc motor 1a so that the output torque of the dc motor 1a coincides with a torque signal obtained by adding the first torque signal $\tau_1$ provided by the first speed control circuit 9 and the second torque signal $\tau_2$ provided by the second control circuit 10a.

The expression (5) showing the transfer function expressing the relation between the third torque signal $\tau_3$ and the second torque signal $\tau_2$ has the characteristics of a secondary low-pass filter. Therefore, the vibration component of the second torque signal $\tau_2$ can be removed even if the vibration component added to the actual speed signal $\omega_m$ by mechanical resonance is amplified by the third speed control circuit 11a and the third torque signal $\tau_3$ includes a vibration component. Accordingly, the gain of the second speed control circuit 10a can be increased and hence position control can be achieved at a high response speed.

The first position control circuit 5 and the first speed control circuit 9 suppress vibrations produced by mechanical resonance and reduce steady-state errors in position and speed when the load torque is stationary to zero. The third speed control circuit 11a suppresses the change of response when the integration time constant, i.e., the moment J of inertia, of the mechanical system simulating circuit 6c differs from an actual value. The operation of the sixth embodiment will be described hereinafter with reference to FIGS. 18 to 20, in which the description of functions which are the same as those of the first embodiment will be omitted.

In the mechanical system simulating circuit 6c shown in FIG. 19, the integrator 127 provides the simulated speed signal $\omega_a$ and the integrator 128 provides the simulated rotational angle signal $\theta_a$. The subtracter 126 subtracts the third torque signal $\tau_3$ given thereto through the input terminal 125 by the third speed control circuit 11a from the second torque signal $\tau_2$ given thereto through the input terminal 124 by the second speed control circuit 10a to determine the simulated torque signal $\omega_a$. Upon the reception of the simulated torque signal $\tau_a$, the integrator 127 calculates the simulated speed signal $\omega_a$ by using the expression (1) and sends out the same through the output terminal 129. On the other hand, upon the reception of the simulated speed signal $\omega_a$, the integrator 128 calculates the simulated rotational angle $\theta_a$ by using the expression (1) and sends out the same through the output terminal 130.

Similarly, in the second speed control circuit 10a shown in FIG. 7, the limiting circuit 57 provides the second torque signal $\tau_2$. That is, the subtracter 53 subtracts the simulated speed signal $\omega_a$ given thereto through the input terminal 52 by the mechanical system simulating circuit 6c from the second speed signal $\omega_2$ given thereto through the input terminal 51 by the second position control circuit 7 to obtain the second speed signal deviation signal $\Delta\omega_2$ ($=\omega_2 - \omega_a$) and gives the same to the integrator 54 and the coefficient multiplier 55. The adder 56 adds the respective outputs of the integrator 54 and the coefficient multiplier 55 to obtain the second torque signal $\omega_2$, and sends out the same through the limiting circuit 57 and the output terminal 58. The limiting circuit 57 prevents the absolute value of the second torque signal $\tau_2$ from exceeding a specified maximum value.

Subsequently, in the third speed control circuit 11a shown in FIG. 8, the adder 65 provides the third torque signal $\omega_3$. That is, the subtracter 62 subtracts the actual speed signal $\omega_a$ given thereto through the input terminal 61 by the rotation detector 4 from the simulated speed signal $\omega_m$ given thereto through the input terminal 60 by the mechanical system simulating circuit 6c to obtain the third speed deviation signal $\omega_3$ ($=\omega_a - \omega_m$) and gives the same to the integrator 63 and the coefficient multiplier 64. The adder 65 adds the respective outputs of the integrator 63 and the coefficient multiplier 64 to obtain the third torque signal $\tau_3$ and sends out the same through the output terminal 65.

Subsequently, in the torque control circuit 12a shown in FIG. 20, the adder 171 provides the final torque signal $\tau_{ms}$. That is, the adder 171 adds the first torque signal $\tau_1$ given thereto through the input terminal 170a by the first speed control circuit 9 and the second torque signal $\tau_2$ given thereto through the input terminal 170b by the second speed control circuit 10a to obtain the final torque signal $\tau_{ms}$ ($=\tau_1 + \tau_2$) and gives the same to the limiting circuit 172. The limiting circuit 172 prevents the amplitude of the final torque signal $\tau_{ms}$ from exceeding a specified value.

Then, the coefficient multiplier 173 provides the armature current command signal $I_{as}$. As is generally known, the relation between the output torque $\tau_m$ of the dc motor 1a and the armature current $I_a$ is represented by the expression (2), in which $K_T$ is a torque constant. Therefore, when the final torque signal $\tau_{ms}$ is given to the coefficient multiplier 173 having a scale factor of $1/K_T$, the armature current command signal $I_{as}$ is determined.

Then, the subtracter 174 provides the current deviation signal $\Delta I$ ($=I_{as} - I_a$). That is, the subtracter 174 subtracts the actual armature current $I_{as}$ given thereto through the input terminal 170c by the current detector from the armature current command signal $I_{as}$ to obtain the current deviation signal $\Delta I$ and gives the same to the integrator 175 and the coefficient multiplier 176.

Then, the adder 177 provides the terminal voltage command signal $V_{as}$. That is, the adder 177 adds the respective outputs of the integrator 175 and the coefficient multiplier 176 to obtain the terminal voltage command signal $V_{as}$ and gives the same to the PWM circuit 178.

The PWM circuit 178 provides a signal for controlling the four switching elements of the power conversion circuit 13 comprising, for example, a quadrant chopper circuit on the basis of the terminal voltage command signal $V_{as}$. The PWM circuit 178 is of a known configuration and hence the description thereof will be omitted.

Then, the power conversion circuit 13 and the PWM circuit 178 operate so that the terminal voltage $V_a$ of the dc motor 1a coincides with a specified voltage represented by the terminal voltage command signal $V_{as}$. Thus, the torque control circuit 12a of FIG. 20 and the power conversion circuit 13 control the output torque $\tau_m$ of the dc motor 1a so as to coincide with a final torque represented by the final torque signal $\tau_{ms}$.

Seventh Embodiment

Figure 22:
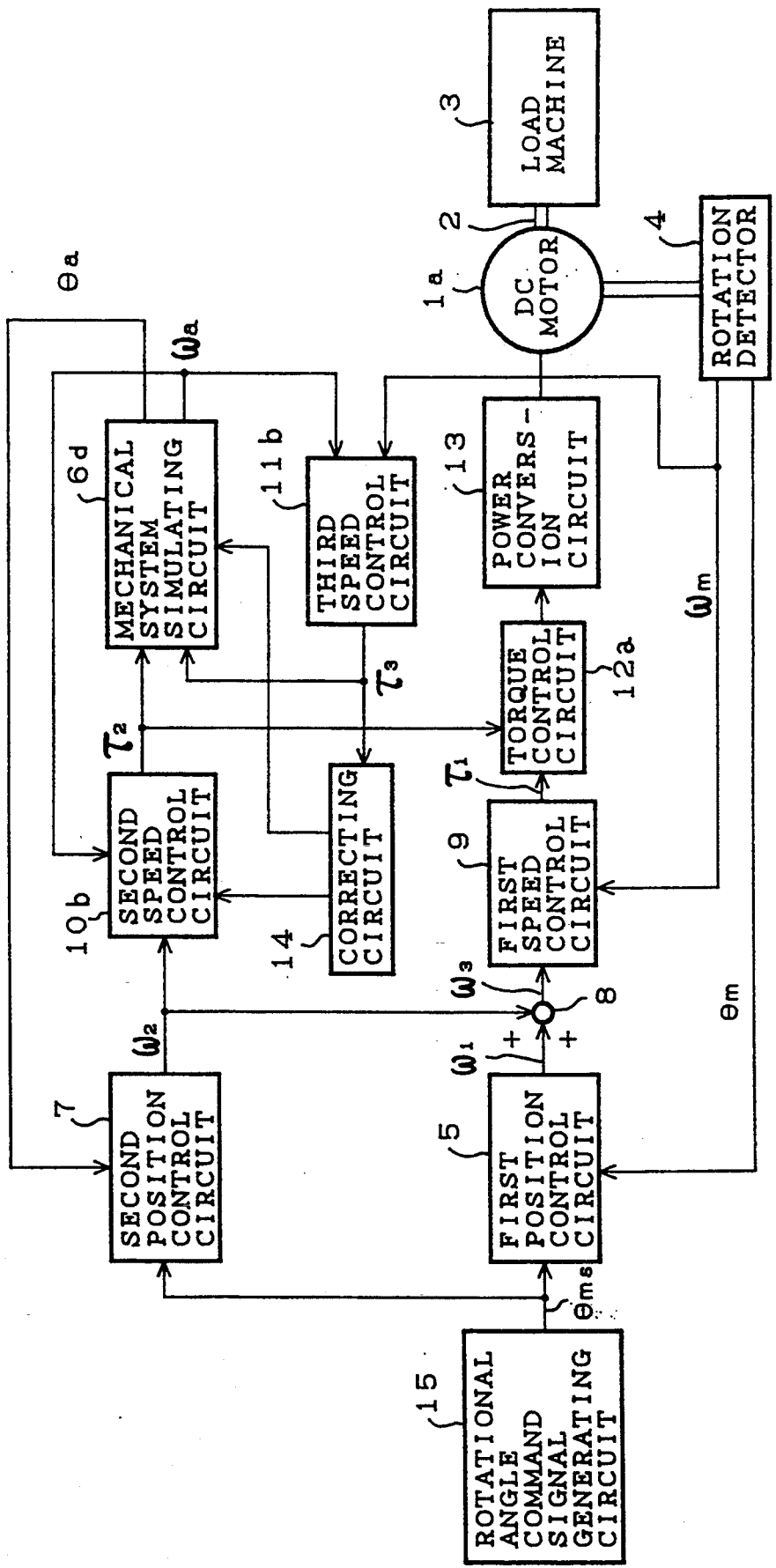
FIG. 22 is a block diagram of a position controller in a seventh embodiment according to the present invention.

A position controller in a seventh embodiment according to the present invention will be described hereinafter with reference to FIGS. 22 and 23. As shown in FIG. 22, the seventh embodiment comprises the same components as those of the foregoing embodiments, except that a mechanical system simulating circuit 6d employed in the seventh embodiment is different from those of the foregoing embodiments.

Figure 23:
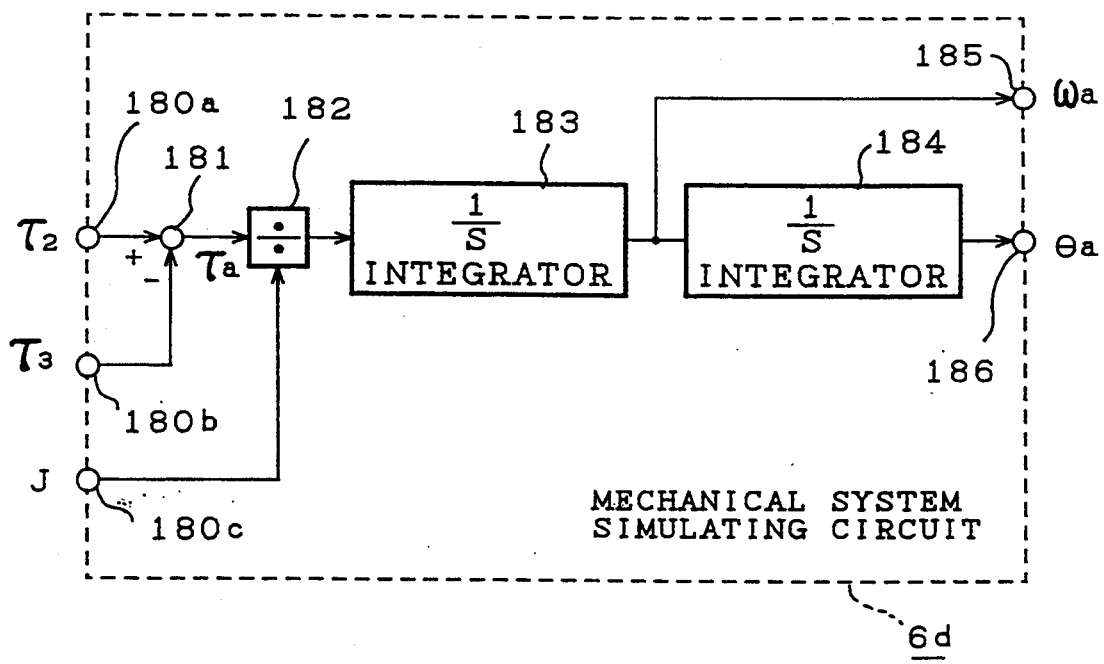
FIG. 23 is a block diagram of a mechanical system simulating circuit included in the position controller of FIG. 22.

Referring to FIG. 23, the mechanical system simulating circuit 6d comprises an input terminal 180a connected to the second speed control circuit 10b, an input terminal 180b connected to the third speed control circuit 11b, an input terminal 180c connected to the correction circuit 14, a subtracter 181 connected to the input terminals 180a and 180b, a divider 182 connected to the subtracter 181 and the input terminal 180c, an integrator 183 connected to the divider 182, an integrator 184 connected to the integrator 183, an output terminal 185 connected to the integrator 183, and an output terminal 186 connected to the integrator 184.

Referring to FIG. 12, the second speed control circuit 10b comprises input terminals 87 and 90 connected to the correction circuit 14, an input terminal 88 connected to the second control circuit 7, an input terminal 89 connected to the mechanical system simulating circuit 6d, a subtracter 91 connected to the input terminals 88 and 89, a multiplier 93 connected to the input terminal 87 and the subtracter 91, an integrator 94 connected to the multiplier 93, an adder 95 connected to the multiplier 92 and the integrator 94, a limiting circuit 96 connected to the adder 95, and an output terminal 97 connected to the limiting circuit 96.

Referring to FIG. 13, the third speed control circuit 11b comprises an input terminal 100 connected to the mechanical system simulating circuit 6d, an input terminal 101 connected to the rotation detector 4, a subtracter 102 connected to the input terminals 100 and 101, an integrator 103 connected to the subtracter 102, a coefficient multiplier 104 connected to the subtracter 102, an adder 105 connected to the integrator 103 and the coefficient multiplier 104, an output terminal 106 connected to the coefficient multiplier 104, and an output terminal 107 connected to the adder 105.

A method of setting a proportional gain $K_{p2}$ and an integral gain $K_{i2}$ for the second speed control circuit 10b will be described hereinafter with reference to FIGS. 16 and 21. FIG. 21 is a block diagram of a speed control system consisting of the second speed control circuit 10b and the mechanical system simulating circuit 6d. In FIG. 21, J is the integration time constant, i.e., the moment of inertia, of the mechanical system simulating circuit 6d. From FIG. 21, a transfer function representing the relation between the second speed signal $\omega_2$ and the simulated speed signal $\omega_a$ is expressed by the expression (3).

In the gain diagram shown in FIG. 16, continuous lines represent the approximation of an open-loop transfer function: $(K_{p2}+K_{i2}/S)(1/J_s)$ for the speed control system of the speed control system of FIG. 21. Also shown in FIG. 16 are a transfer function: $(K_{p2}+K_{i2}/S)$ for the second speed control circuit 10b and a transfer function $(1/J_s)$ for the mechanical system simulating circuit 6d. A frequency $\omega_{pi}$ will be designated as a PI break point frequency. Generally, the PI break point frequency $\omega_{pi}$ is a fraction of the response frequency $\omega_{sc}$. The response frequency $\omega_{sc}$ and the PI break point frequency $\omega_{pi}$ are set to set the gains $K_{p2}$ and $K_{i2}$ of the second speed control circuit 10b by using the expression (4).

It is understood from the expression (4) that the gains $K_{p2}$ and $K_{i2}$ of the second speed control circuit 10b determined if the moment J of inertia is known. The respective gains of the first speed control circuit 9 and the third speed control circuit 11b can be determined by the same method. When the gains $K_{p2}$ and $K_{i2}$ of the second speed control circuit 10b are determined by using the expression (4), the response of the simulated speed signal $\omega_a$ to the stepwise change of the second speed signal $\omega_2$ can be determined by using the expression (3). Practically, the value of the PI break point frequency $\omega_{pi}$ is determined to adjust the overshoot of the response of the simulated speed signal $\omega_a$ to a desired value. Ordinarily, as mentioned above, the PI break point frequency $\omega_{pi}$ is a fraction of the response frequency $\omega_{sc}$.

A method of correcting the integration time constant J of the mechanical system simulating circuit 6d will be described hereinafter with reference to FIG. 17. Suppose that the gain $K_1$ of the first position control circuit 5 is smaller than the gain $K_2$ of the second position control circuit 7. Then, the third speed signal $\omega_3$ given to the first speed control circuit 9 may be considered to coincide with the second speed signal $\omega_2$, because the amplitude of the first speed signal $\omega_1$ provided by the first position control circuit 5 is negligibly small as compared with that of the second speed signal $\omega_2$ provided by the second position control circuit 7; that is, the second speed signal $\omega_2$ is given as a speed command signal to the first speed control circuit 9 and the second speed control circuit 10b. Suppose that the gain of the third speed control circuit 11b is small as compared with the gain of the second speed control circuit 10b.

Then, if the integration time constant J of the mechanical system simulating circuit 6d is different from the moment of inertia of the actual mechanical system, the variation of the actual speed signal $\omega_m$ in response to the variation of the second speed signal $\omega_2$, and the variation of the simulated speed signal $\omega_a$ in response to the variation of the second speed signal $\omega_2$ are not equal to each other and the third speed deviation signal $\Delta\omega_3$ $(\omega_a-\omega_m)$ is not zero. For example, if the integration time constant J of the mechanical system simulating circuit 6d is smaller than the moment of inertia of the actual mechanical system, the variation of the actual speed signal $\omega_m$ in response to the variation of the second speed signal $\omega_2$ lags behind the variation of the simulated speed signal $\omega_a$ in response to the variation of the second speed signal $\omega_2$ as shown in FIG. 17(a). As is obvious from FIG. 17(a), the third speed deviation signal $\Delta\omega_3$ is positive during acceleration and is negative during deceleration. On the contrary, if the integration time constant J of the mechanical system simulating circuit 6d is greater than the moment of inertia of the actual mechanical system, the variation of the simulated speed signal $\omega_a$ in response to the variation of the second speed signal $\omega_2$ lags behind the variation of the actual speed signal $\omega_m$ in response to the variation of the second speed signal $\omega_2$. Accordingly, the third speed deviation signal $\Delta\omega_3$ is negative during acceleration and is positive during deceleration. Therefore, the integration time constant J of the mechanical system simulating circuit 6d is corrected so that the absolute value of the amplitude of the third speed deviation signal $\Delta\omega_3$ decreases.

The polarity of the third speed deviation signal $\Delta\omega_3$ is dependent on the mode of operation of the dc motor 1a. As is obvious from FIG. 17(b), it is possible to determine whether the dc motor 1a is accelerated or whether the dc motor 1a is decelerated through the examination of the polarity of the second torque signal $\tau_2$. That is, the second torque signal $\tau_2$ is positive during acceleration and is negative during deceleration. For example, if the third speed deviation signal $\Delta\omega_3$ is positive during acceleration, i.e., when the second torque signal $\tau_2$ is positive, the integration time constant J of the mechanical system simulating circuit 6d is increased. When the integration time constant J of the mechanical system simulating circuit 6d is thus corrected, the gains $K_{p2}$ and $K_{i2}$ of the second speed control circuit 10b can be corrected according to the moment of inertia of the actual mechanical system by using the expression (4). Although the method of correcting the integration time constant J of the mechanical system simulating circuit 6d has been described for a case where the gain $K_1$ of the first position control circuit 5 is small as compared with the gain $K_2$ of the second position control circuit 7, the integration time constant J of the mechanical system simulating circuit 6d and the gains $K_{p2}$ and $K_{i2}$ of the second speed control circuit 10b can be corrected by the same method, because the third speed deviation signal $\Delta\omega_3$ is not zero when the integration time constant J of the mechanical system simulating circuit 6d is different from the moment of inertia of the actual mechanical system.

The operation of the seventh embodiment will be described hereinafter. The respective modes of operation of the components of the seventh embodiment excluding the mechanical system simulating circuit 6d, the second speed control circuit 10b, the third speed control circuit 11b and the correction circuit 14 are the same as those of operation of the components of the sixth embodiment and hence the description thereof will be omitted.

Referring to FIG. 14, in the correction circuit 14, the adder 116 provides the integration time constant of the mechanical system simulating circuit 6d, i.e., the moment J of inertia. That is, the second speed control circuit 10b gives the second torque signal $\tau_2$ through the input terminal 111 to the polarity discriminating circuit 112, and then the polarity discriminating circuit 112 provides a polarity signal $S_g$. It is assumed that the polarity signal $S_g$ is "1" when the polarity of the second torque signal $\tau_2$ is positive and is "−1" when the second torque signal $\tau_2$ is negative. Then, the multiplier multiplies the torque signal $\tau_{3p}$ given thereto through the input terminal 110 by the third speed control circuit 11b by the polarity signal $S_g$, and the output of the multiplier 113 is given to the integrator 114. The adder 116 adds the correction $\Delta J$ for correcting the moment of inertia provided by the integrator 114 and a set value $J_0$ of moment of inertia set by the constant setting unit 115 to determine the moment J of inertia and sends out the same through the output terminal 119. The set value $J_0$ of moment of inertia is, for example, equal to the moment of inertia of the dc motor 1a.

The gains $K_{p2}$ and $K_{i2}$ of the second speed control circuit 10b are given. That is, when the moment J of inertia is given to the coefficient multipliers 117 and 118, the gains $K_{p2}$ and $K_{i2}$ are calculated by using the expression (4) and the gains $K_{p2}$ and $K_{i2}$ are sent out through the output terminals 120 and 121, respectively.

Subsequently, in the mechanical system simulating circuit 6d shown in FIG. 23, the integrator 183 provides the simulated speed signal $\omega_a$. That is, the subtracter 181 subtracts the third torque signal $\tau_3$ given thereto through the input terminal 180b by the third speed control circuit 11b from the second torque signal $\tau_2$ given thereto through the input terminal 180a by the second speed control circuit 10b to determine the simulated torque signal $\tau_a$. Then, the simulated torque signal $\tau_a$ and the moment J of inertia applied to the input terminal 180c by the correction circuit 14 are given to the divider 182, and the output of the divider 182 is given to the integrator 183. The integrator 183 integrates the simulated torque signal $\tau_a$ to send out the simulated speed signal $\omega_a$ through the output terminal 185. Thus, the simulated speed signal $\omega_a$ can be obtained by giving the simulated torque signal $\tau_a$ to the integrator having an integration time constant equal to the moment J of inertia.

Upon the reception of the simulated speed signal $\omega_a$, the integrator 184 calculates the simulated rotational angle signal $\theta_a$ by using the expression (1) and sends out the same through the output terminal 186.

Referring to FIG. 12, in the second speed control circuit 12b, the limiting circuit 96 provides the second torque signal $\tau_2$. That is, the subtracter 91 subtracts the simulated speed signal $\omega_a$ given thereto through the input terminal 89 by the mechanical system simulating circuit 6d from the second speed signal $\omega_2$ given thereto through the input terminal 88 by the second position control circuit 7 to determine the second speed deviation signal $\Delta\omega_2$ ($=\omega_2-\omega_a$), and then the multiplier multiplies the second speed deviation signal $\Delta\omega_2$ by the proportional gain $K_{p2}$ given thereto through the input terminal 90 by the correction circuit 14, and the output of the multiplier is given to the integrator 94. The adder 95 adds the respective outputs of the multiplier 92 and the integrator 94 to obtain the second torque signal $\tau_2$ and sends out the same through the limiting circuit 96 and the output terminal 97. The limiting circuit prevents the absolute value of the amplitude of the second torque signal $\tau_2$ from exceeding a specified value.

Eighth Embodiment

Although the sixth and seventh embodiments have been described for a case where the adder 8 adds the first speed signal $\omega$ and the second speed signal $\omega_2$ to determine the third speed signal $\omega_3$, the third speed signal $\omega_3$ may be determined by adding the first speed signal $\omega_1$ and a weighted speed signal obtained by weighting the second speed signal $\omega_2$ by a coefficient multiplier having a scale factor in the range of 0 to 1.

Ninth Embodiment

In the seventh embodiment shown in FIG. 22, the operating speed of the dc motor 1a changes when a load torque is applied to the load machine 3 and, consequently, the actual speed signal $\omega_m$ provided by the rotation detector 4 changes. However, since the actual speed signal $\omega_m$ is not given to the second speed control circuit 10b, the simulated speed signal $\omega_a$ provided by the mechanical system simulating circuit 6b that receives the second torque signal $\tau_2$ from the second speed control circuit 10b does not change. Therefore, when a load torque is applied to the load machine 3, the third speed deviation signal $\Delta\omega_3$ ($\omega_a = \omega_m$) is not zero and hence it is possible that the correction circuit 14 is unable to correct the moment of inertia, i.e., the integration time constant, of the mechanical system simulating circuit 6d properly.

In such a case, a decision about whether or not the correction of the moment of inertia by the correction circuit 14 is necessary may be made with reference to the amplitude of the second torque signal $\tau_2$. That is, since the amplitude of the second torque signal $\tau_2$ changes only when the rotational angle command signal $\theta_{ms}$ changes, the moment of inertia may be corrected only when the absolute value of the second torque signal $\tau_2$ exceeds a specified value or the moment of inertia may be corrected only when the absolute value of the second speed signal $\omega_2$ exceeds a specified value.

When the operation of the correction circuit 14 is thus controlled, the moment of inertia is corrected only during acceleration and during deceleration. Since the load torque, in general, rarely changes during acceleration and during deceleration in controlling an electric motor by a position controller, the moment of inertia can be properly corrected even if the load torque is applied to the load machine 3 and hence the gain of the second speed control circuit can be properly corrected by controlling the correction circuit 14 by such a method.

Tenth Embodiment

Although the foregoing seventh to ninth embodiments have been described for a case where only the gain of the second speed control circuit 10b is corrected according to the moment of inertia of the mechanical system simulating circuit 6d, the gain of the first speed control circuit 9 or the third speed control circuit 11b may be corrected in addition to the gain of the second speed control circuit 10b.

Eleventh Embodiment

Although the foregoing embodiments have been described as applied to controlling the dc motor 1a, the same may be applied to controlling an induction motor or a synchronous motor. Since the output torque of such an ac motor can be controlled at a high response speed as high as the response speed at which the output of the dc motor 1a is controlled by a well-known vector control method, the output torque of the ac motor can be easily controlled so as to coincide with the final torque signal $\tau_{ms}$.

Twelfth Embodiment

Figure 24:
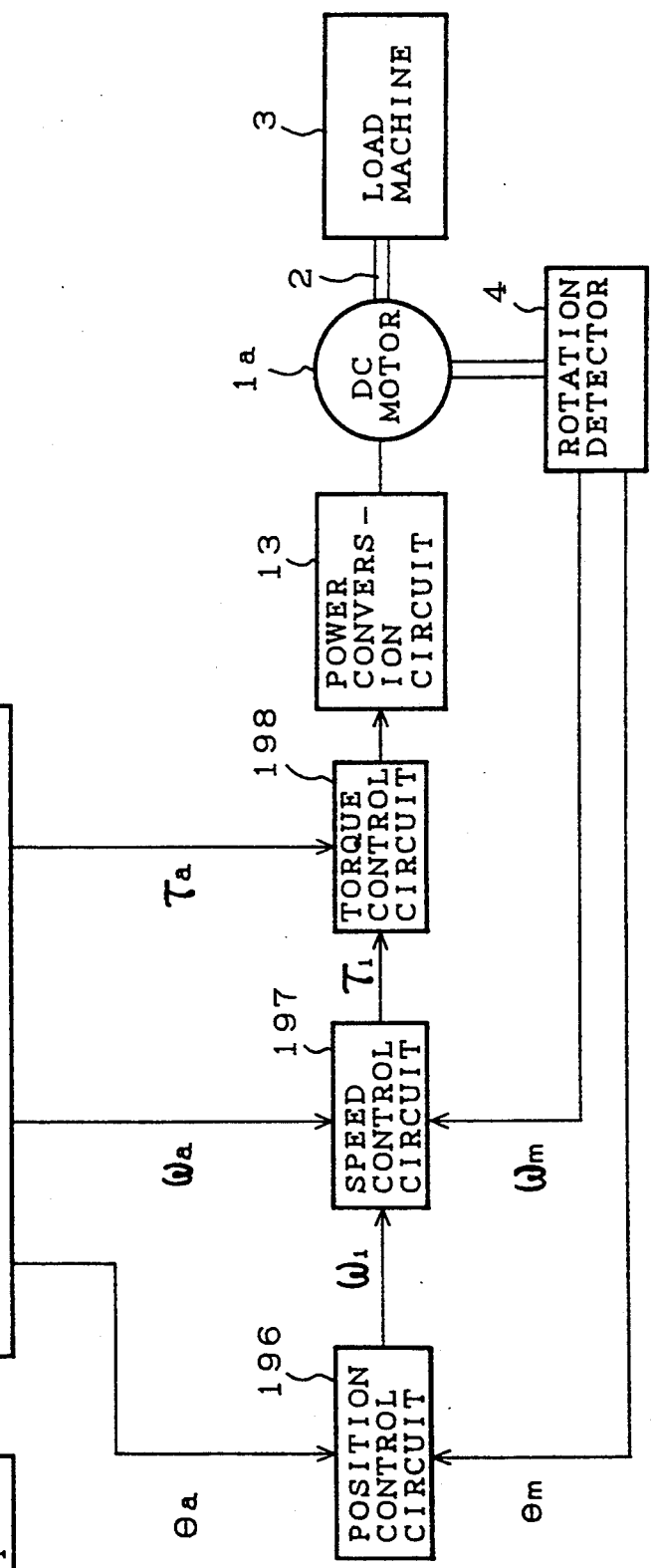
FIG. 24 is a block diagram of a position controller in a twelfth embodiment according to the present invention.

A position controller in a twelfth embodiment according to the present invention will be described hereinafter with reference to FIGS. 24 to 28. As shown in FIG. 24, the components of the twelfth embodiment excluding a feed-forward signal calculating circuit 194, a position control circuit 196, a speed control circuit 197 and a torque control circuit 198 are the same as those of the foregoing embodiments.

Figure 25:
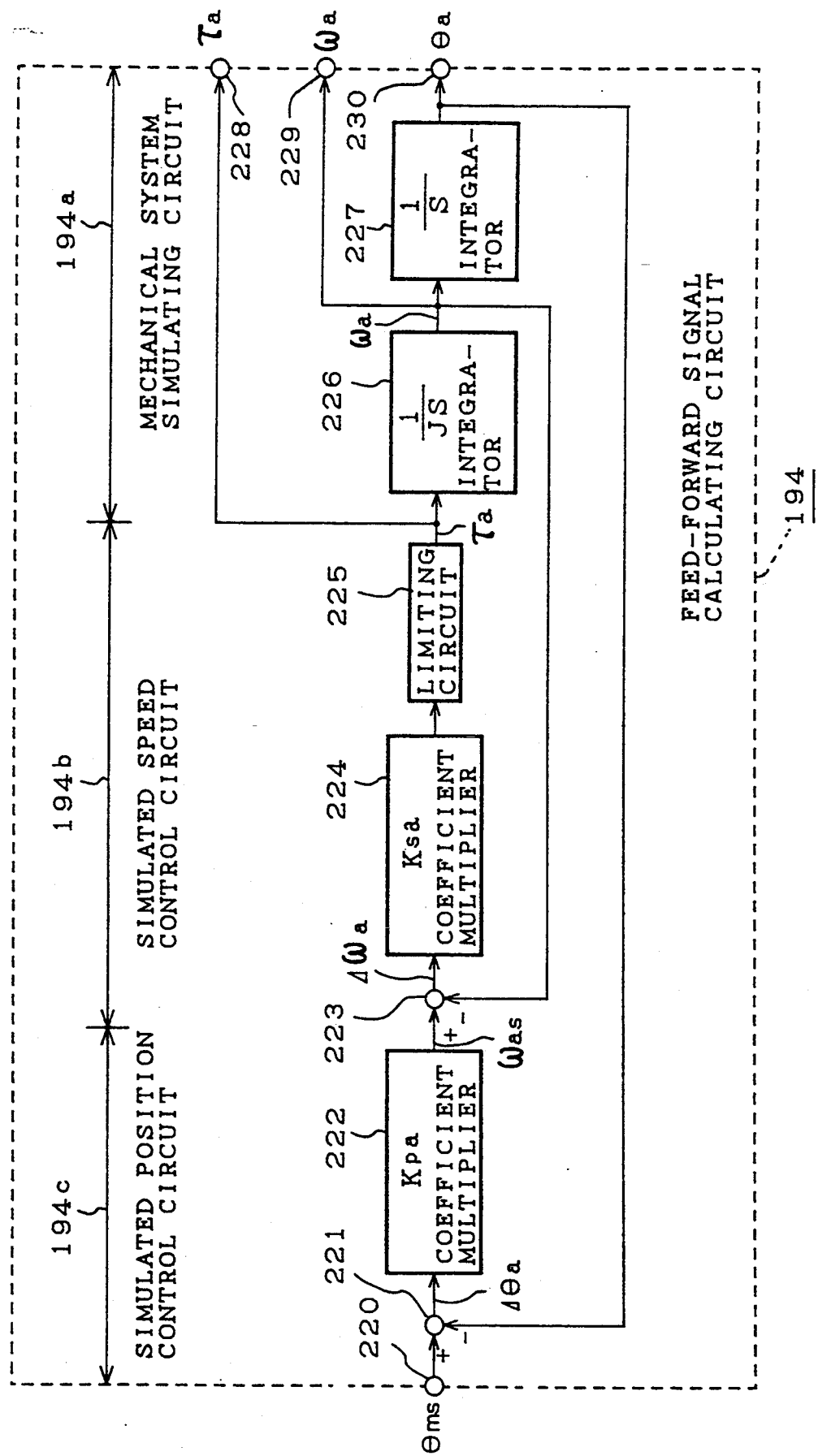
FIG. 25 is a block diagram of a feed-forward signal calculating circuit included in the position controller of FIG. 24.

Referring to FIG. 25, the feed-forward signal calculating circuit 194 comprises an input terminal 220 connected to the rotational angle command signal generating circuit 15, a subtracter 221 connected to the input terminal 220, a coefficient multiplier 222 connected to the subtracter 221, a subtracter 223 connected to the coefficient multiplier 222, a coefficient multiplier 224 connected to the subtracter 223, a limiting circuit 225 connected to the coefficient multiplier 224, an integrator 226 connected to the limiting circuit 225, an integrator 227 connected to the integrator 226, an output terminal 228 connected to the limiting circuit 225, an output terminal 229 connected to the integrator 226 and an output terminal 230 connected to the integrator 227.

Figure 26:
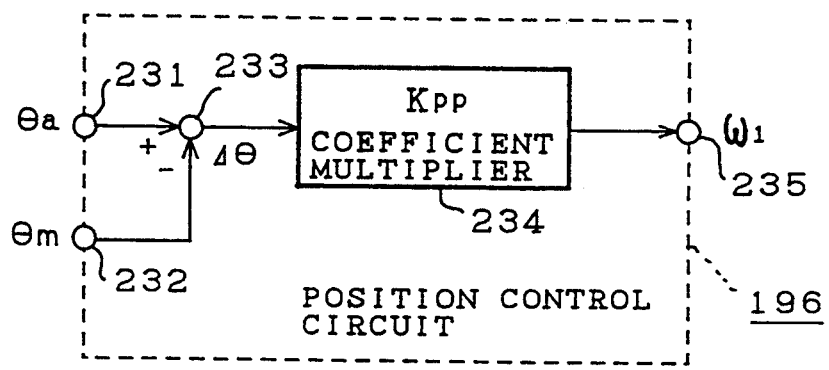
FIG. 26 is a block diagram of a position control circuit included in the position controller of FIG. 24.

Referring to FIG. 26, the position control circuit 196 comprises an input terminal 231 connected to the feed-forward signal calculating circuit 194, an input terminal 232 connected to the rotation detector 4, a subtracter 233 connected to the input terminals 231 and 232, a coefficient multiplier 234 connected to the subtracter 233, and an output terminal 235 connected to the coefficient multiplier 234.

Figure 27:
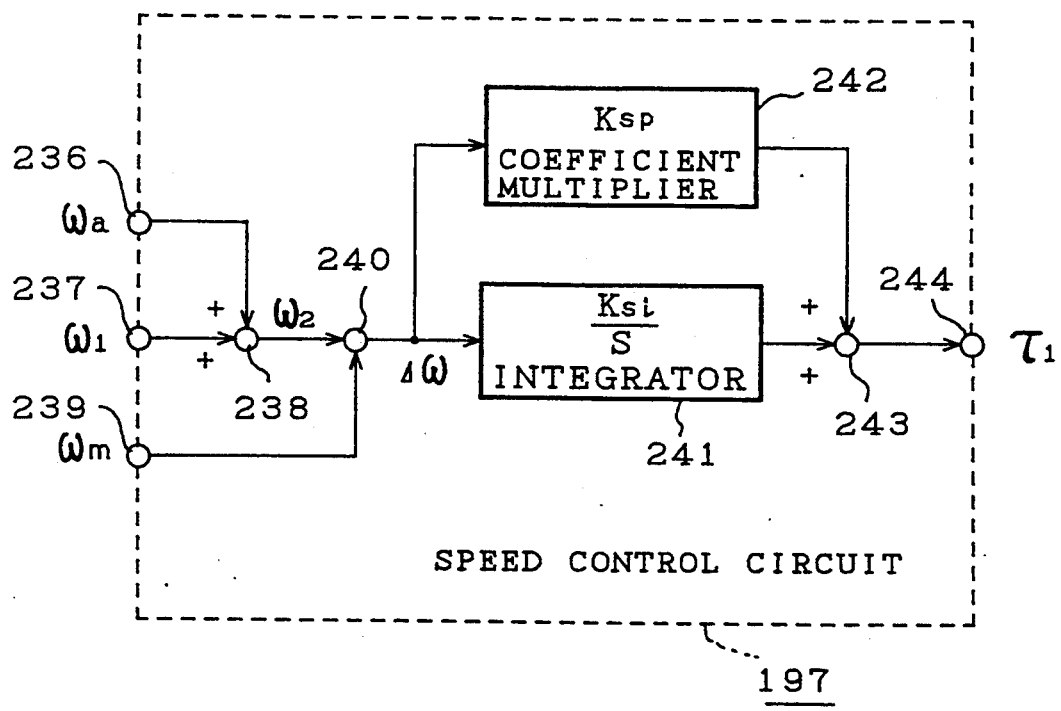
FIG. 27 is a block diagram of a speed control circuit included in the position controller of FIG. 24.

Referring to FIG. 27, the speed control circuit 197 comprises an input terminal 236 connected to the feed-forward signal calculating circuit 194, an input terminal 237 connected to the position control circuit 196, an adder 238 connected to the input terminals 236 and 237, an input terminal 239 connected to the rotation detector 4, a subtracter 240 connected to the adder 238 and the input terminal 239, an integrator 241 connected to the subtracter 240, a coefficient multiplier 242 connected to the subtracter 240, an adder 243 connected to the integrator 241 and the coefficient multiplier 242, and an output terminal 244 connected to the adder 243.

Figure 28:
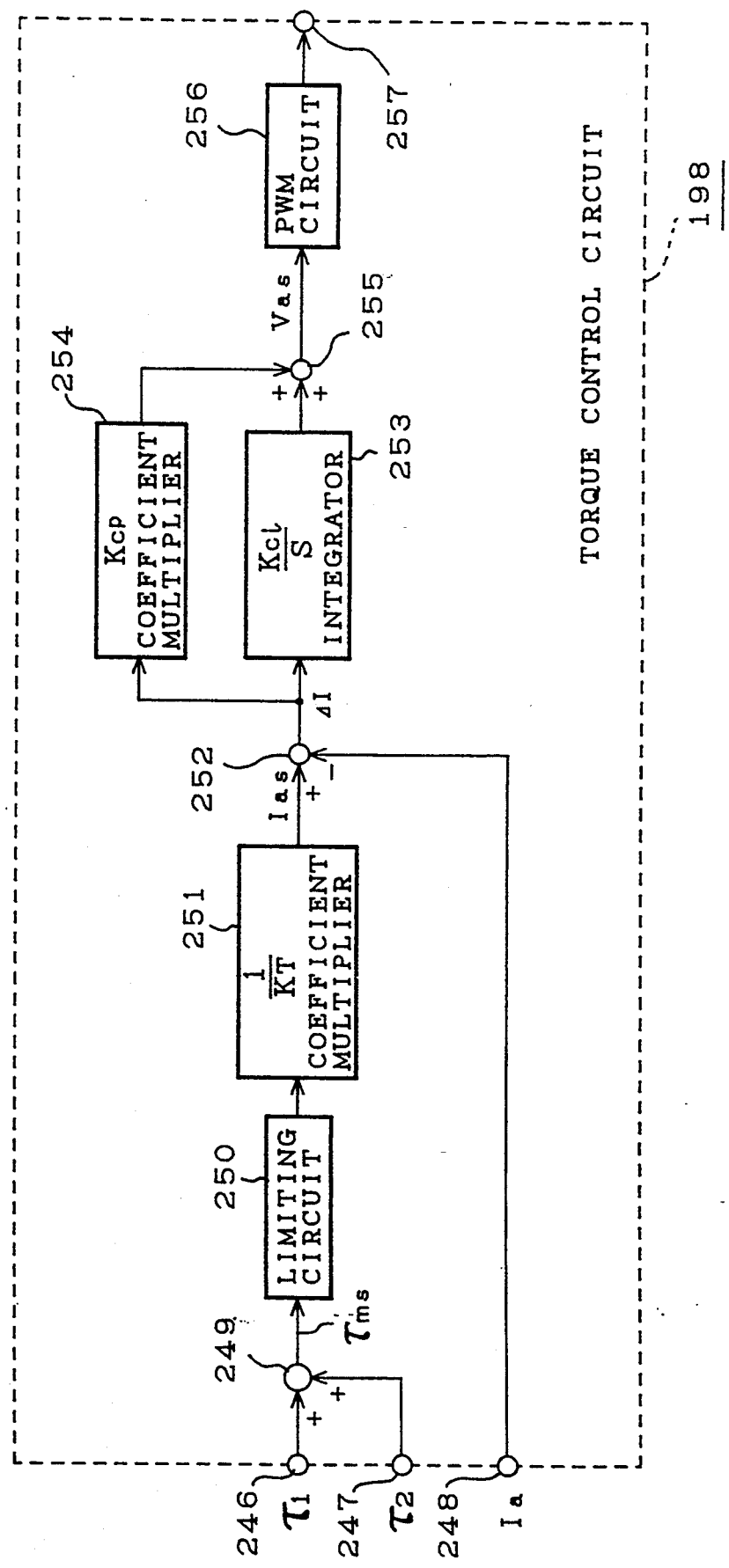
FIG. 28 is a block diagram of a torque control circuit included in the position controller of FIG. 24.

Referring to FIG. 28, the torque control circuit 198 comprises an input terminal 246 connected to the feed-forward signal calculating circuit 194, an input terminal 247 connected to the speed control circuit 197, an input terminal 248 connected to a current detector, not shown, an adder 249 connected to the input terminals 246 and 247, a limiting circuit 250 connected to the adder 249, a coefficient multiplier 251 connected to the limiting circuit 250, a subtracter 252 connected to the input terminal 248 and the coefficient multiplier 251, an integrator 253 connected to the subtracter 252, a coefficient multiplier 254 connected to the subtracter 252, an adder 255 connected to the integrator 253 and the coefficient multiplier 254, a PWM circuit 256 connected to the adder 255, and an output terminal 257 connected to the PWM circuit 256.

Prior to the description of the operation of the twelfth embodiment, the principle of controlling the rotational angle, i.e., the position, of the dc motor 1a will be described in connection with a control system of FIG. 24 excluding the feed-forward signal calculating circuit 194, receiving the rotational angle command signal $\theta_{ms}$ from the rotational angle command signal generating circuit 15, instead of a simulated rotational angle signal $\theta_a$ provided by the feed-forward signal calculating circuit 194, by the position control circuit 196. In this control system, it is assumed that the position control circuit 196 produces the first speed signal $\omega_1$ by amplifying the difference between the rotational angle command signal $\theta_{ms}$ and the actual rotational angle signal $\theta_m$, the speed control circuit 197 produces the first torque signal $\tau_1$ by amplifying the difference between the first speed signal $\omega_1$ and the actual speed signal $\omega_m$, and the torque control circuit 198 and the power conversion circuit 13 control the dc motor 1a so that the output torque $\tau_m$ of the dc motor 1a coincides with the first torque signal $\tau_1$.

As mentioned above, the control system is a common position control system having a speed control loop as a minor loop. As is well known, if the torque transmission mechanism 2 (FIG. 13) has a relatively low rigidity, large vibrations are generated by mechanical resonance when the gain of the speed control circuit 197 is increased to increase the response speed of the speed control circuit 197. In such a case, it is difficult to increase the response frequency of the speed control loop, i.e., the minor loop, and hence it is difficult to increase the response frequency of the position control loop.

The actual rotational angle signal $\theta_m$ representing the actual rotational angle of the dc motor 1a and the actual speed signal $\omega_m$ representing the actual operating speed of the dc motor provided by the rotation detector 4 are given to the position control circuit 196 and the speed control circuit 197, respectively. If these signals have vibration components corresponding vibrations produced by mechanical resonance, the vibration components are amplified by the position control circuit 196 and the speed control circuit 197, respectively. Therefore, the response frequency of the position control loop and the speed control loop cannot be increased.

To solve such a problem, the present invention controls the dc motor 1a in a feed-forward control mode. A mechanical system simulating circuit 194a approximates a mechanical system consisting of the dc motor 1a, the torque transmission mechanism 2 and the load machine 3 by two integration elements represented by:

$$\omega_a = \tau_a/JS, \quad \theta_a = \omega_a/S \tag{6}$$

The mechanical system simulating circuit 194a comprises a first integrator 226 which integrates a simulated torque signal $\tau_a$, which will be described later, and provides the simulated speed signal $\omega_a$, and a second integrator 227 which integrates the simulated speed signal $\omega_a$ and provides the simulated rotational angle signal $\theta_a$. Although the actual mechanical system has high-order vibration characteristics and nonlinear transmission characteristics attributable to the backlash and the like of the gear trains, the mechanical system simulating circuit 194a approximates the torque-speed transfer characteristics and speed-rotational angle transfer characteristics of the mechanical system to ideal integrating elements, disregarding the vibration characteristics and the nonlinear characteristics.

Figure 29:
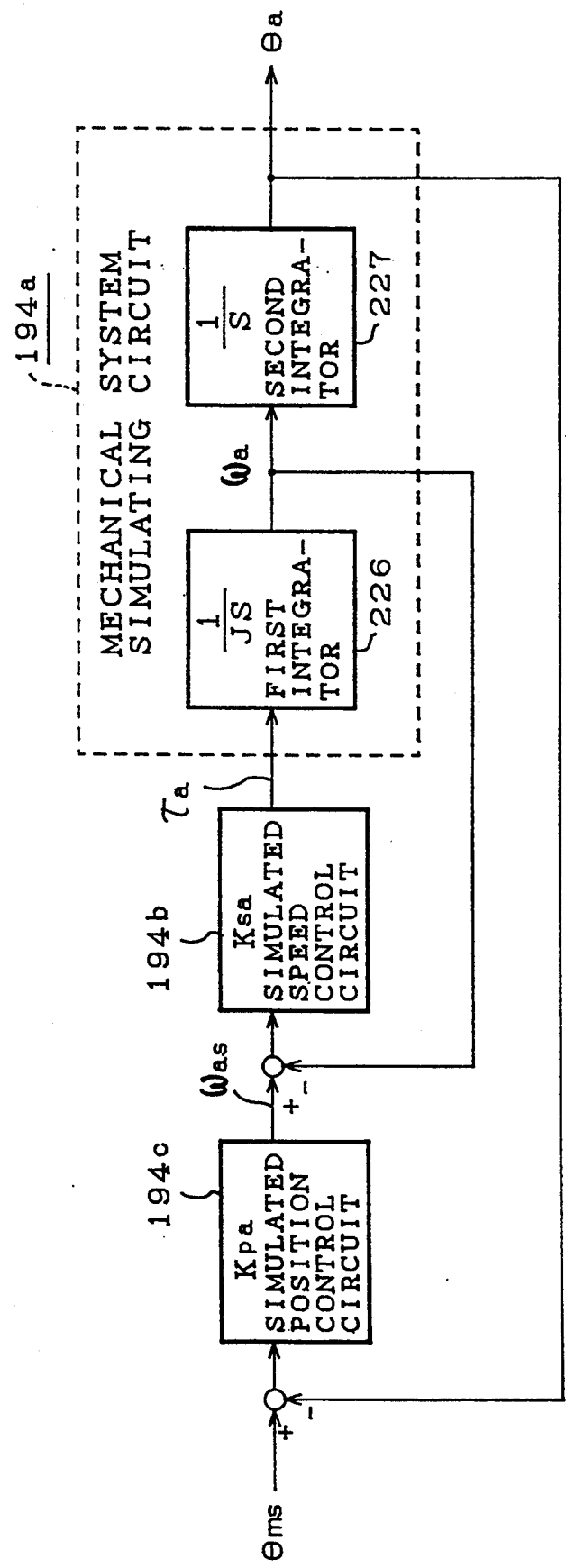
FIG. 29 is a block diagram of assistance in explaining the operation of the feed-forward signal calculating circuit of FIG. 25.

As shown in FIG. 29, the mechanical system simulating circuit 194a is controlled by a simulated position control circuit 194c and a simulated speed control circuit 194b. The simulated speed control circuit 194b gives the simulated torque signal $\tau_a$ to the mechanical system simulating circuit 194a. The respective gains of the simulated position control circuit 194c and the simulated speed control circuit 194b are set so that their response frequencies are equal to desired values, respectively, by the following method.

From FIG. 29, the relation between the simulated speed command signal $\omega_{as}$ and the simulated speed signal $\omega_a$ provided by the simulated position control circuit 194c is expressed by a transfer function $G_s(S)$.

$$G_s(S) = \omega_a/\omega_{as} = 1/(1+T_{sc}S) \quad (T_{sc}=J/K_{sa}) \tag{7}$$

Suppose that the frequency of response of the simulated speed signal $\omega_a$ to the simulated speed command signal $\omega_{as}$ is $\omega_{sc}$. Then, the time constant $T_{sc}$ in the expression (7) is the reciprocal of the response frequency $\omega_{sc}$, the gain $K_{sa}$ of the simulated speed control circuit 194b can be determined by using the following expression if the response frequency $\omega_{sc}$ is given.

$$K_{sa} = J\omega_{sc}(\omega_{sc}=1/T_{sc}) \tag{8}$$

Suppose that the response frequency $\omega_{sc}$ of the simulated speed control loop is several times the response frequency $\omega_{pc}$ of the simulated position control loop. Then, in setting the gain $K_{pa}$ of the simulated position control circuit 194c, the time constant $T_{sc}$ of the expression (7) may be considered to be zero. Accordingly, the transfer function $G_p(S)$ of the simulated rotational angle signal $\theta_a$ to the rotational angle command signal $\theta_{ms}$ can be approximated by the following first order lag transfer function.

$$G_p(S) = \theta_a/\theta_{as} = 1/(1+T_{pc}S) \quad (T_{pc}=1/K_{ps}) \tag{9}$$

From the expression (9), the gain $K_{pa}$ of the simulated position control circuit 194c, similarly to the gain $K_{sa}$ of the simulated speed control circuit 194b, can be determined by using the following expression.

$$K_{pa} = \omega_{pc}(\omega_{pc}=1/T_{sc}) \tag{10}$$

The mechanical system simulating circuit 194a is controlled by the simulated position control circuit 194c and the simulated speed control circuit 194b, and the actual speed signal $\omega_m$ and the actual rotational angle signal $\theta_m$ respectively representing the actual operating speed and actual rotational angle of the dc motor 1a are not. Therefore, the gain can be determined by using the expressions (8) and (10) so that the mechanical system simulating circuit 194a responds to the change of the rotational angle command signal $\theta_{ms}$ in desired transient response characteristics. When the dc motor 1a is controlled so that the output torque $\tau_m$ of the dc motor 1a coincides with a torque corresponding to the simulated torque signal $\tau_a$ provided by the simulated speed control circuit 194b, the operating speed and rotational angle of the dc motor 1a can be controlled in the same response characteristics as those of the simulated speed control loop and the simulated position control loop.

However, when the integration time constant of the first integrator 226 of the mechanical system simulating circuit 194a, i.e., the moment J of inertia, is different from the moment of inertia of the actual mechanical system consisting of the dc motor 1a, the torque transmission mechanism 2 and the load machine 3 or when a load torque $\tau_L$ is applied to the actual mechanical system, the response of the mechanical system simulating circuit 194a does not coincide with the response of the actual mechanical system. Therefore, the operating speed and rotational angle of the dc motor 1a cannot be controlled in the same response characteristics as those of the simulated speed control loop and the simulated position control loop only by controlling the dc motor 1a so that the output torque $\tau_m$ of the dc motor 1a coincides with a torque represented by the simulated torque signal $\tau_a$. Furthermore, if the torque transmission mechanism 2 has a relatively low rigidity, it is possible that vibrations are produced by mechanical resonance if the gains of the simulated speed control circuit 194b and the simulated position control circuit 194c are increased excessively.

To solve those problems, the position control circuit 196 amplifies a rotational angle deviation signal, i.e., the difference between the simulated rotational angle signal $\theta_a$ and the actual rotational angle signal $\theta_m$, and provides the first speed signal $\omega_1$ as shown in FIG. 24. The speed control circuit 197 amplifies a speed deviation signal, i.e., the difference between the actual speed signal $\omega_m$ and the second speed signal $\omega_2$ obtained by adding the first speed signal $\omega_1$ and the simulated speed signal $\omega_a$ to provide the first torque signal $\tau_1$. The torque control circuit 198 and the power conversion circuit 13 control the dc motor 1a so that the output torque $\tau_m$ of the dc motor 1a coincides with a torque represented by the final torque command signal $\tau_{ms}$ obtained by adding the first torque signal $\tau_1$ and the simulated torque signal $\tau_a$. Consequently, the effect of difference in response characteristics between the mechanical system simulating circuit 194a and the actual mechanical system is reduced and the operating speed and rotational angle of the dc motor 1a can be controlled in the same response characteristics as those of the simulated speed control loop and the simulated position control loop.

The operation of the twelfth embodiment will be described hereinafter with reference to FIGS. 24 to 28.

Referring to FIG. 25, the feed-forward signal calculating circuit 194 provides the simulated rotational angle signal $\theta_a$, the simulated speed signal $\omega_a$ and the simulated torque signal $\tau_a$. That is, the subtracter 221 subtracts the simulated rotational angle signal $\theta_a$ given thereto by the integrator 227, the operation of which will be described later, and the rotational angle command signal $\theta_{ms}$ given thereto through the input terminal 220 by the rotational angle command signal generating circuit 15 to determine the simulated rotational angle deviation signal $\Delta\theta_a$ ($=\theta_{ms}-\theta_a$) and gives the same to the coefficient multiplier 222. Then, the coefficient multiplier 222 determines the simulated speed command signal $\omega_{as}$. The coefficient multiplier 222 is one of the components of the simulated position control circuit 194c. The coefficient $K_{pa}$ of the coefficient multiplier 222 is determined by using the expression (10).

Then, the subtracter 223 subtracts the simulated speed signal $\omega_a$ provided by the integrator 226, the operation of which will be described later, from the simulated rotational angle command signal $\omega_{as}$ provided by the coefficient multiplier 222 to determine the simulated speed deviation signal $\Delta\omega_a$ ($=\omega_{as}-\omega_a$) and gives the same to the coefficient multiplier 224. Then, the coefficient multiplier 224 provides the simulated torque signal $\tau_a$. The coefficient multiplier 224 is the component of the simulated speed control circuit 194b and the coefficient $K_{sa}$ thereof is determined by using the expression (8). The simulated torque signal $\tau_a$ is given to the limiting circuit 225, which prevents the absolute value of the amplitude of the simulated torque signal $\tau_a$ from exceeding a specified maximum value. The simulated torque signal $\tau_a$ given to the limiting circuit 225 is sent out through the output terminal 228 and, at the same time given to the integrator 226. Then, the integrator 226 performs a calculation by using the expression (6) and provides the simulated speed signal $\omega_a$. The simulated speed signal $\omega_a$ is sent out through the output terminal 229 and, at the same time, given to the integrator 227. The integrator 227 performs the calculation by using the expression (6) to send out the simulated rotational angle signal $\theta_a$ through the output terminal 230.

The integrators 226 and 227 are the components of the mechanical system simulating circuit 194a, corresponding to the first and second integrators of FIG. 29. The integration time constant J of the integrator 226 is equal to the moment of inertia of the mechanical system.

Referring to FIG. 26, in the position control circuit 196, the coefficient multiplier 234 provides the first speed signal $\omega_1$. That is, the subtracter 233 subtracts the actual rotational angle signal $\theta_m$ given thereto through the input terminal 232 by the rotation detector 4 from the simulated rotational angle signal $\theta_a$ given thereto through the input terminal 231 by the feed-forward signal calculating circuit 194 to determine the rotational angle deviation signal $\Delta\theta$ ($=\theta_a-\theta_m$) and gives the same to the coefficient multiplier 234. Then, the coefficient multiplier determines the first speed signal $\omega_1$ and sends out the same through the output terminal 235.

Subsequently, in the speed control circuit 197 shown in FIG. 27, the adder 243 provides the first torque signal $\tau_1$. That is, the adder 238 adds the simulated speed signal $\omega_a$ given thereto through the input terminal 236 by the feed-forward signal calculating circuit 194 and the first speed signal $\omega_1$ given thereto through the input terminal 237 by the position control circuit 196 to determine the second speed signal $\omega$ ($=\omega_a+\omega_1$). Then, the subtracter 240 subtracts the actual speed signal $\omega_m$ given thereto through the input terminal 239 by the rotation detector 4 from the second speed signal $\omega_2$ to determine the speed deviation signal $\Delta\omega$ ($=\omega_2-\psi_m$) and gives the same to the integrator 241 and the coefficient multiplier 242. Then, the adder 243 adds the respective outputs of the integrator 241 and the coefficient multiplier 242 to obtain the first torque signal $\tau_1$ and sends out the same through the output terminal 244.

In the torque control circuit 198 shown in FIG. 28, the adder 249 provides the final torque command signal $\tau_{ms}$. That is, the adder 249 adds the simulated torque signal $\tau_a$ given thereto through the input terminal 246 by the feed-forward signal calculating circuit 194 and the first torque signal $\tau_1$ given thereto through the input terminal 247 by the speed control circuit 197 to determine the final torque command signal $\tau_{ms}$ ($=\tau_1+\tau_a$) and gives the same to the limiting circuit 250. The limiting circuit 250 prevents the amplitude of the final torque command signal $\tau_{ms}$ from exceeding a specified value.

Then, the coefficient multiplier 251 provides the armature current command signal $I_{as}$. As is generally known, the relation between the output torque $\tau_m$ of the dc motor 1a and the armature current $I_a$ is represented by the expression (2), in which $K_T$ is a torque constant. Accordingly, upon the reception of the final torque command signal $\tau_{ms}$, the coefficient multiplier 251 having a coefficient equal to $1/K_T$ determines the armature current command signal $I_{as}$.

Then, the subtracter 252 provides the current deviation signal $\Delta I$ ($=I_{as}-I_a$). That is, the subtracter 252 subtracts the actual armature current $I_a$ given thereto through the input terminal 248 by the current detector, not shown, from the armature current command signal $I_{as}$ provided by the coefficient multiplier 251 to determine the current deviation signal $\Delta I$ and gives the same to the integrator 253 and the coefficient multiplier 254. The adder 255 provides the terminal voltage command signal $V_{as}$. That is, the adder 255 adds the respective outputs of the integrator 253 and the coefficient multiplier 254 to determine the terminal voltage command signal $V_{as}$ and gives the same to the PWM circuit 256.

Then, the PWM circuit 256 provides a control signal for controlling the four switching elements of the power conversion circuit 13 comprising a quadrant chopper circuit on the basis of the terminal voltage command signal $V_{as}$. The PWM circuit 256 is of a known configuration and hence the description thereof will be omitted.

The PWM circuit 256 and the power conversion circuit 13 controls the terminal voltage $V_a$ of the dc motor 1a so as to coincide with a voltage represented by the terminal voltage command signal $V_{as}$. It will be understood from the foregoing description that the torque control circuit 198 shown in FIG. 28 and the power conversion circuit 13 controls the output torque $\tau_m$ of the dc motor 1a so as to coincide with a torque represented by the final torque command signal $\tau_{ms}$.

The coefficient $K_{pp}$ of the coefficient multiplier 234 included in the position control circuit 196 shown in FIG. 26 corresponds to the gain of the prior art position control circuit and may be determined by a known method. The coefficient $K_{sp}$ of the coefficient multiplier 242 included in the speed control circuit 197 shown in FIG. 27 and the gain $K_{si}$ of the integrator 241 included in the speed control circuit 197 shown in FIG. 27 correspond respectively to the proportional gain and the integral gain of the prior art speed control circuit and may be determined by a known method. If the load torque is stationary, the variation of the operating speed of the dc motor 1a under the stationary load torque can be prevented through the integration operation of the speed control circuit 197. Although the speed control circuit 197 shown in FIG. 27 receives the speed deviation signal $\Delta\omega$ and determines the first torque signal $\tau_1$ through proportional plus integral operation, vibrations caused by mechanical resonance can be further effectively suppressed through the proportional plus integral plus derivative operation.

The respective coefficients $K_{cp}$ of the coefficient multiplier 254 and the gain $K_{ci}$ of the integrator 253 in the torque control circuit 198 shown in FIG. 28 correspond respectively to the proportional gain and integral gain of the prior art current control circuit and may be determined by a known method.

Thirteenth Embodiment

Figure 30:
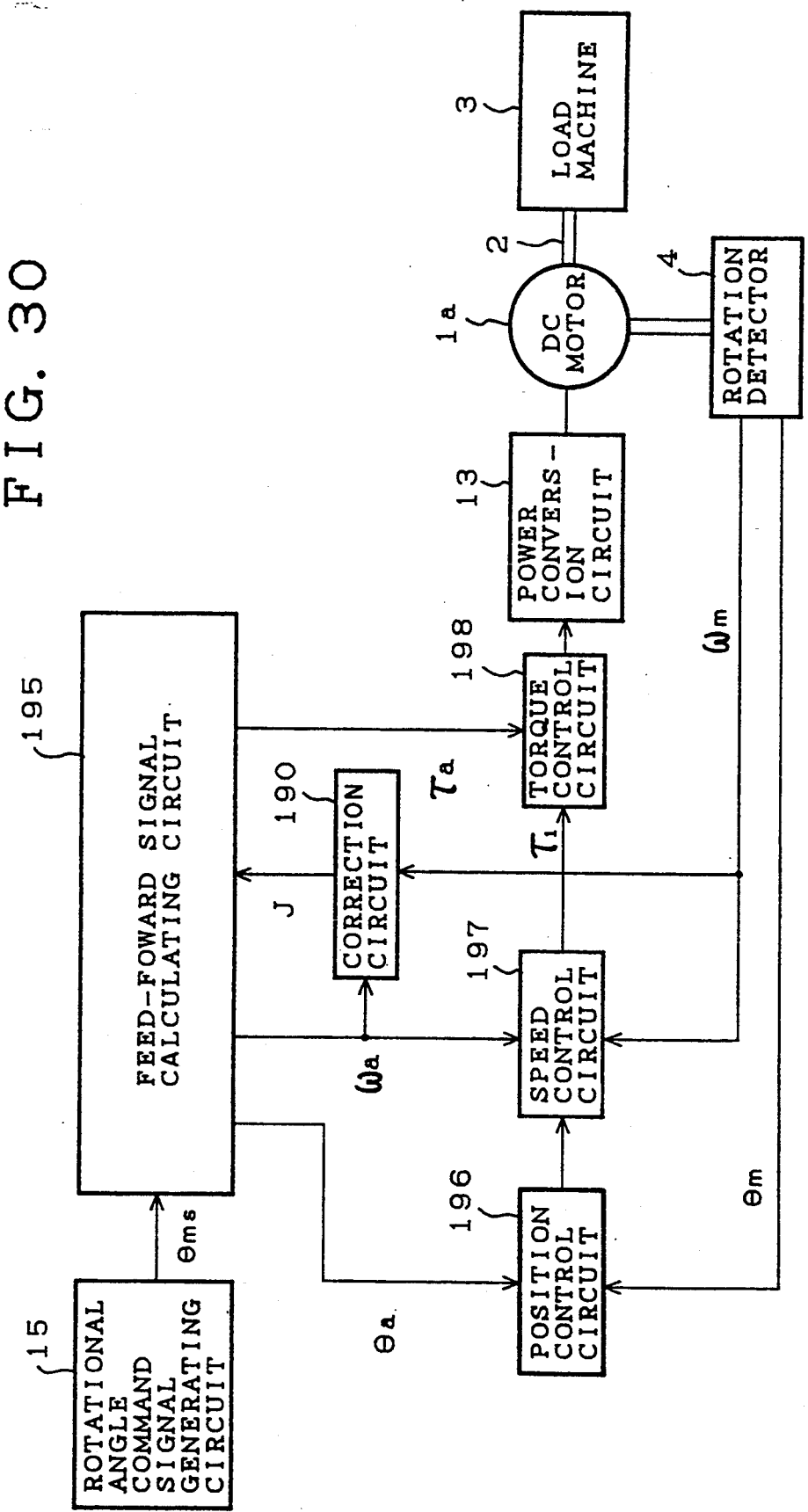
FIG. 30 is a block diagram of a position controller in a thirteenth embodiment according to the present invention.

A position controller in a thirteenth embodiment according to the present invention will be described hereinafter with reference to FIGS. 30, 31 and 32. As shown in FIG. 30, the dc motor 1a, torque transmission mechanism 2, load machine 3, rotation detector 4, position control circuit 196, speed control circuit 197, torque control circuit 198, power conversion circuit 13 and rotational angle command signal generating circuit 15 of the thirteenth embodiment are identical with those of the twelfth embodiment.

As shown in FIG. 30, the thirteenth embodiment comprises, in addition to components identical with those of the twelfth embodiment, a feed-forward signal calculating circuit 195 using variable control parameters, and a correction circuit 190. A torque control means employed in the thirteenth embodiment, similarly to that of the twelfth embodiment, consists of the torque control circuit 198 and the power conversion circuit 13.

Figure 31:
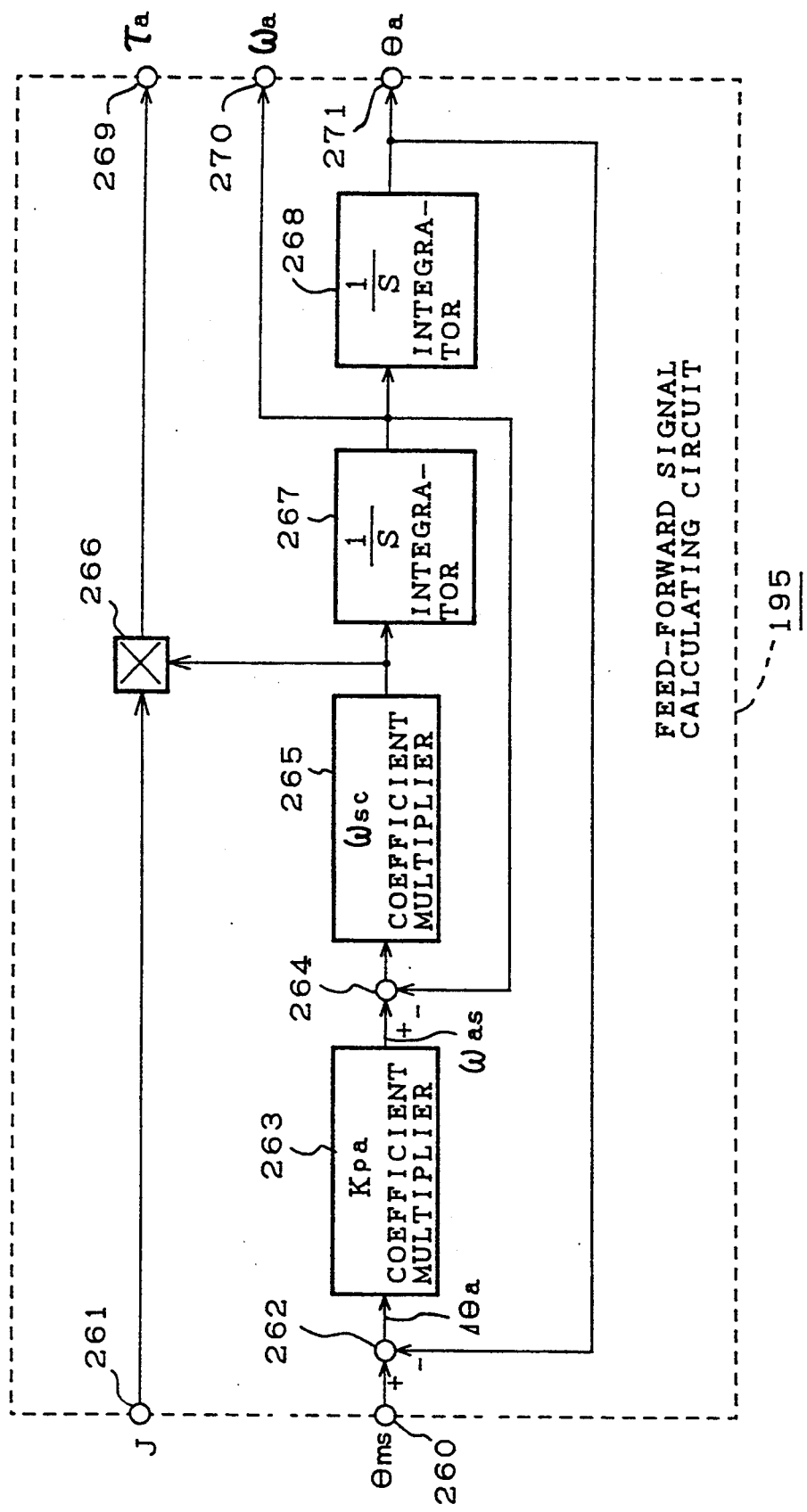
FIG. 31 is a block diagram of a feed-forward signal calculating circuit included in the position controller of FIG. 30.

Referring to FIG. 31, the feed-forward signal calculating circuit 195 comprises an input terminal 260 connected to the rotational angle command signal generating circuit 15, an input terminal 261 connected to the correction circuit 190, a subtracter 262 connected to the input terminal 260, a coefficient multiplier 263 connected to the subtracter 262, a subtracter 264 connected to the coefficient multiplier 263, a coefficient multiplier 265 connected to the subtracter 264, a multiplier 266 connected to the input terminal 261 and the coefficient multiplier 265, an integrator 267 connected to the coefficient multiplier 265, an integrator 268 connected to the integrator 267, an output terminal 269 connected to the multiplier 266, an output terminal 270 connected to the integrator 267, and an output terminal 271 connected to the integrator 268.

Figure 32:
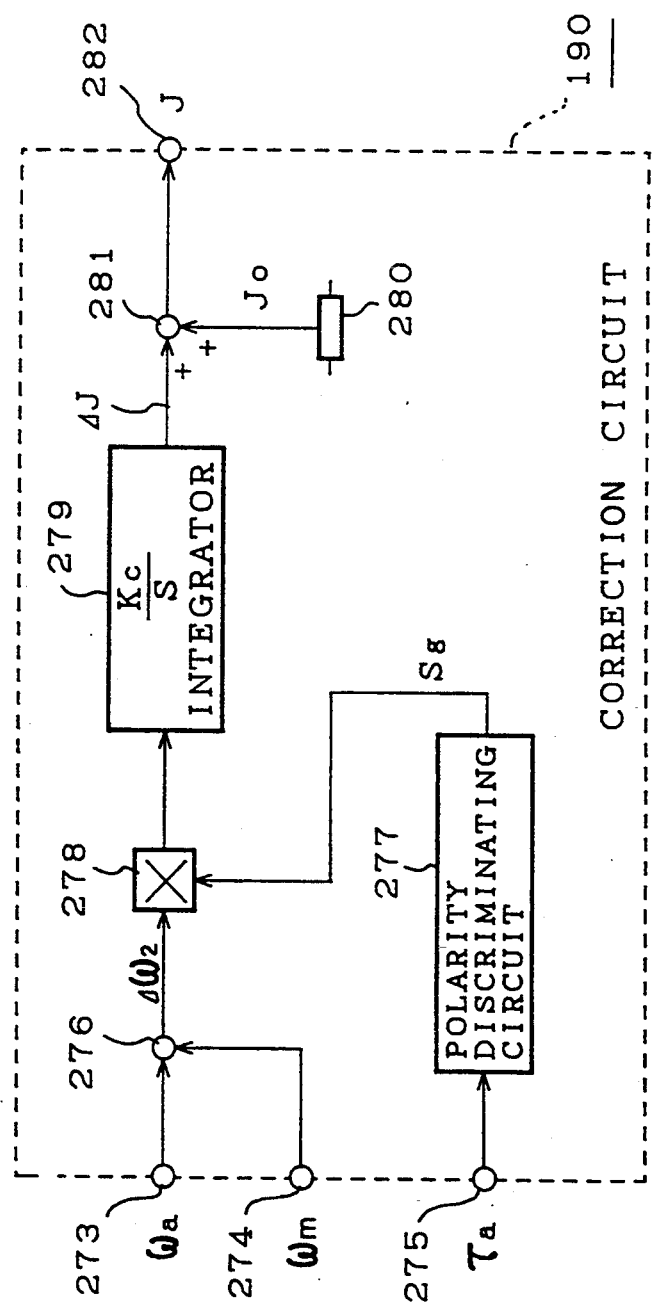
FIG. 32 is a block diagram of a correction circuit included in the position controller of FIG. 30.

Referring to FIG. 32, the correction circuit 190 comprises input terminals 273 and 275 connected to the feed-forward signal calculating circuit 195, an input terminal 274 connected to the rotation detector 4, a subtracter 276 connected to the input terminals 273 and 274, a polarity discriminating circuit 277 connected to the input terminal 275, a multiplier 278 connected to the subtracter 276 and the polarity discriminating circuit 277, an integrator 279 connected to the multiplier 278, a constant setting unit 280, an adder 281 connected to the integrator 279 and the constant setting unit 280, and an output terminal 282 connected to the adder 281.

The adjustment of the control parameters for the feed-forward signal calculating circuit 195 of the thirteenth embodiment will be described hereinafter with reference to FIG. 33, which is equivalent to FIG. 29. First, the equivalence of FIG. 33 with FIG. 29 will be described.

Figure 33:
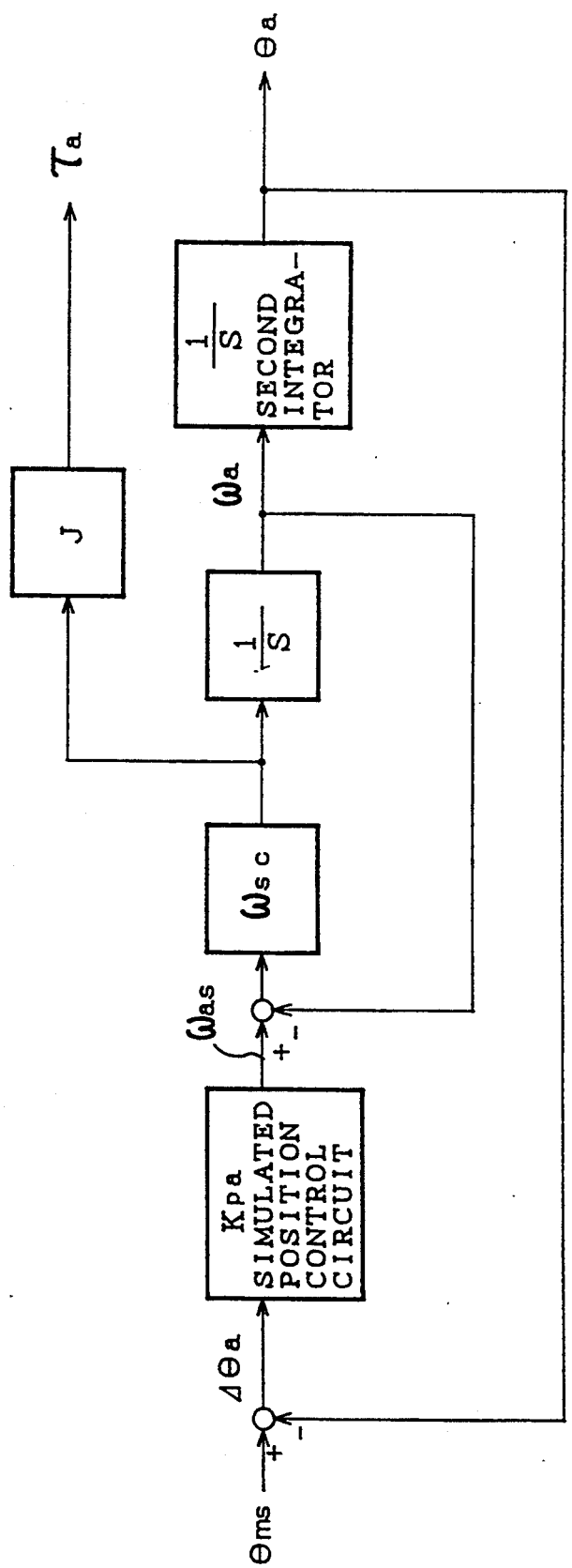
FIG. 33 is a block diagram of assistance in explaining the operation of the feed-forward signal calculating circuit of FIG. 31.

Referring to FIG. 33, a transfer function $G_s(S)$ representing the relation between the simulated speed signal $\omega_a$ and the simulated speed command signal $\omega_{as}$ is approximated by the following first order lag transfer function.

$$G_s(S) = \omega_a/\omega_{as} = \omega_{sc}/(S + \omega_{sc}) = 1/(1 + S/\omega_{sc}) \qquad (11)$$

From the expression (8), the reciprocal of the response frequency $\omega_{sc}$ of the simulated speed control loop is a time constant $T_{sc}$, the expression (11) is equal to the expression (7). It is known from the expression (6) that the simulated torque signal $\tau_a$ can be obtained by multiplying the derivative of the simulated speed signal $\omega_a$ by the moment J of inertia. Accordingly, as shown in FIG. 33, the simulated torque signal $\tau_a$ can be obtained by multiplying an input signal given to an integrator having an integration time constant of "1" and providing the simulated speed signal $\omega_a$ by the moment J of inertia. Furthermore, the simulated rotational angle control loops are apparently equivalent. Thus, the FIG. 33 is equivalent to FIG. 29.

When using the configuration shown in FIG. 33 for calculating the simulated rotational angle signal $\theta_a$, the simulated speed signal $\omega_a$ and the simulated torque signal $\tau_a$ by the feed-forward signal calculating circuit 195, the moment J of inertia is only the control parameter to be adjusted if the moment of inertia of the mechanical system is unknown or varies during operation. The response frequency $\omega_{sc}$ of the simulated speed control loop is a set value and the gain $K_{pa}$ of the simulated position control loop is determined by using the expression (10). As is evident from the comparison of FIGS. 29 and 33, the mechanical system simulating circuit 194a and the simulated speed control circuit 194b are discrete circuits in FIG. 29, while these circuits are indistinguishable from each other in FIG. 33, which indicates that any circuit configuration equivalent to that of FIG. 29 may be used for calculation by the feed-forward signal calculating circuit 195. When the circuit configuration of FIG. 29 is used, the integration time constant, i.e., the moment J of inertia, of the first integrator 226 that provides the simulated speed signal $\omega_a$, and the gain $K_{sa}$ of the simulated speed control circuit 194b are the control parameters to be adjusted according to the moment of inertia of the mechanical system.

Figure 34A:
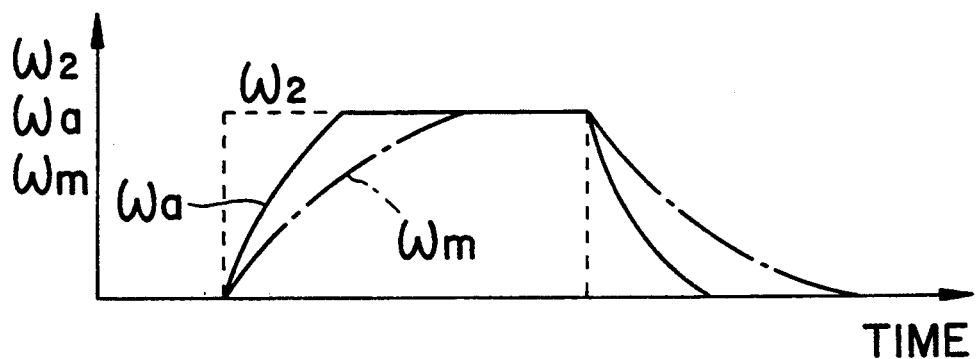
FIGS. 34(a) and 34(b) are diagrams of assistance in explaining the operation of the correction circuit of FIG. 32.
Figure 34B:
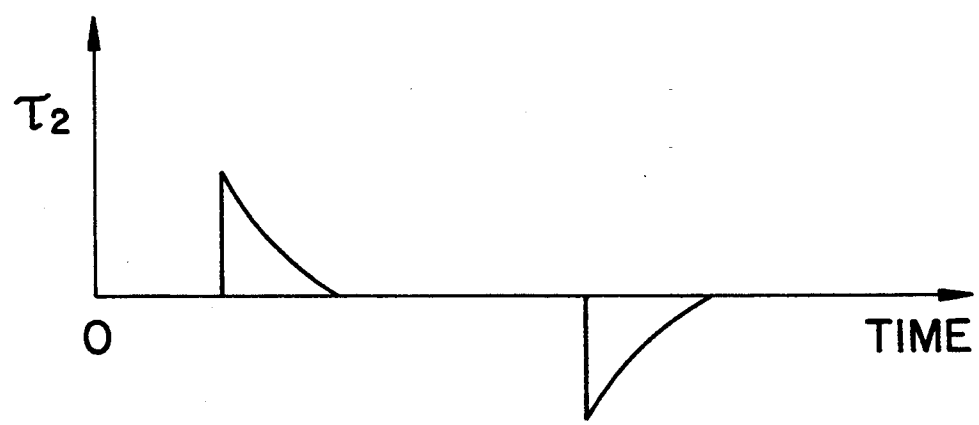

A method of correcting the moment J of inertia, i.e., control parameter for the feed-forward signal calculating circuit 195 of the thirteenth embodiment, will be described hereinafter with reference to FIGS. 34(a) and 34(b). When the moment J of inertia given to the feed-forward signal calculating circuit 195 is smaller than the moment of inertia of the actual mechanical system, the response of the actual speed signal $\omega_m$ to the variation of the simulated speed command signal $\omega_{as}$ lags behind the response of the simulated speed signal $\omega_a$ to the same as shown in FIG. 34(a). As is evident from FIG. 34(a), the polarity of the second speed deviation signal $\Delta\omega_2$ ($=\omega_a-\omega_m$) is positive during acceleration and is negative during deceleration. When the moment J of inertia given to the feed-forward signal calculating circuit 195 is greater than the moment of inertia of the actual mechanical system, the response of the simulated speed signal $\omega_a$ to the variation of the simulated speed command signal $\omega_{as}$ lags behind the response of the actual speed signal $\omega_m$ to the same. Therefore, the polarity of the second speed deviation signal $\Delta\omega_2$ is negative during acceleration and is positive during deceleration. Accordingly, the moment J of inertia used in the feed-forward signal calculating circuit 195 is corrected so that the absolute value of the amplitude of the second speed deviation signal $\Delta\omega_2$ is reduced.

Thus, the polarity of the second speed deviation signal $\Delta\omega_2$ during acceleration and that of the same during deceleration are reverse to each other. As is evident from FIG. 34(b), it is possible to decide whether the dc motor 1a is accelerated or whether the dc motor 1a is decelerated by discriminating the polarity of the simulated torque signal $\tau_a$ provided by the feed-forward signal calculating circuit 195. That is, the polarity of the simulated torque signal $\tau_a$ is positive during acceleration and is negative during deceleration. Therefore, when the dc motor 1a is accelerated, namely, when the polarity of the simulated torque signal $\tau_a$ is positive, the moment J of inertia used in the feed-forward signal calculating circuit 195 is increased if the polarity of the second speed deviation signal $\Delta\omega_2$ is positive, or the moment J of inertia is decreased if the second speed deviation signal $\Delta\omega_2$ is negative. When the feed-forward signal calculating circuit 195 carries out operation shown in FIG. 29, the gain $K_{sa}$ of the simulated speed control circuit 194b must be corrected by using the expression (8) in addition to the correction of the moment J of inertia.

The operation of the thirteenth embodiment will be described hereinafter with reference to FIGS. 30, 31 and 32. The modes of operation of the circuits other than those of the feed-forward signal calculating circuit 195 and the correction circuit 190 are the same as those of the corresponding circuits of the twelfth embodiment and hence the description thereof will be omitted.

In the feed-forward signal calculating circuit 195 shown in FIG. 31, the multiplier 266 provides the simulated torque signal $\tau_a$. That is, the subtracter 262 subtracts the simulated rotational angle signal $\theta_a$ provided by the integrator 268 from the rotational angle command signal $\theta_{ms}$ given thereto through the input terminal 260 by the rotational angle command signal generating circuit 15 to obtain the simulated rotational angle deviation signal $\Delta\theta_a$ ($=\theta_{ms}-\theta_a$) and gives the same to the coefficient multiplier 263. Then, the coefficient multiplier 263 determines the simulated speed command signal $\omega_{as}$. The coefficient multiplier 263 is a component of the simulated position control circuit of FIG. 33. The coefficient $K_{ps}$ of the coefficient multiplier 263 is determined by using the expression (10). Then, the subtracter 264 subtracts the simulated speed signal $\omega_a$ provided by the integrator 267 from the simulated speed command signal $\omega_{as}$ provided by the coefficient multiplier 263 to determine the simulated speed deviation signal $\Delta\omega_a$ ($=\omega_{as}-\omega_a$) and gives the same to the coefficient multiplier 265. Upon the reception of the output of the coefficient multiplier 265, the integrator 267 determines the simulated speed signal $\omega_a$. As shown in FIG. 33, the coefficient of the coefficient multiplier 265 is equal to the response frequency $\omega_{sc}$ of the simulated speed control loop. Then, the multiplier 266 multiplies the moment J of inertia given thereto through the input terminal 261 by the correction circuit 190 by the output of the coefficient multiplier 265 to obtain the simulated torque signal $\tau_a$ and sends out the same through the output terminal 269.

Subsequently, the simulated speed signal $\omega_a$ obtained by the integrator 267 is sent out through the output terminal 270, and the simulated rotational angle signal $\theta_a$ obtained by integrating the simulated speed signal $\omega_a$ by the integrator 268 is sent out through the output terminal 271.

In the correction circuit 190 shown in FIG. 32, the adder 281 provides the moment J of inertia. That is, the subtracts the actual speed signal $\omega_m$ given thereto through the input terminal 274 by the rotation detector 4 from the simulated speed signal $\omega_a$ given thereto through the input terminal 273 by the feed-forward signal calculating circuit 195 to determine the second speed deviation signal $\Delta\omega_2$. The polarity discriminating circuit 277 provides the polarity signal $S_g$ representing the polarity of the simulated torque signal $\tau_a$ given thereto through the input terminal 275 by the feed-forward signal calculating circuit 195. The polarity signal $S_g$ is a binary signal that is "1" when the polarity of the simulated torque signal $\tau_a$ is positive or "−1" when the polarity of the simulated torque signal $\tau_a$ is negative. Then, the multiplier multiplies the second speed deviation signal $\Delta\omega_2$ provided by the subtracter 276 by the polarity signal $S_g$ indicating the polarity of the simulated torque signal $\tau_a$ and the output of the multiplier 278 is given to the integrator 279. Then, the integrator 279 determines a correction $\Delta J$ for correcting the moment J of inertia. Then, the adder 281 adds the initial moment $J_0$ of inertia provided by the constant setting unit 280 and the correction $\Delta J$ to determine the moment J of inertia and sends out the same through the output terminal 282. The initial moment $J_0$ of inertia is, for example, the moment of inertia of the dc motor 1a.

Thus, the moment J of inertia is corrected by the correction $\Delta J$ provided by the integrator 279 so that the second speed deviation signal $\Delta\omega_2$ is reduced to zero to make the moment J of inertia used in the feed-forward signal calculating circuit 195 coincide with the moment of inertia of the actual mechanical system. Accordingly, the position control operation can be carried out in fixed response characteristics even if the moment of inertia of the mechanical system is unknown or varies during operation.

Fourteenth Embodiment

Although the thirteenth embodiment corrects the moment J of inertia by the correction circuit 190 so that the second speed deviation $\Delta\omega_2$ is reduced, the moment J of inertia may be corrected by the correction circuit 190 so that the correction circuit 190 may correct the moment J of inertia so that the difference between the simulated rotational angle signal $\theta_a$ provided by the feed-forward signal calculating circuit 195 and the actual rotational angle signal $\theta_m$ provided by the rotation detector 4 is reduced because the integration of a speed signal is a rotational angle signal. In the latter case, the correction circuit 190 may be provided with a coefficient multiplier instead of the integrator 279 because the integration of the speed deviation signal, i.e., the difference between the simulated speed signal $\omega_a$ and the actual speed signal $\omega_m$ is the rotational angle deviation signal, i.e., the difference between the simulated rotational angle signal $\theta_a$ and the actual rotational angle signal $\theta_m$.

Fifteenth Embodiment

As is evident from the expression (6), since the simulated torque signal $\tau_a$ is the second derivative of the simulated rotational angle signal $\theta_a$, the simulated torque signal $\tau_a$ can be determined without performing differential operation if the difference between the order of the numerator of the transfer function representing the relation between the rotational angle command signal $\theta_{ms}$ and the simulated rotational angle signal $\theta_a$ and that of the denominator of the transfer function is two or above (the order of the denominator is greater than the order of the numerator). Accordingly, the simulated speed control circuit 194b may perform additional integral operation or the order of the mechanical system simulating circuit 194a may be increased.

Sixteenth Embodiment

From FIG. 29, the differential equation is formed.

$$d\omega_a/dt = \omega_a$$

$$d\omega_a/dt = 1/\tau_a$$

$$\tau_a = K_{sa}\{K_{pd}(\theta_{ma}-\theta_a)-\omega_a\} \quad (12)$$

The feed-forward signal calculating circuit may be provided with a microcomputer to provide the simulated rotational angle signal $\theta_a$, the simulated speed signal $\omega_a$ and the simulated torque signal $\tau_a$ through the numerical integration of the differential equation (12).

Seventeenth Embodiment

Although the foregoing embodiments have been described as applied to controlling the dc motor, the present invention is applicable also to controlling an ac motor, such as an induction motor or a synchronous motor. Since the output torque of the ac motor can be controlled at a high response speed as high as the response speed for controlling the dc motor, the output torque of the ac motor can be easily controlled so that the output signal of the ac motor coincides with a torque represented by the final torque command signal $\tau_{ms}$.

The position controller in the first aspect of the present invention additionally provided with the second position control circuit 7, the second speed control circuit 10a and the mechanical system simulating circuit 6a is capable of carrying out the position control operation in improved response characteristics in response to the variation of the rotational angle command signal $\theta_{ms}$. When additionally provided with the third speed control circuit 11a, the position controller is able to carry out the position control operation in improved response characteristics in response to the variation of the load torque.

Since the position controller in the second aspect of the present invention is provided additionally with the correction circuit 14 to correct the integration time constant of the mechanical system simulating circuit 6b and the gain of the second speed control circuit 10b so that the amplitude of the third torque signal $\tau_3$ provided by the third speed control circuit 11b will be reduced below a specified value, the response frequency for position control can be maintained constant even if the moment of inertia of the load machine 3 is unknown or varies during operation.

The position controller in the third aspect of the present invention additionally provided with the second position control circuit 7, the second speed control circuit 10a and the mechanical system simulating circuit 6c is capable of carrying out the position control operation in improved response characteristics in response to the variation of the rotational angle command signal $\theta_{ms}$. When additionally provided with the third speed control circuit 11a, the position control circuit is able to carry out position control operation in improved response characteristics in response to the variation of the load torque.

Since the position controller in the fourth aspect of the present invention is provided additionally with the correction circuit 14 for correcting the integration time constant of the mechanical system simulating circuit 6d and the gain of the second speed control circuit 10b so that the amplitude of the third torque signal $\tau_3$ provided by the third speed control circuit 11b will be reduced below a specified value, the response frequency for the position control operation can be maintained constant even if the moment of inertia of the load machine 3 is unknown or varies during operation.

The position controller in the fifth aspect of the present invention provided with the feed-forward signal calculating circuit is capable of position control operation at a high response speed even if it is possible that mechanical vibrations are produced in the mechanical system consisting of the electric motor, the torque transmission mechanism and the load machine due to the relatively low rigidity of the torque transmission mechanism or the backlash in the gear trains. Since the feed-forward signal calculating circuit does not perform differential operation, a smooth signal is provided even if the output torque of the electric motor changes suddenly, so that mechanical vibrations and mechanical noise are not generated even if the output torque of the electric motor changes suddenly.

The position controller in the sixth aspect of the present invention provided further with the correction circuit to correct the moment of inertia, i.e., the parameter of the feed-forward signal calculating circuit, according to the moment of inertia of the mechanical system. Therefore, the response frequency for position control operation can be maintained constant even if the moment of inertia of the load machine is unknown or varies during operation.

What is claimed is:

1. A position controller for controlling an electric motor for driving a load machine through a torque transmission mechanism, said position controller comprising:
   a rotation detector for detecting the rotating speed and rotational angle of the electric motor;
   a first position control circuit which provides a first speed signal on the basis of a rotational angle command signal specifying a rotational angle for the electric motor and an actual rotational angle signal provided by the rotation detector;
   a mechanical system simulating circuit which approximates the electric motor, the load machine and the torque transmission mechanism by two integration elements and provides a simulated speed signal and a simulated rotational angle signal on the basis of a second torque signal;
   a second position control circuit which provides a second speed signal on the basis of the rotational angle command signal and the simulated rotational angle signal;
   an adder which adds the first speed signal and the second speed signal to provide a third speed signal;
   a first speed control circuit which provides a first torque signal on the basis of the third speed signal and the actual speed signal provided by the rotation detector;
   a second speed control circuit which provides the second torque signal on the basis of the second speed signal and the simulated speed signal;
   a third speed control circuit which provides a third torque signal on the basis of the actual speed signal and the simulated speed signal; and
   a control means which controls the output torque of the electric motor on the basis of the first torque signal, the second torque signal and the third torque signal.

2. A position controller for controlling an electric motor for driving a load machine through a torque transmission mechanism, said position controller comprising:
   a rotation detector for detecting the rotating speed and rotational angle of the electric motor;
   a first position control circuit which provides a first speed signal on the basis of a rotational angle command signal specifying a rotational angle of the electric motor and an actual rotational angle provided by the rotation detector;
   a mechanical system simulating circuit which approximates the electric motor, the load machine and the torque transmission mechanism by two integration elements and provides a simulated speed signal and a simulated rotational angle signal on the basis of a second torque signal;
   a second position control circuit which provides a second speed signal on the basis of the rotational angle command signal and the simulated rotational angle signal;
   an adder which adds the first speed signal and the second speed signal to provide a third speed signal;
   a first speed control circuit which provides a first torque signal on the basis of the third speed signal and the actual speed signal provided by the rotation detector;
   a second speed control circuit which provides a second torque signal on the basis of the second speed signal and the simulated speed signal;
   a third speed control circuit which provides a third torque signal on the basis of the actual speed signal and the simulated speed signal;
   a control means which controls the output torque of the electric motor on the basis of the first torque signal, the second torque signal and the third torque signal; and
   a correction circuit which receives the third torque signal;
   wherein the correction circuit corrects the integration time constant of the mechanical system simulating circuit and at least the gain of the second speed control circuit so that the amplitude of the third torque signal is reduced below a specified value.

3. A position controller for controlling an electric motor for driving a load machine through a torque transmission mechanism, said position controller comprising:
   a rotation detector for detecting the rotating speed and rotational angle of the electric motor;
   a first position control circuit which provides a first speed signal on the basis of a rotational angle command signal specifying a rotational angle of the electric motor and an actual rotational angle signal provided by the rotation detector;
   a mechanical system simulating circuit which approximates the electric motor, the torque transmission mechanism and the load machine by two integration elements and provides a simulated speed signal and a simulated rotational angle signal on the basis of a second torque signal and a third torque signal;
   a second position control circuit which provides a second speed signal on the basis of the rotational angle command signal and the simulated rotational angle signal;
   an adder which adds the first speed signal and the second speed signal to provide a third speed signal;
   a first speed control circuit which provides a first torque signal on the basis of the third speed signal and an actual speed signal provided by the rotation detector;
   a second speed control circuit which provides the second torque signal on the basis of the second speed signal and the simulated speed signal;
   a third speed control circuit which provides the third torque signal on the basis of the actual speed signal and the simulated speed signal; and
   a control means which controls the output torque of the electric motor on the basis of the first torque signal and the second torque signal.

4. A position controller for controlling an electric motor for driving a load machine through a torque transmission mechanism, said position controller comprising:
   a rotation detector which detects the rotating speed and rotational angle of the electric motor;
   a first position control circuit which provides a first speed signal on the basis of a rotational angle command signal specifying a rotational angle of the electric motor and an actual rotational angle signal provided by the rotation detector;
   a mechanical system simulating circuit which approximates the electric motor, the load machine and the torque transmission mechanism by two integration elements and provides a simulated speed signal and a simulated rotational angle signal on the basis of a second torque signal and a third torque signal;

a second position control circuit which provides a second speed signal on the basis of the rotational angle command signal, and the simulated rotational angle signal;

an adder which adds the first speed signal and the second speed signal to provide a third speed signal;

a first speed control circuit which provides a first torque signal on the basis of the third speed signal and an actual speed signal provided by the rotation detector;

a second speed control circuit which provides the second torque signal on the basis of the second speed signal and the simulated speed signal;

a third speed control circuit which provides the third torque signal on the basis of the actual speed signal and the simulated speed signal;

a control means which controls the output torque of the electric motor on the basis of the first torque signal and the second torque signal; and a correction circuit which receives the third torque signal;

wherein the correction circuit corrects the integration time constant of the mechanical system simulating circuit and at least the gain of the second speed control circuit so that the amplitude of the third torque signal is reduced below a specified value.

5. A position controller for controlling an electric motor for driving a load machine through a torque transmission mechanism, said position controller comprising:

a feed-forward signal calculating circuit which receives a rotational angle command signal specifying a rotational angle of the electric motor and provides a simulated rotational angle signal, a simulated speed signal and a simulated torque signal obtained by functional operation including at least two integration operations;

a rotation detector which detects the rotating speed and rotational angle of the electric motor;

a position control circuit which provides a first speed signal on the basis of the simulated rotational angle signal, and an actual rotational angle signal provided by the rotation detector;

a speed control circuit which provides a first torque signal on the basis of the simulated speed signal, the first speed signal, and an actual speed signal provided by the rotation detector; and a control means which controls the output torque of the electric motor on the basis of the simulated torque signal and the first torque signal.

6. A position controller according to claim 5, wherein said feed-forward signal calculating circuit comprises:

a mechanical system simulating circuit which approximates the electric motor, the load machine and the torque transmission mechanism by two integration elements and provides a simulated speed signal and a simulated rotational angle signal on the basis of a simulated torque signal;

a simulated position control circuit which provides a simulated speed command signal on the basis of a rotational angle command signal and the simulated rotational angle signal; and a simulated speed control circuit which provides the simulated torque signal on the basis of the simulated speed command signal and the simulated speed signal.

7. A position controller for controlling an electric motor for driving a load machine through a torque transmission mechanism, said position controller comprising:

a feed-forward signal calculating circuit which receives a rotational angle command signal specifying a rotational angle of the electric motor and provides a simulated rotational, angle signal and a simulated speed signal through functional operations including at least two integration operations;

a rotation detector for detecting the rotating speed and rotational angle of the electric motor;

a position control circuit which provides a first speed signal on the basis of the simulated rotational angle signal, and an actual speed signal provided by the rotation detector;

a control means which controls the output torque of the electric motor on the basis of the simulated torque signal and the first torque signal; and a correction circuit which receives the simulated speed signal and the actual speed signal;

wherein the correction circuits corrects control parameters used in the feed-forward signal calculating circuit so that the amplitude of a speed deviation signal representing the difference between the simulated speed signal and the actual speed signal is reduced below a specified value.

8. A position controller according to claim 7, wherein said feed-forward signal calculating circuit comprises: a mechanical system simulating circuit comprising a first integrator which integrates a simulated torque signal to provide a simulated speed signal, and a second integrator which integrates the simulated speed signal to provide a simulated rotational angle signal; a simulated position control circuit which provides a simulated speed command signal on the basis of a rotational angle command signal and the simulated rotational angle signal; and a simulated speed control circuit which provides the simulated torque signal on the basis of the simulated speed command signal and the simulated speed signal; and said correction circuit corrects the integration time constant of the first integrator included in the feed-forward signal calculating circuit so that the amplitude of a speed deviation signal representing the difference between the simulated speed signal and the actual speed signal is reduced below a specified value.

9. A position controller for controlling an electric motor for driving a load machine through a torque transmission mechanism, said position controller comprising:

a feed-forward signal calculating circuit which receives a rotational angle command signal specifying a rotational angle of the electric motor and provides a simulated rotational angle signal, a simulated speed signal and a simulated torque signal through functional operation including at least two integration operations;

a rotation detector which detects the rotating speed and rotational angle of the electric motor;

a position control circuit which provides a first speed signal on the basis of the simulated rotational angle signal, and an actual rotational angle signal provided by the rotation detector;

a speed control circuit which provides a first torque signal on the basis of the first speed signal, and the actual speed signal provided by the rotation detector;

a control means which controls the output torque of the electric motor on the basis of the simulated torque signal and the first torque signal; and a correction circuit which receives the simulated rotational angle signal and the actual rotational angle signal;

wherein the correction circuit corrects control parameters used in the feed-forward signal calculating circuit so that the amplitude of a rotational angle deviation signal representing the difference between the simulated rotational angle signal and the actual rotational angle signal is reduced below a specified value.

10. A position controller according to claim 9, wherein said feed-forward signal calculating circuit comprises: a mechanical system simulating circuit comprising a first integrator which integrates a simulated torque signal to provide a simulated speed signal, and a second integrator which integrates the simulated speed signal to provide a simulated rotational angle signal; a simulated position control circuit which provides a simulated speed command signal on the basis of a rotational angle command signal and the simulated rotational angle signal; and a simulated speed control circuit which provides the simulated torque signal on the basis of the simulated speed command signal and the simulated speed signal; and the correction circuit corrects the integration time constant of the first integrator included in the feed-forward signal calculating circuit so that the amplitude of a rotational angle deviation signal representing the difference between the simulated rotational angle signal and the actual rotational angle signal is reduced below a specified value.

* * * * *